April 21, 1942.   R. R. KEMMERER   2,280,491
ABSOLUTE PERMISSIVE BLOCK SYSTEM OF RAILWAY SIGNALING
Filed Sept. 14, 1939   14 Sheets-Sheet 1

INVENTOR
Ralph R. Kemmerer
BY
HIS ATTORNEY

April 21, 1942.                R. R. KEMMERER                2,280,491
ABSOLUTE PERMISSIVE BLOCK SYSTEM OF RAILWAY SIGNALING
Filed Sept. 14, 1939                    14 Sheets-Sheet 2

INVENTOR
Ralph R. Kemmerer
BY
HIS ATTORNEY

April 21, 1942.  R. R. KEMMERER  2,280,491

ABSOLUTE PERMISSIVE BLOCK SYSTEM OF RAILWAY SIGNALING

Filed Sept. 14, 1939  14 Sheets-Sheet 3

INVENTOR
Ralph R. Kemmerer
BY
HIS ATTORNEY

April 21, 1942.    R. R. KEMMERER    2,280,491
ABSOLUTE PERMISSIVE BLOCK SYSTEM OF RAILWAY SIGNALING
Filed Sept. 14, 1939    14 Sheets-Sheet 4

INVENTOR
Ralph R. Kemmerer
BY
HIS ATTORNEY

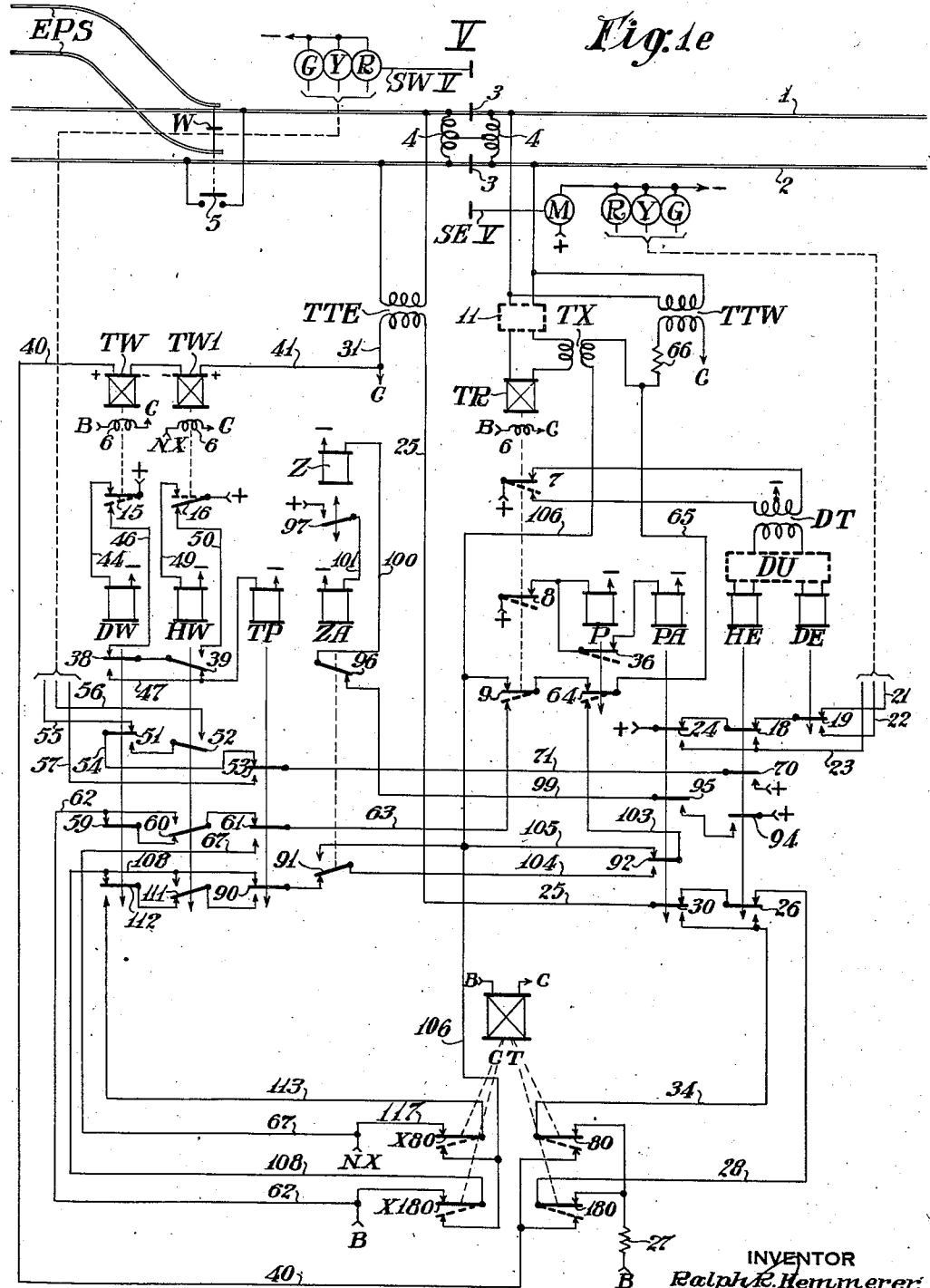

April 21, 1942. R. R. KEMMERER 2,280,491
ABSOLUTE PERMISSIVE BLOCK SYSTEM OF RAILWAY SIGNALING
Filed Sept. 14, 1939 14 Sheets-Sheet 6
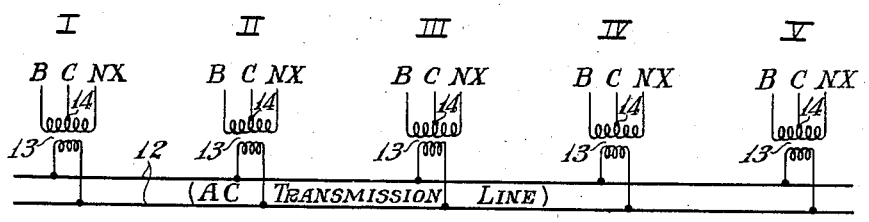
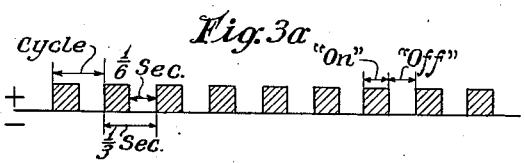
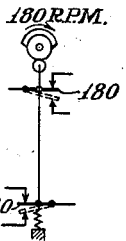
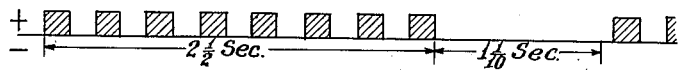
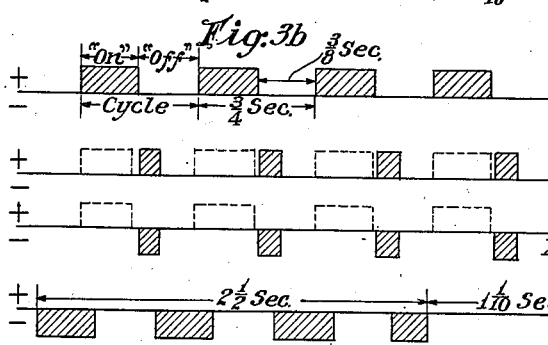
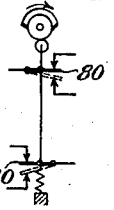
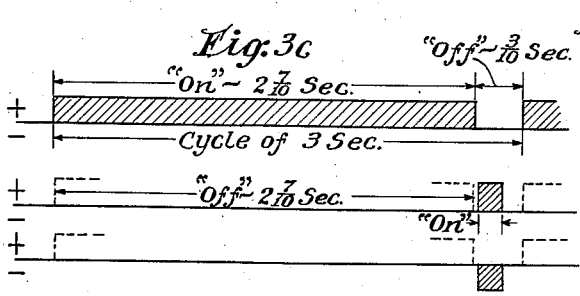
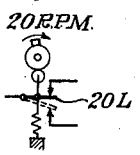
INVENTOR
Ralph R. Kemmerer.
BY
HIS ATTORNEY April 21, 1942.  R. R. KEMMERER  2,280,491
ABSOLUTE PERMISSIVE BLOCK SYSTEM OF RAILWAY SIGNALING
Filed Sept. 14, 1939  14 Sheets-Sheet 7
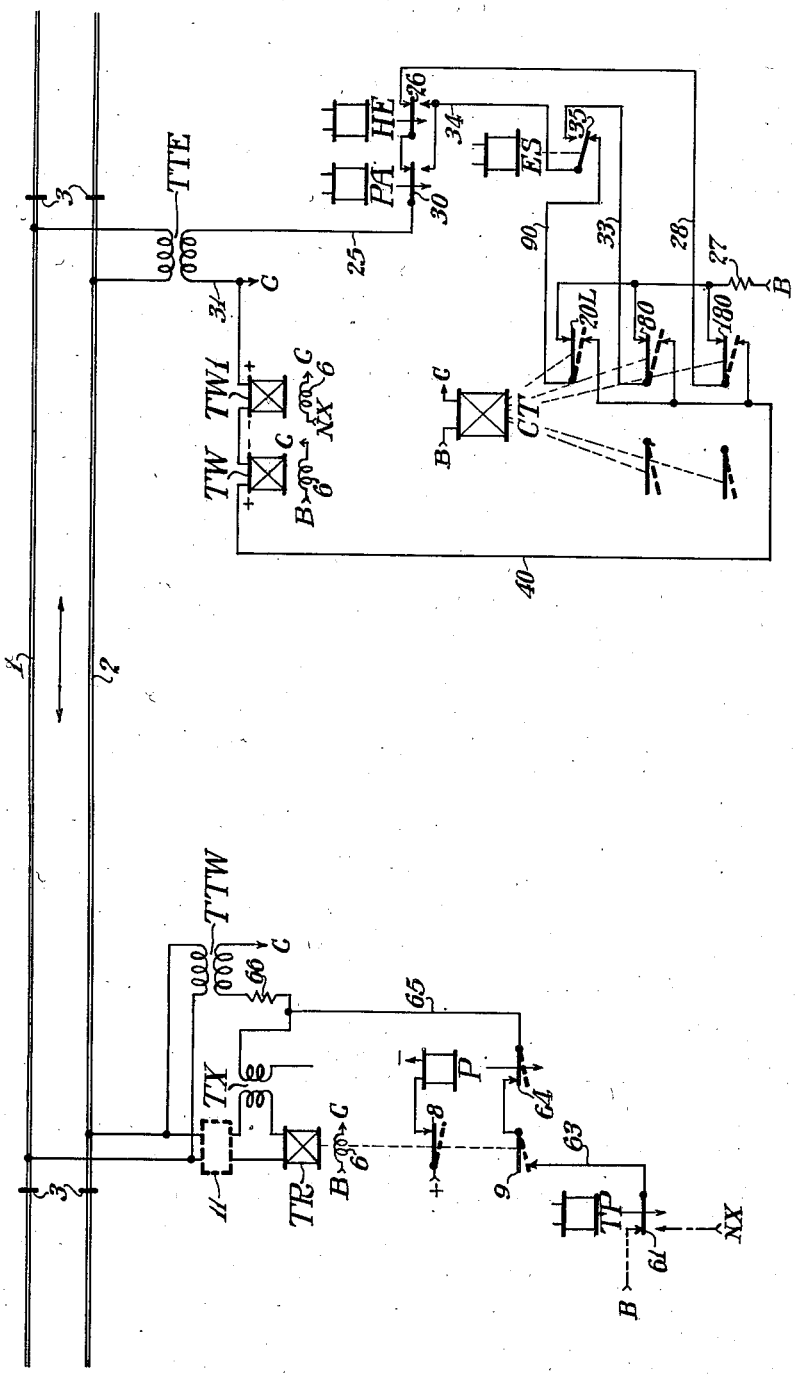
INVENTOR
Ralph R. Kemmerer.
BY
HIS ATTORNEY April 21, 1942.  R. R. KEMMERER  2,280,491
ABSOLUTE PERMISSIVE BLOCK SYSTEM OF RAILWAY SIGNALING
Filed Sept. 14, 1939  14 Sheets-Sheet 8
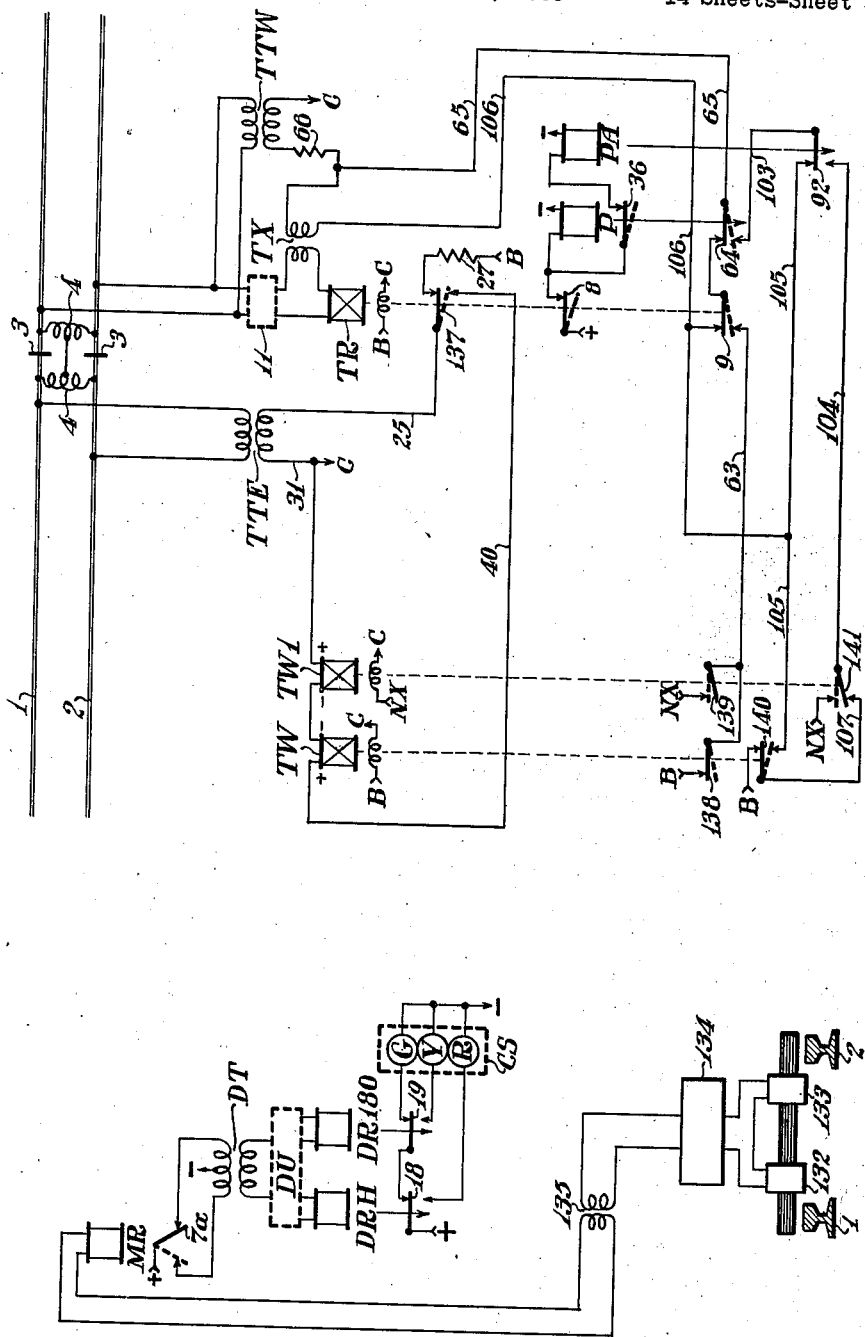
INVENTOR
Ralph R. Kemmerer
BY
HIS ATTORNEY

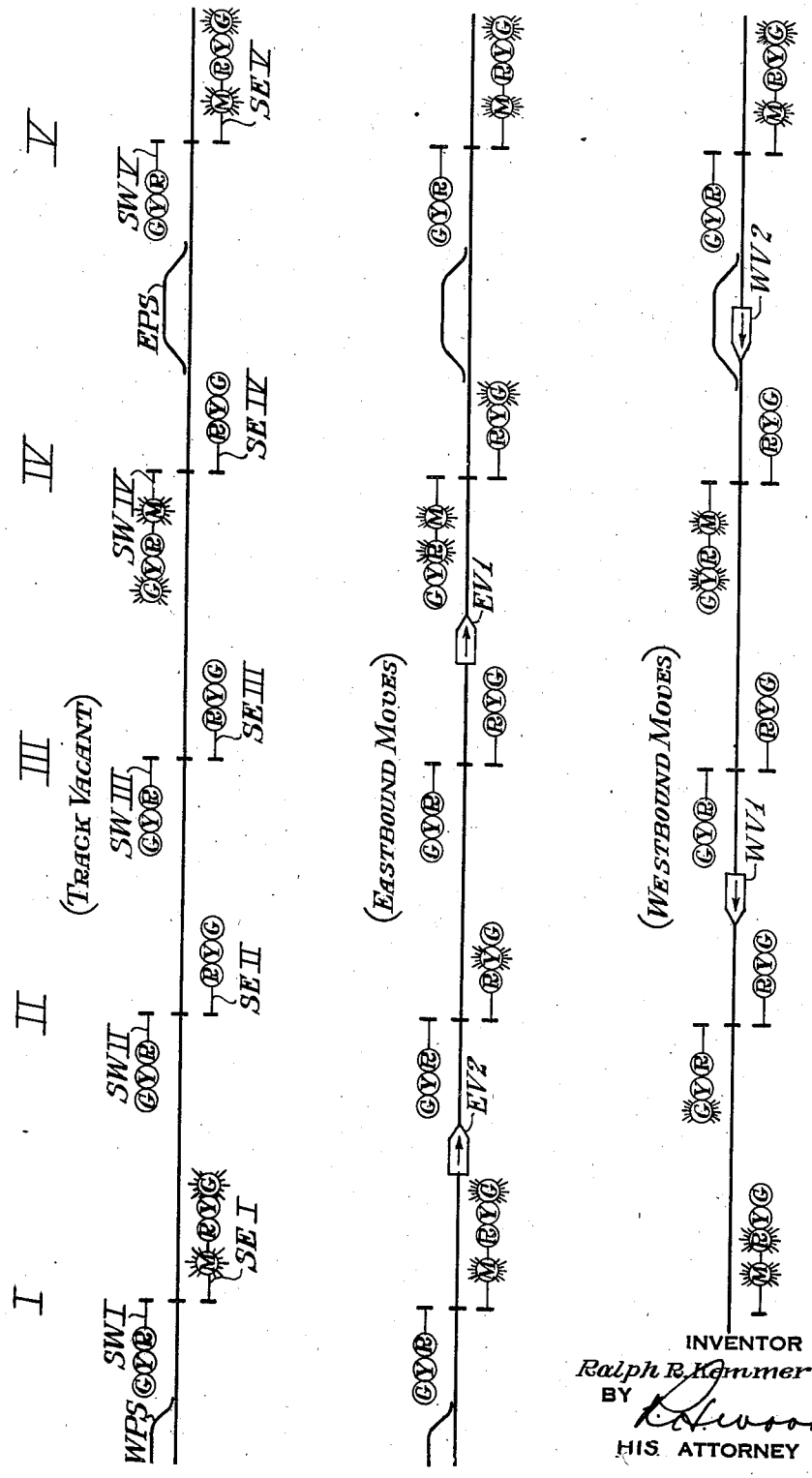

April 21, 1942.   R. R. KEMMERER   2,280,491
ABSOLUTE PERMISSIVE BLOCK SYSTEM OF RAILWAY SIGNALING
Filed Sept. 14, 1939   14 Sheets-Sheet 10

INVENTOR
Ralph R. Kemmerer
BY
HIS ATTORNEY

April 21, 1942.    R. R. KEMMERER    2,280,491
ABSOLUTE PERMISSIVE BLOCK SYSTEM OF RAILWAY SIGNALING
Filed Sept. 14, 1939    14 Sheets-Sheet 11

INVENTOR
Ralph R. Kemmerer.
BY
HIS ATTORNEY

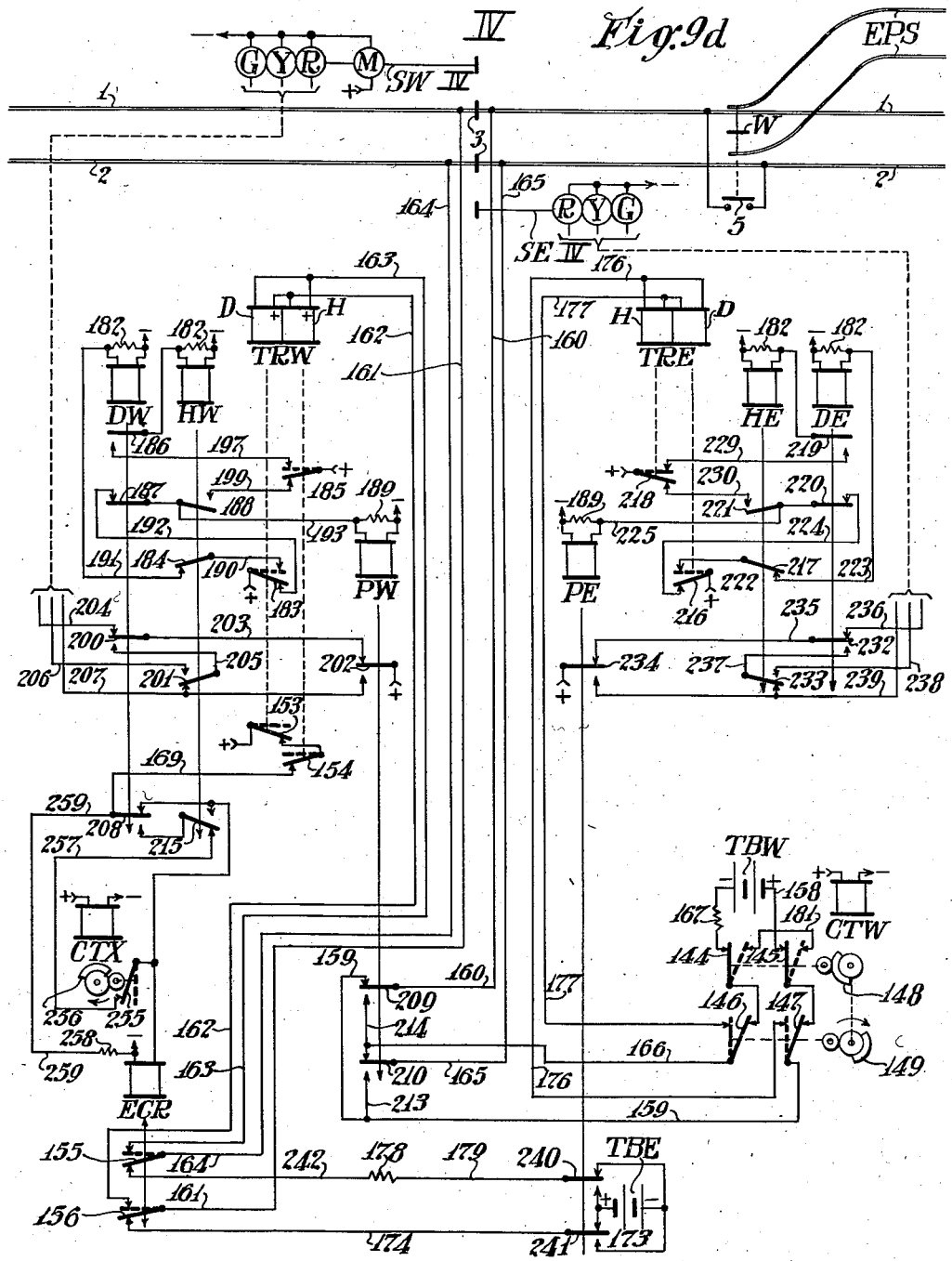

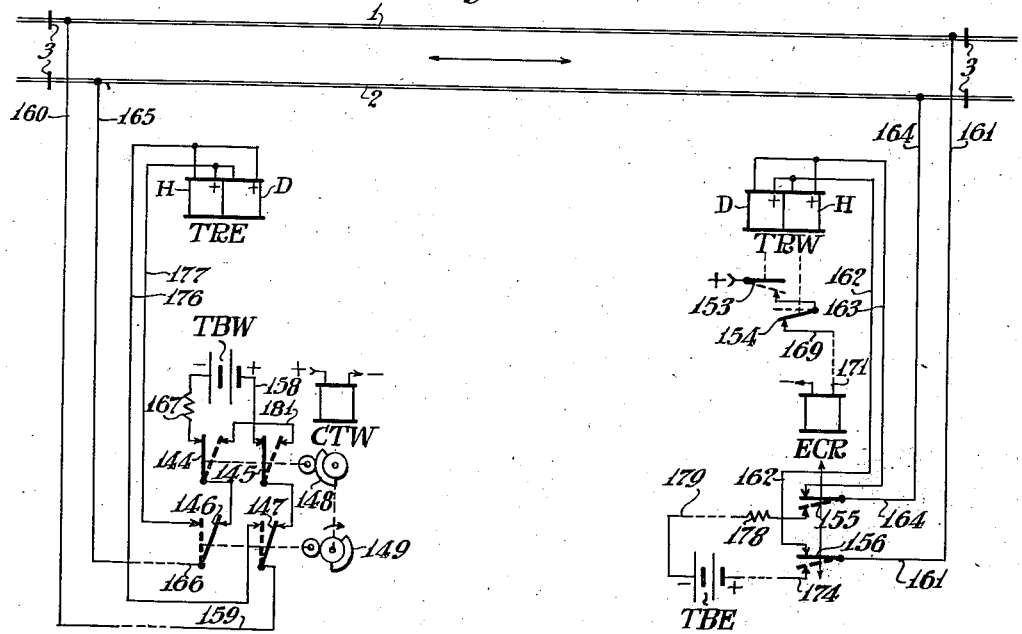

Patented Apr. 21, 1942

2,280,491

UNITED STATES PATENT OFFICE 2,280,491

ABSOLUTE PERMISSIVE BLOCK SYSTEM OF RAILWAY SIGNALING

Ralph R. Kemmerer, Swissvale, Pa., assignor to The Union Switch & Signal Company, Swissvale, Pa., a corporation of Pennsylvania Application September 14, 1939, Serial No. 294,897

50 Claims. (Cl. 246—33)

My invention relates to absolute permissive block (A. P. B.) systems of signaling for stretches of two-direction running railway track and it has special reference to systems of this character which use coded track circuit energy to control the signals that govern traffic through the stretch.

Generally stated the object of my invention is to provide a coded system of A. P. B. signaling that is completely automatic in its operation and which requires no line wires for signal control purposes.

A more specific object is to enable each train that comes into the stretch automatically to set up its own directional protetcion and to provide its own following protection wholly by means of coded energy which is transmitted through the track rails.

Another object is to arrange that this coded track circuit energy will control either or both wayside signals and train carried cab signals.

An additional object is to make provision for applying the two-direction traffic governing apparatus to automatic signal blocks which both do and do not contain cut sections.

A further object is to accomplish the above without dispensing with any of the desirable features of continuously coded track circuit control.

In practicing my invention I attain the above and other objects and advantages by utilizing the rails of each of the sections of track in the A. P. B. stretch as common conductors in first and second track circuits that operate on the "coded feed back" principle of Frank H. Nicholson Patent No. 2,021,944; supplying recurring pulses of "master" code energy to the first of these track circuits at the end of the section which marks the exit for given direction traffic; at the opposite end of the section simultaneously supplying the second of these track circuits with "feed back" code energy in the form of recurring pulses which coincide with the master code "off" periods and which are selectively polarized; using the master code energy of the first track circuits to control the signals that govern given direction traffic; using the feed back code energy of the second track circuits to control the signals that govern opposite direction traffic; providing directional protection facilities by means of which the entry of a train into either end of the stretch so conditions all of the opposing track circuits ahead as to set the opposing signals at "stop"; and providing following protection means which so determine the coding of the energy in the track sections behind each moving train as to control the signals to the rear in automatic block system manner.

I shall describe two representative forms of A. P. B. signaling apparatus embodying my invention and shall then point out the novel features thereof in claims. These illustrative embodiments are disclosed in the accompanying drawings in which:

Figs. 1a to 1e, inclusive, are diagrammatic views which when placed end to end in the order named represent a stretch of railway track which is equipped with a first form of two-direction traffic controlling apparatus that embodies my invention;

Fig. 2 is a showing of one manner in which alternating current operating energy may be supplied to the several signal location equipments of Figs. 1a–e;

Figs. 3a to 3c are diagrammatic showings of trackway energy codes which may be used to control the apparatus of Figs. 1a–e;

Figs. 4a to 4c are a series of views indicating one manner in which the coding device contacts that produce the several codes of Figs. 3a–c may be arranged and actuated;

Fig. 5 is a simplified showing of the two coded track circuits which are identified with each of the track sections of Figs. 1a–e;

Fig. 6 is a representation of cab signal circuits of conventional frequency selective character which are suitable for cooperation with and control by the trackway apparatus of the preceding figures;

Fig. 7 is a diagrammatic showing of cut location facilities which may be interposed between the ends of any of the track sections of Figs. 1a–e;

Fig. 8 is a series of single line representations of the single track of Figs. 1a–e showing the indications which the wayside signals display under various traffic conditions;

Figure 1A:
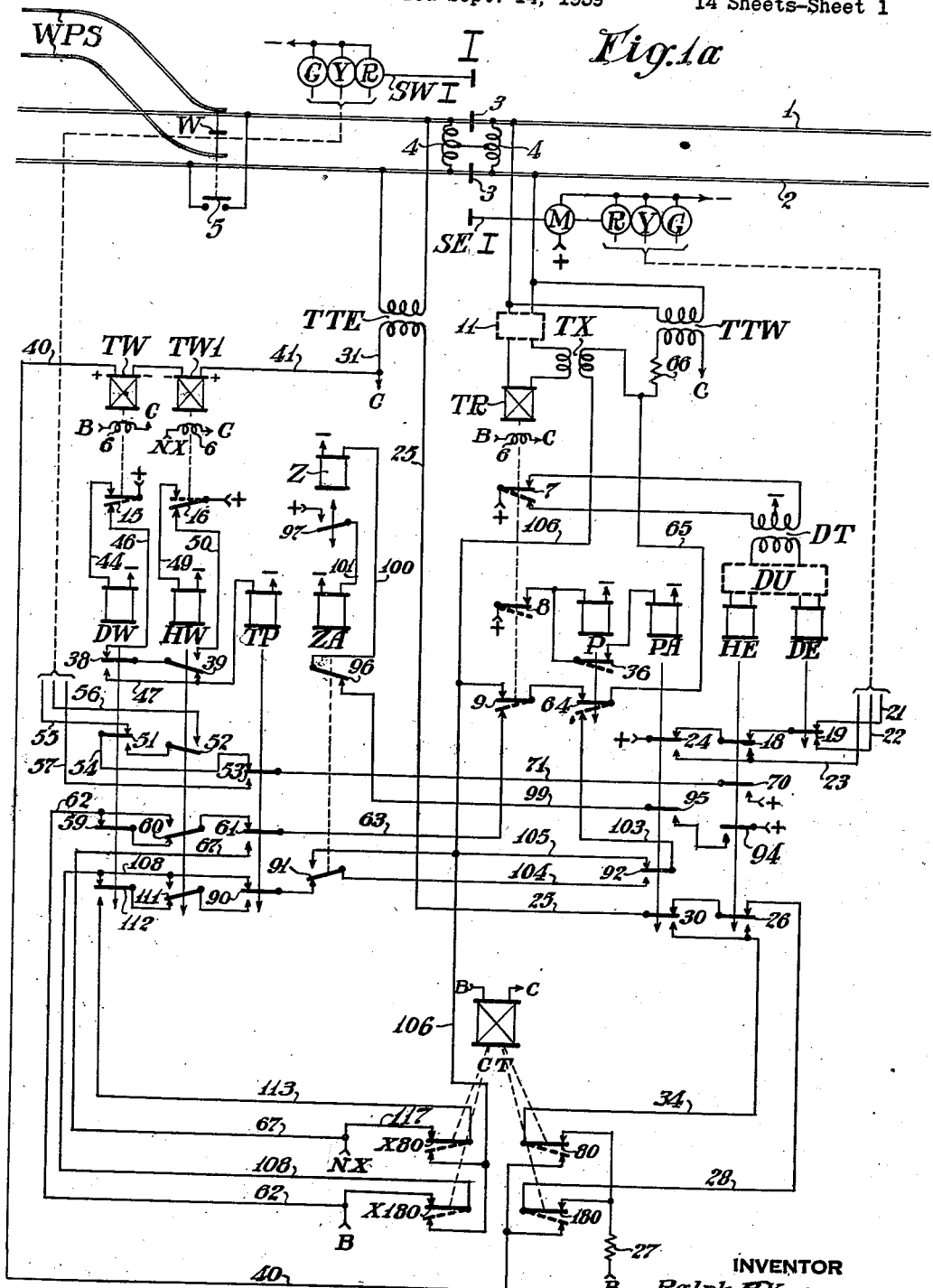

Figs. 9a to 9d, inclusive, are diagrammatic views which when placed end to end in the order named represent a stretch of railway track that is equipped with a second form of A. P. B. signaling apparatus which embodies my invention and which employs direct current rather than alternating current track circuits;

Fig. 10 is a simplified showing of the two coded track circuits which are identified with each of the track sections of Figs. 9a–d; and Fig. 11 is a representation of trackway energy codes which may be used to control the apparatus of Figs. 9a–d.

In the several views of the drawings like reference characters designate corresponding parts. To facilitate description of the various circuit diagrams of these views it will be assumed that the left end thereof is west and that the right end is east. Hence, train movements in the direction of from left to right will be spoken of as "eastbound" and train movements in the direction of from right to left will be spoken of as "westbound."

Referring first to the composite diagram of Figs. 1a–e, the improvements of my invention are there disclosed as being incorporated in a system of absolute permissive block (A. P. B.) signaling for a stretch of track 1—2 which extends from a first passing siding WPS (Fig. 1a) to a second passing siding EPS (Figs. 1d–e) and over which traffic may move in either direction. The rails 1 and 2 of this single track stretch are divided by the usual insulated joints 3 into the customary plurality of successive sections only four of which, I—II, II—III, III—IV and IV—V are completely represented in Fig. 1.

The particular track there shown is intended for use in a railway system employing electric propulsion and for this reason impedance bonds 4 of the customary form are provided at each pair of insulated joints to conduct propulsion current therearound. It will be apparent, however, that the apparatus of my invention is equally well suited for use on a steam road in which application the bonds 4 would of course be omitted.

Positioned at the locations I, II, III, IV, etc. of track section division are wayside signals SE which are arranged to govern eastbound traffic through the track stretch and other wayside signals SW similarly arranged to govern the passage of westbound trains over the track. These signals may, of course, be of any suitable form; as here shown each is of a well-known color light type and consists of three lamps G, Y and R which when selectively lighted respectively display the indications of green or "clear," yellow or "approach" and red or "stop."

The signal SEI at the west end I of the represented stretch of A. P. B. track governs the entry of eastbound traffic into that stretch while the signal SWIV at the opposite or east end IV similarly controls the entry of westbound traffic into the stretch. The two devices just named are commonly known as "headblock" signals and to distinguish them from the remaining signals of the system they are provided with a fourth lamp which is constantly illuminated in the manner represented at M.

The particular stretch of A. P. B. signaled track which is represented in Figs. 1a–d includes (between the end or headblock locations I and IV) only two "intermediate" locations II and III of track section division. Alternatively, of course, the stretch may include either a greater or a lesser number of these intermediate locations and all of them need not necessarily have the represented double signals (eastbound SE and westbound SW) associated therewith; instead some may be provided with only one of these signals or with no signal at all (as when the location defines a cut section of the character that is shown in Fig. 7).

Obviously, likewise, each of the passing sidings EPS and WPS defining the ends of the represented A. P. B. stretch of the track 1—2 may span either one signal block only of that track (as does siding EPS of Figs. 1d–e) or more than one of those blocks. In all instances, however, the traffic diverting switch W which is installed at each siding end preferably will be equipped with the usual contact 5 which by-passes the rails of the main track 1—2 whenever the switch is thrown to the "take siding" position.

When applied to the multi-section stretch of single track 1—2 of the composite diagram of Fig. 1, the improved organization of apparatus and circuits of my invention enables the trains themselves automatically to control the traffic governing signals SE and SW in the typical A. P. B. manner indicated in Fig. 8 and to do this, moreover, wholly by means of energy which is transmitted through the track rails. As will become more evident presently, each train which enters the stretch thus both sets up its own directional protection and provides its own following protection without the aid of line wires for signal control purposes.

*Two-way track circuits*

This novel and advantageous form of A. P. B. system control is made possible by operating two coded track circuits simultaneously on each of the sections I—II, II—III, III—IV, etc. into which the track 1—2 of Fig. 1 is divided. One of these track circuits transmits "master" code energy which controls the signals SE that govern eastbound traffic and it will be referred to as the master or "eastbound" track circuit; the other transmits "feed back" code energy which controls the signals SW that govern westbound traffic and it will be referred to as the "feed back" or "westbound" track circuit. To designate both of these simultaneously operating track circuits use will be made of the expression "coded feed back" track circuit combination.

One elementary form of such a combination is disclosed and claimed in the before referred to Nicholson Patent 2,021,944. As shown and described by the Nicholson patent, that early form of "coded feed back" track circuit combination is applied to track over which trains move in but one direction. In that early combination, moreover, the character of the "feed back" pulses always remains the same and never is it altered in a selectively distinctive way.

As utilized by the herein disclosed signaling facilities for two-direction running track, the "coded feed back" track circuits of my invention possess a number of added refinements and they are, moreover, novelly arranged to have the polarity of the "feed back" pulses variously change in response to the passage of traffic through the circuited stretch of the signaled track. The organization and functioning of each of my improved "coded feed back" (eastbound-westbound) track circuit sets will be most readily apparent upon reference to the simplified diagram of Fig. 5.

As that drawing view indicates, both of the above referred to track circuits in each set include the rails 1 and 2 of the particular track section with which they are identified; the "eastbound" or "master" circuit further includes a track transformer TTE and a code transmitter CT installed as shown at the section east or "master" end and a code following track relay TR installed at the section west end; and the "westbound" or "feed back" circuit further includes a track transformer TTW and a coding contact 9 (of the relay TR) located at the section west or "feed back" end and a pair of code following track relays TW and TW1 installed at the section east end.

The eastbound or "master" circuit track transformer TTE (located at the eastbound exit or east end of the section) is connected with the section rails in the usual way. Exciting current for this transformer is derived from an alternating current source (of commercial frequency and voltage) that is designated by the terminals B and C. Those terminals may, of course, be identified with power distribution facilities of any suitable type. As shown in Fig. 2, those facilities include a transmission circuit 12 which extends along the right of way in the usual manner and which feeds into a distribution transformer 13 at each of the locations I, II, III and IV, etc. of track section division.

The code transmitter CT for each eastbound track circuit acts as the "master" coding device in the two-way track circuit set. It functions in the usual way periodically to interrupt the supply path over which the track transformer TTE receives exciting current from the source B—C. As shown at all locations in the A. P. B. system, this transmitter has two contacts 180 and 80 which respectively produce the "eastbound clear" code of Fig. 3a and the "eastbound approach" code of Fig. 3b; as shown at each intermediate location II and III, the same transmitter has a third contact 20L which produces the "eastbound detection" code of Fig. 3c.

By a motor or other suitable mechanism (not represented in detail) these contacts are actuated at three different speeds which for purposes of explanation will be assumed to be such as to cause the referred to codes respectively to consist of 180, 80 and 20 spaced energy pulses ("on" periods) per minute. Instead of all being included in the represented single code transmitter CT, the three contacts 180, 80 and 20L may, of course, form parts of three separate coder units each of which has its own driving mechanism that is designed to operate at the proper preselected speed.

The eastbound or "master" circuit track relay TR (located at the eastbound entrance or west end of the section) is an alternating current code following device and is provided with: (1) the customary control winding that is connected in energy receiving relation with the section rails; (2) a local or exciting winding 6 which is constantly energized from the alternating current source B—C; and (3) contacts which pick up during each "on" period of "eastbound" code energy that is received from the rails by the control winding and which release during each "off" period of the received "eastbound" code.

To exclude stray propulsion current from this eastbound track relay TR, the rail supply circuit therefor is supplemented by a filter 11 which while permitting ready passage of track circuit energy of the relatively high carrier wave frequency of source B—C (usually 60 or 100 cycles per second) excludes from the relay such stray current as may be due to the lower (typically 25 cycles per second) energy of the propulsion circuit. For applications to steam roads wherein the rails transmit no propulsion current, this filter 11 may, of course, be omitted from the relay winding circuit.

The westbound or "feed back" circuit track transformer TTW (located at the westbound exit or west end of the section) also is connected in energy supplying relation with the section rails in the usual way. Exciting energy for this transformer likewise is supplied by the alternating current source with which the terminals B and C are identified and is transmitted to the transformer primary by way of a circuit which is completed (during each "off" period of the received eastbound code) over the back point of contact 9 of the eastbound track relay TR at the transformer location.

At times this exciting energy is of positive or "given" relative instantaneous polarity and then it is derived from the already mentioned terminals B and C; and at other times the exciting energy is of negative or "opposite" relative instantaneous polarity and then it is derived from terminal C and a third terminal NX arranged as shown in Fig. 2. In that arrangement, the secondary winding of each of the before-described distribution transformers 13 is provided with a mid tap 14 with which the terminal C is directly joined; one end of the same winding constitutes terminal B; and the other end of the winding constitutes terminal NX. At any instant during the cycle of transformer output voltage that terminal B is positive with respect to terminal C, then terminal NX is negative with respect to C, and vice versa.

Coding of the energy which the westbound track transformer TTW transmits to the section rails is performed by the before-mentioned back contact 9 of the eastbound track relay TR. Under the action of that contact, the westbound track circuit is energized during the "off" periods of the "eastbound" trackway code to which the relay TR is responding and is deenergized during the "on" periods of that code.

Each pulse of the energy with which the westbound transformer TTW is supplied (over the back point of the eastbound relay contact 9) constitutes an "on" period in one of the "westbound" trackway codes of Figs. 3a–c. From an inspection of those figures it will be seen that the "on" periods of each of the there shown "westbound" or "feed back" codes coincide with the "off" periods of an "eastbound" or "master" code which is represented immediately thereabove, and vice versa. As will become more apparent presently, this relation allows the "eastbound" and the "westbound" track circuits simultaneously to operate over the same section rails without interfering with each other.

The two westbound or "feed back" circuit track relays TW and TW1 (located at the westbound entrance or east end of the section) are of an alternating current polarized type. Both are designed to follow code and each has the usual track or control winding which during the "off" periods of the before-described "eastbound" trackway code is connected in energy receiving relation with the track circuit rails. As will be more completely described presently, this connection is by way of the eastbound track transformer TTE and over the back point of the particular one of the coding contacts 180, 80 and 20L of device CT which at the time is included in the eastbound rail supply circuit. Each relay also is provided with a local winding 6 which is constantly excited; in the case of device TW this excitation is by "given" polarity energy from terminals B and C and in the case of device TW1 the excitation is by "opposite" polarity energy from terminals NX and C.

The represented connection of the control windings of the two westbound track relays with the section rails (by way of transformer TTE) is a serial one and is so arranged that current received from those rails passes through both of the control windings in the same direction. This arrangement causes relay TW to follow code only when positive or "given" polarity energy is received from the track circuit and enables relay TW1 similarly to respond only when the received trackway energy is of negative or "opposite" polarity.

As already indicated, both of the westbound track relays TW and TW1 are disconnected from the section rails (under the action of one of the coding contacts of the code transmitter CT) during the "on" periods of the there supplied "eastbound" code. This disconnection prevents the eastbound track circuit energy from reaching these westbound relays TW and TW1 and thus renders them responsive only to energy (westbound track circuit) that is supplied to the rails by way of the westbound track transformer TTW at the west end of the section.

In order that the eastbound track relay TR at the west end of the section will not be falsely picked up by the pulses of westbound track circuit energy which are there applied to the rails (through the track transformer TTW) during the released periods of that track relay, use is made of an impedance transformer TX having a primary winding which is serially included in the pick-up circuit for the just named relay TR. At all times except when the westbound track transformer TTW is transmitting energy to the trackway, the secondary or control winding of this transformer TX is shunted or closed upon itself over by-pass circuits later to be described. With its secondary short circuited this transformer TX adds very little to the impedance of the track relay pick-up circuit and under this condition the eastbound track relay TR operates in the same manner as were the transformer not present.

When, however, the secondary circuit is opened, the amount of added impedance increases so substantially as to prevent the track relay from being falsely picked up by the potential that appears between the rails as a result of their energization from the transformer TTW during the "off" periods of the eastbound code. The effect therefore, of transformer TX is to render the eastbound track relay TR at the west end of the section responsive only to energy (eastbound track circuit) that is supplied to the rails by way of the eastbound track transformer TTE at the east end of the section.

In operation of those basic portions of the "eastbound" and "westbound" track circuits which are shown in Fig. 5, the code transmitter CT at the east end of the section acts as a "master" device in that it sets the rate at which the pulses of both the "eastbound" and the "westbound" trackway codes recur. This rate, in turn, is determined by which of the transmitter contacts 180, 80 and 20L is included (under the selecting action of relays PA, HE and ES later to be described) in the exciting circuit for the eastbound track transformer TTE.

As already indicated, all of these coding contacts periodically move (each at a distinctive rate) between an upper position and a lower position. When in the upper position, the selected or active contact completes for the track transformer TTE an exciting circuit that may be traced from terminal B of the alternating current supply source, through a current limiting impedance 27, the selected contact (180, 80 or 20L) of transmitter CT, conductor 25, contacts of selector devices PA, HE and ES, and the lower winding of transformer TTE back to terminal C of the supply source.

Each of these completions constitutes an "on" period of one of the eastbound codes and causes transformer TTE to energize the eastbound track relay TR (at the section west end) over a circuit which extends from the right terminal of the upper winding of the transformer through track rail 1, the winding of relay TR, and track rail 2 back to the left terminal of the transformer winding. In receiving this energy relay TR picks up and causes contact 9 to maintain the westbound track transformer TTW disconnected from its exciting source. Each of these disconnections produces an "off" period of one of the "westbound" codes.

In going to the lower position at the end of each eastbound code "on" period, the active coding contact of device CT interrupts the above-traced exciting circuit for transformer TTE and marks the beginning of an eastbound code "off" period. During each of those "off" periods, the just referred to active coding contact (180, 80 or 20L) connects the westbound track relays TW and TW1 at the east end of the section across the transformer TTE. This connection is by way of a circuit which extends from the right terminal of the lower winding of transformer TTE, through conductor 25, contacts of selector devices PA, HE and ES, the active contact (in the lower position) of device CT, conductor 40, the windings of relays TW and TW1 and conductor 31 back to the left terminal of the named winding.

During each of the just mentioned eastbound code "off" periods, the eastbound track relay TR at the west end of the section releases in the usual manner. That release completes (at contact 9) for the westbound track transformer TTW an exciting circuit which may be traced from terminal B (or terminal NX) of the alternating current supply source through a contact 61 of a relay TP (later to be described), conductor 63, back contact 9 of relay TR, a front contact 64 of a relay P (also later to be described) conductor 65, a current limiting impedance 66 and the lower winding of transformer TTW back to terminal C of the supply source.

Each of these completions constitutes an "on" period of one of the "westbound" codes and causes transformer TTW to excite the transformer TTE (at the section east end) by way of a circuit that extends from the left terminal of the upper winding of transformer TTW through track rail 1, the upper winding of transformer TTE and track rail 2 back to the right terminal of the TTW transformer winding. Over the circuit previously traced (as including the back point of the active contact of coding device CT), transformer TTE transmits the thus received energy to the westbound track relays TW and TW1 at the east end of the section. Depending upon the polarity of that energy, one or the other of those relays responds to each of the thus transmitted pulses thereof.

Under the before-mentioned action of the impedance transformer TX, the eastbound track relay TR at the west end of the section now is prevented from responding to this pulse of westbound track relay operating energy. Aiding in that action are transformer by-pass circuits (not shown in Fig. 5 but later to be described) which are opened during each westbound code "on" period and which are closed at all other times.

Prior to the end of each east bound code "off" period the exciting circuit for transformer TTW is interrupted by a release of contact 64 of relay P. That relay is a slow release code following repeater for the eastbound track relay TR and is picked up during each "on" period of the received eastbound code over a local energizing circuit that is completed by a contact 8 of the track relay. To assure the action first stated, the release delay period for relay P is made slightly less than the shortest "off" period of any of the eastbound codes which the system employs.

In so releasing, relay P terminates the westbound code "on" period and conditions the eastbound track relay TR for a reception of and response to a succeeding "on" period pulse of eastbound code energy. That pulse is supplied to the section rails when the active contact of the coding device CT (at the section east end) again moves to its uppermost position.

When that happens the just described cycle of two-way coded track circuit operation starts to be repeated. In the manner just described, therefore, the "eastbound" and the "westbound" track circuits operate over the same section rails simultaneously and without interfering with each other. This lack of interference, of course, results from the fact that each "on" period of the "westbound" code is supplied during an "off" period of the "eastbound" code and vice versa.

Control of eastbound signals

The "eastbound" or "master" track circuits that have just been described for the several signal block sections into which the track stretch of Figs. 1a–e is divided form a part of a "frequency code" system which controls the eastbound signals SE for those sections in customary automatic block manner. As illustratively represented (in the composite diagram of Fig. 1), this signal control system is of the three-indication variety; it is operated by the "eastbound" or "master" trackway codes of Figs. 3a–c (that selectively are supplied to the circuit rails at the east end of each track section); and at the west end of each section it makes use of decoding apparatus which governs the indication of the signals SE at that location and which selects the coding of the eastbound track circuit energy that is supplied to the track section to the west.

As just intimated, this eastbound decoding apparatus is provided at each signal location and it there includes "home" and "distant" decoding relays HE and DE which through frequency selective circuits DU receive pick-up energy from a decoding transformer DT. That transformer, in turn, is excited by a direct current source, designated by the terminals "plus" and "minus," over a circuit which is controlled by a pole changing contact 7 of the code following track relay TR.

The elements just named cooperate to cause both the home relay HE and the distant relay DE to pick up when the track relay is following the "eastbound clear" code of 180 energy pulses per minute; to allow only the home relay HE to be picked up when the track relay responds to the slower "eastbound caution" code of 80 pulses per minute; and to cause both of the relays HE and DE to release when the track relay becomes stalled or follows the still slower "eastbound detection" code of 20 pulses per minute. Both of the relays HE and DE have a period of release delay which is substantial; in the case of relay HE this delay is depended upon for performing an A. P. B. control function later to be described.

In determining the aspect which is displayed by the associated eastbound wayside signal SE, these two decoding relays make use of contacts 18 and 19 which are included in the energizing circuits for the three lamps G, Y and R of that signal. As illustratively shown, the lamp-lighting circuits receive energy from a source which is designated by the terminals "plus" and "minus." Further included in these circuits is a contact 24 of an associated relay PA (later to be described) that also picks up under code following conditions of the track relay TR.

When that track relay TR is responding to the "clear" or 180 code and all three of the relays PA, HE and DE are picked up, lamp G is lighted over a circuit which includes front contacts 24, 18 and 19 and conductor 21; when the track relay is responding to the "approach" or 80 code and relays PA and HE only are picked up, lamp Y then receives lighting current over front contacts 24 and 18, back contact 19 and conductor 22; and when the track relay is stalled and all three of the relays PA, HE and DE are released, lamp R is lighted over a circuit which includes back contact 24 and conductor 23.

The just mentioned relay PA is a slow releasing device which detects code following operation on the part of the track relay TR. In order that this relay will bridge the "off" periods of any and all of the "eastbound" codes which the system employs, the period of its release delay is made somewhat greater than the "off" period length of the 80 pulse per minute "eastbound approach" code of Fig. 3b. In order, furthermore, than a later described (and previously referred to) A. P. B. control function will be performed as intended, this same release delay period is chosen to be somewhat less than that of the associated decoding relay HE.

Current for energizing relay PA is supplied (from a source again designated by the terminals "plus" and "minus") over front contact 8 of the track relay TR and by way of a circuit which includes a front contact 36 of the before-described repeater relay P. When the track relay TR is receiving and following any one of the "eastbound" codes of Figs. 3a–c, contact 8 thereof picks up relay P at the beginning of each "on" period of the followed code and this action, in turn, causes relay PA also to receive "on" period pulses of energizing current over front contacts 8 and 36. As long as those pulses recur at either of the rates of 80 and 180 times per minute, relay PA is held continuously picked up thereby; moreover, even when the pulses recur at the slower "eastbound detection" rate of 20 times per minute, the comparative shortness ($\tfrac{3}{10}$ second) of the intervening "off" periods still allows relay PA to remain continuously picked up.

The home decoding and the code detecting relays HE and PA at the west end of each track section also select the coding of the eastbound track circuit energy which is supplied to the east end of the track section that adjoins to the west. As already indicated, this energy is of one or another of the "eastbound" codes of Figs. 3a–c and it is transmitted to the track rails over a circuit which includes the track transformer TTE and one of the contacts of the coding device CT at the transformer location.

When energy of either the 180 or the 80 "eastbound" codes is being received by the code following track relay TR at the west end of each eastwardly extending track section, both of the above-mentioned relays HE and PA are picked up and contacts 26 and 30 thereof then set up for the transformer TTE an energizing circuit that includes coding contact 180 and by way of which the rails of the adjoining track section to the west are supplied with energy of the "eastbound clear" or 180 pulse per minute code. This circuit extends from power source terminal B through a current limiting impedance 27, coding contact 180 of device CT, conductor 28, front contact 26 of relay HE, front contact 30 of relay PA, conductor 25, the primary of transformer TTE, and conductor 31 back to the power source terminal B.

In the event, however, that no coded energy is being received from the rails by the eastbound track relay TR (as when the track section extending eastwardly therefrom is occupied) both of the relays HE and PA are released and contact 30 of relay PA then sets up for the transformer TTE an energizing circuit that includes coding contact 80 and by way of which the westwardly extending track section is supplied with energy of the "eastbound approach" or 80 pulse per minute code. This circuit may be traced from the power source terminal B through impedance 27, coding contact 80 of device CT, conductors 33 and 34 (interconnected at each of the intermediate locations II and III by a front contact 35 of a directional stick relay ES later to be described), back contact 30 of relay PA, conductor 25, the primary of transformer TTE, and conductor 31 back to the power source terminal B.

With respect to governing eastbound traffic through the A. P. B. track stretch of Figs. 1a–d, therefore, the disclosed arrangement of eastbound track circuits is capable of controlling the wayside signals SE in the usual automatic block system manner and hence it is effective to provide the desired following protection for all eastbound train moves. In a later portion of the specification this following protection will be discussed more fully.

*Control of westbound signals*

The "westbound" or "feed back" track circuits that previously were described for the several signal block sections into which the track stretch of Figs. 1a–e is divided similarly form a part of a "polar code" system which controls the westbound wayside signals SW for that stretch in customary automatic block manner. As illustratively represented (in the composite diagram of Fig. 1), this polar code system of westbound signal control is of the three indication variety; it is operated by the "westbound" or "feed back" trackway codes of Figs. 3a–c (that selectively are supplied to the circuit rails at the west end of each section); and at the east end of each section it makes use of decoding apparatus which governs the indication of the signal SW at that location and which selects the polarity of the westbound track circuit energy that is supplied to the track section to the east.

At each signal location this westbound decoding apparatus includes three slow release relays, DW, HW and TP, which are there controlled by the two westbound track relays TW and TW1. The first of these slow release relays DW is a "distant" decoding device and it is energized over a front contact 15 of the first track relay TW; the second slow release relay HW is a "home" decoding device and it is energized over a front contact 16 of the second track relay TW1; and the third slow release relay TP is a "code detecting" device and it is governed by all four of the relays TW, TW1, DW and HW through the medium of contacts 15, 16, 38 and 39 thereof.

All of these contacts operate in circuits by way of which the windings of the three named slow release relays are energized from a source that is designated by the terminals "plus" and "minus." The release retardation of each of the decoding relays DW and HW is sufficient to span the "off" periods of the "westbound" codes of Fig. 3 while that of the code detecting relay TP is chosen to be slightly longer still. The just stated relation enables the named relays to cooperate in performing an A. P. B. control function later to be described.

When (at a given location) either the "westbound clear A" code of 180 "given polarity" energy pulses per minute or the "westbound clear B" code of 80 "given polarity" pulses per minute is received from the westwardly extending track section, the first (positive polar) westbound track relay TW responds in the manner already explained by the description of Fig. 5. In the former instance (reception of "westbound clear A" code), each pulse of that "given" polarity energy is transmitted from the section rails to the relay TW through transformer TTE and by way of a circuit that extends from the right terminal of the lower winding of transformer TTE through conductor 25, front contact 30 of relay PA, front contact 26 of relay HE, conductor 28, the back point of coding contact 180 of device CT, conductor 40, the control winding of relay TW, the control winding of relay TW1, and conductors 41 and 31 back to the left terminal of the transformer winding; in the latter instance (reception of "westbound clear B" code) the transmission to relay TW is by way of a corresponding circuit which includes back contact 30 of relay PA, conductor 34 (and front contact 35 of relay ES and conductor 33 at each of the intermediate locations II and III) and the back point of coding contact 80.

Each of the resulting recurrent pick-ups of the westbound track relay TW (positive polar) completes for the "distant" decoding relay DW an energizing circuit which extends from the positive supply terminal (by way of a back contact 42 of relay ES and conductor 43 at each of the intermediate locations II and III) through front contact 15 of relay TW, conductor 44, and the winding of relay DW back to the negative supply terminal. Due to its slow releasing characteristics, relay DW maintains its contacts continuously picked up under the stated conditions.

In releasing during each "off" period of the received "westbound clear" code, the positive polar track relay TW now completes for the code detecting relay TP an energizing circuit which may be traced from the same positive supply terminal through back contact 15, conductor 46, front contact 38 of relay DW, back contact 39 of relay HW, conductor 47 and the winding of relay TP back to the negative supply terminal. Due to its slow releasing characteristics, relay TP likewise maintains its contacts continuously picked up under the stated conditions.

When (at a given location) either the "westbound approach A" code of 180 "opposite polarity" energy pulses per minute or the "westbound approach B" code of 80 "opposite polarity" pulses per minute is received from the westwardly extending track section, the second (negative polar) westbound track relay TW1 responds, also in the manner previously explained by the description of Fig. 5. In the former instance (reception of "westbound approach A" code), each pulse of that "opposite" polarity energy is transmitted from the section rails to the relay TWI through transformer TTE and by way of a circuit that extends from the left terminal of the lower winding of transformer TTE through conductors 31 and 41, the control winding of relay TWI, the control winding of relay TW, conductor 40, the back point of coding contact 180 of device CT, conductor 28, front contacts 26 and 30 of relays HE and PA, and conductor 25 back to the right terminal of the transformer winding; in the latter instance (reception of "westbound approach B" code), the transmission to relay TWI is by way of a corresponding circuit which includes the back point of coding contact 80, (conductor 33 and front contact 35 of relay ES at each of the intermediate locations II and III), conductor 34 and back contact 30 of relay PA.

Each of the resulting recurrent pick-ups of the westbound track relay TWI (negative polar) completes for the "home" decoding relay HW an energizing circuit which extends from the positive supply terminal (by way of back contact 42 of relay ES and conductor 43 at each of the intermediate locations II and III) through front contact 16 of relay TWI, conductor 49, and the winding of relay HW back to the negative supply terminal. Due to its slow releasing characteristics, relay HW now maintains its contacts continuously picked up.

In releasing during each "off" period of the received "westbound approach" code, the negative polar track relay TWI now completes for the code detecting relay TP an energizing circuit which may be traced from the same positive supply terminal through back contact 16, conductor 50, front contact 39 of relay HW, back contact 38 of relay DW, conductor 47, and the winding of relay TP back to the negative supply terminal. Due to its slow releasing characteristics, relay TP likewise maintains its contacts continuously picked up under the stated conditions.

It will thus be evident that: (1) when neither of the westbound track relays TW and TWI is following code, all three of the relays DW, HW and TP are deenergized and hence released; (2) when the positive polar track relay TW is responding to coded energy, relays DW and TP are recurrently energized and thereby caused to hold their contacts continuously picked up; and (3) when the negative polar track relay TWI is responding to coded energy, relays HW and TP are similarly caused to hold their contacts continuously picked up.

In determining the aspect which is displayed by the associated westbound signal SW, the two decoding relays DW and HW and the code detecting relay TP make use of contacts 51, 52 and 53 that are included in circuits by the way of which the three lamps G, Y and R of that signal selectively receive lighting current (from a source designated by the terminals "plus" and "minus").

When trackway energy of either of the "westbound clear" codes is being received (from the westbound track circuit) and relays DW and TP are picked up, lamp G is lighted over a circuit which includes front contact 53, a conductor 54, front contact 51 and a conductor 55; when the track circuit transmits energy of either of the "westbound approach" codes to its east end and thereby causes relays HW and TP to be picked up, lamp Y then receives lighting current over front contact 53, conductor 54, back contact 51, front contact 52 and a conductor 56; and when no energy is responded to by the westbound track relays TW and TWI and all three of the relays DW, HW and TP are released, lamp R then is lighted over a circuit that includes back contact 53 and a conductor 57.

The three westbound code responsive relays DW, HW and TP at the east end of each track section also cooperate to select the polarity of the coded westbound track circuit energy which is supplied to the west end of the track section that adjoins to the east. The referred to energy is (as already indicated) of one or another of the "westbound" codes of Figs. 3a–c; it is transmitted to the eastwardly extending track rails 1 and 2 over a circuit which includes the track transformer TTW and the back contact 9 of the eastbound track relay TR at the transformer location; and polarity selection therefor is effected by contacts 59, 60 and 61 of the three relays first named above.

Under the before-described (in connection with Fig. 5) control of the coding contact 9 of the eastbound track relay TR for the same section, the "on" periods of each "westbound" code that is supplied to the rails of a particular track section coincide with the "off" periods of the corresponding "eastbound" code to which the relay TR is responding. Accordingly, (and as is represented in the views of Fig. 3) the "westbound clear A" and the "westbound approach A" codes for each section of track in the A. P. B. stretch of Figs. 1a–d consist of 180 energy pulses per minute each of which coincides with an "off" period of the 180 pulse per minute "eastbound clear" code; the "westbound clear B" and the "westbound approach B" codes are made up of 80 energy pulses per minute each of which coincides with an "off" period of the 80 pulse per minute "eastbound approach" code; and both of the "westbound detection" codes consist of 20 energy pulses per minute, each of which pulses coincides with an "off" period of the "eastbound detection" code.

Because, moreover, of the before explained functioning in each of the westbound rail supply circuits of contact 64 of the eastbound track relay repeater P, the "on" periods of the several "westbound" codes are all made of the same length (see the various views of Figs. 3a–c). As previously stated (in connection with the simplified showing of Fig. 5), this relay P is a code following device having a release delay that is slightly less than the duration of the "off" periods of the fastest or 180 energy pulse per minute signal control code.

Each time that front contact 8 of the associated track relay TR completes the energizing circuit for relay P, the latter device picks up and there stays during the eastbound code "on" period and until very near the end of the eastbound code "off" period which follows. In then releasing, contact 64 of relay P breaks the westbound rail supply circuit and thus terminates the "on" period of the westbound code at the end of the same interval regardless of whether that code is of the "clear A," "clear B," "approach A," "approach B," "detection A" or "detection B" variety.

When, now energy of any one of the "westbound clear" and "westbound approach" codes is being received (from the rails of the track section to the west) by the westbound track relays TW and TWI at a particular location, the code detecting relay TP and one or the other of the decoding relays DW and HW at the same location is picked up; under that condition the contacts 59, 60 and 61 of those relays set up for the transformer TTW (at the same location) an energizing circuit by way of which the rails of the adjoining track section to the east receive "given" polarity energy (from source B—C) during each "off" period of the particular "eastbound" code to which the track relay TR (at the west end of that eastwardly extending section) is responding.

If either of the "westbound clear" codes ("given polarity" energy ) is being received (by the westbound track relays TW and TW1) as above, the circuit referred to in the preceding paragraph extends from a terminal B through conductor 62, front contact 59 of relay DW, back contact 60 of relay HW, front contact 61 of relay TP, conductor 63, the back point of coding contact 9 of track relay TR, a front contact 64 of relay P, conductor 65, a current limiting impedance 66, and the primary of track transformer TTW back to supply terminal C; if either of the "westbound approach" codes ("opposite polarity" energy) is being received as above, then the circuit just traced is modified to the extent of including front contact 60 of relay HW instead of front contact 59 of relay DW and the back point of contact 60.

During those times, under the conditions outlined in the two preceding paragraphs, that the eastbound track relay TR is responding to the "eastbound clear" code of 180 energy pulses per minute, the rails of the eastwardly extending track section thus are supplied with westbound track circuit energy of the "westbound clear A" code (Fig. 3a) of 180 "given polarity" energy pulses per minute; similarly during those times that the relay TR is responding to the slower "eastbound approach" code, the section rails then receive westbound track circuit energy of the "westbound clear B" code (Fig. 3b) of 80 "given polarity" energy pulses per minute.

In the event that no coded energy (or energy of one of the 20 pulse per minute "westbound detection" codes) is being received by the westbound track relays TW and TW1 (at the east end of the westwardly extending track section), all three of the relays DW, HW and TP are released; under such conditions contact 61 sets up for the transformer TTW an energizing circuit by way of which the rails of the adjoining track section to the east are supplied (from power source NX—C) with "opposite polarity" energy during each "off" period of the particular "eastbound" code to which the track relay TR (at the west end of that eastwardly extending section) is responding. This circuit may be traced from the terminal NX through conductor 67 (connected with the terminal at each of the intermediate locations II and III over a front contact 68 of a directional stick relay WS later to be described), back contact 61 of relay TP, conductor 63, the back point of coding contact 9 of track relay TR, front contact 64 of relay P, conductor 65, impedance 66, and the primary of transformer TTW back to the terminal C.

During those times, under the conditions outlined in the preceding paragraph, that the eastbound track relay TR is responding to the "eastbound clear" code of Fig. 3a, the rails of the eastwardly extending track section will be supplied with westbound track circuit energy of the "westbound approach A" code (Fig. 3a) of 180 "opposite polarity" energy pulses per minute; similarly during those times that relay TR responds to the slower "eastbound approach" code those same rails will receive westbound track circuit energy of the "westbound approach B" code (Fig. 3b) of 80 "opposite polarity" energy pulses per minute.

It will thus be evident (again refer to the simplified track circuit diagram of Fig. 5) that: (1) when either one of the two westbound track relays TW (positive polar) and TW1 (negative polar) is responding to "westbound" code energy (transmitted thereto over the rails of the section to the west), the associated code detecting relay TP will be picked up and the rails of the section to the east then will be supplied (over front contact 61) with westbound track circuit energy of one of the several "positive polar" westbound codes of Figs. 3a–c; and (2) when neither of the westbound track relays TW and TW1 is following code, the associated relay TP will be released and the rails of the section to the east then will receive (over back contact 61) westbound track circuit energy of one of the several "negative polar" westbound codes of Figs. 3a–c.

From the foregoing, therefore, it will be seen that with respect to governing westbound traffic through the A. P. B. track stretch of Figs. 1a–d, the disclosed arrangement of westbound track circuits controls the wayside signals SW in the usual automatic block system manner and thus is effective to provide the desired following protection for all westbound train moves. In a later portion of the specification this following protection is discussed more fully.

Attention will next be directed to the herein disclosed facilities whereby the control winding of each of the impedance transformers TX is bypassed at proper times and open circuited at other times for the purpose of rendering the associated eastbound or "master" track relay TR (at the section west end) responsive only to coded energy that is supplied (by way of the transformer TTE) to the trackway at the section master or east end.

As previously pointed out, the function of transformer TX is to introduce a comparatively high value of added impedance into the track relay pick-up circuit each time that the section rails receive a pulse of westbound or "feed back" code energy (by way of the track transformer TTW). As has also been pointed out, moreover, this added impedance is introduced in pick-up preventing value only when the secondary or control winding of the transformer TX is open circuited.

Reference to each signal location portion of the composite diagram of Fig. 1 will show that the TX transformer secondary is so open circuited from before the beginning until after the ending of each pulse (or "on" code period) of the westbound track circuit energy which the transformer TTW transmits to the rails. As has been pointed out, this transmission results (under vacant track section conditions) from transformer TTW receiving exciting current over a circuit that includes the back point of contact 9 of the track relay TR and front contact 36 of the associated slow release repeater relay P.

These same contacts, together with a contact 92 of the companion or code detecting relay PA, are also included in by-passing circuits for the TX transformer secondary where they function to keep those circuits open during the just named westbound code "on" periods (which occur during the "off" periods of the received eastbound code). At all other times, however, one of the by-passing circuits just referred to is closed for the purpose of enabling the track relay TR to follow all received pulses of eastbound track circuit energy in the same manner as were the transformer TX not included in the relay pick-up circuit.

Under vacant track section conditions this shunting of the TX transformer secondary (during the "on" periods of the received eastbound code) is effected over one or the other of two different by-pass circuits. The first of these circuits is completed (by repeater relay P) at the end of each westbound code "on" period and prior to the beginning of the immediately following eastbound code "on" period and may be traced from the upper terminal of the TX transformer secondary through conductor 65, back contact 64 of relay P, conductor 103, front contact 92 of relay PA, and conductors 105 and 106 back to the lower terminal of the transformer secondary; the second by-pass circuit just referred to is completed (by track relay TR) from the instant of track relay pick-up until the instant of track relay release and it may be traced from the upper terminal of the TX transformer secondary through conductor 65, front contact 64 of relay P, front contact 9 of relay TR, and conductor 106 back to the lower terminal of the same secondary.

Since the release delay of repeater relay P is chosen to be less than the length of the shortest eastbound code "off" period, it will be seen that the first by-pass circuit just traced is completed prior to (and at) the beginning of each "on" period of the received eastbound code and that the same circuit continues intact until the track relay TR picks up repeater relay P over front contact 8. When that happens, contact 64 of relay P: (1) breaks the first traced by-pass circuit and (2) completes (practically at the same instant) the second traced by-pass circuit; this keeps the impedance at transformer TX low throughout the entire length of each "on" period of received eastbound code.

*Directional protection*

For each stretch of single track between passing sidings the portions of my new A. P. B. system that have been described so far thus include: (a) an eastbound system of automatic block signaling that is operated by "frequency code" energy transmitted over the track section rails in the direction of from east to west; (b) a westbound system of automatic block signaling that is operated by "polar" code energy transmitted over the same section rails but in the direction of from west to east; and (c) synchronizing means which cause the "on" periods of the "polar code" energy to coincide with the "off" periods of the "frequency code" energy and vice versa.

In order that a train which enters either end of the A. P. B. stretch of single track will automatically establish its own directional protection therethrough, the complete system of my invention further includes facilities whereby advancement of the leading vehicle of the train past the entering headblock location (I or IV of Figs. 1a–d) successively conditions the opposing track circuits ahead in such manner as to set the signals for opposing traffic at "stop."

Figure 1B:
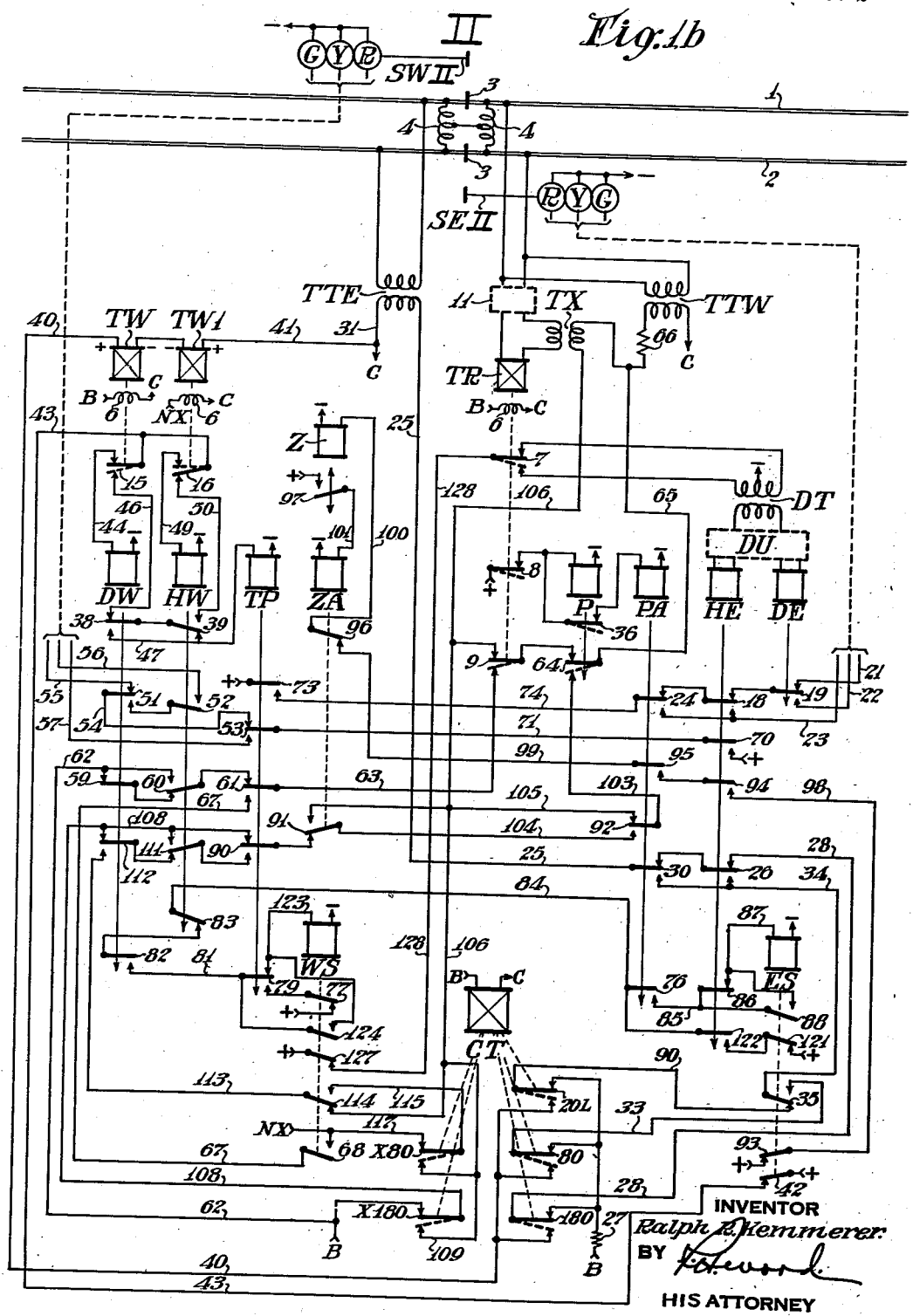
Figure 1C:
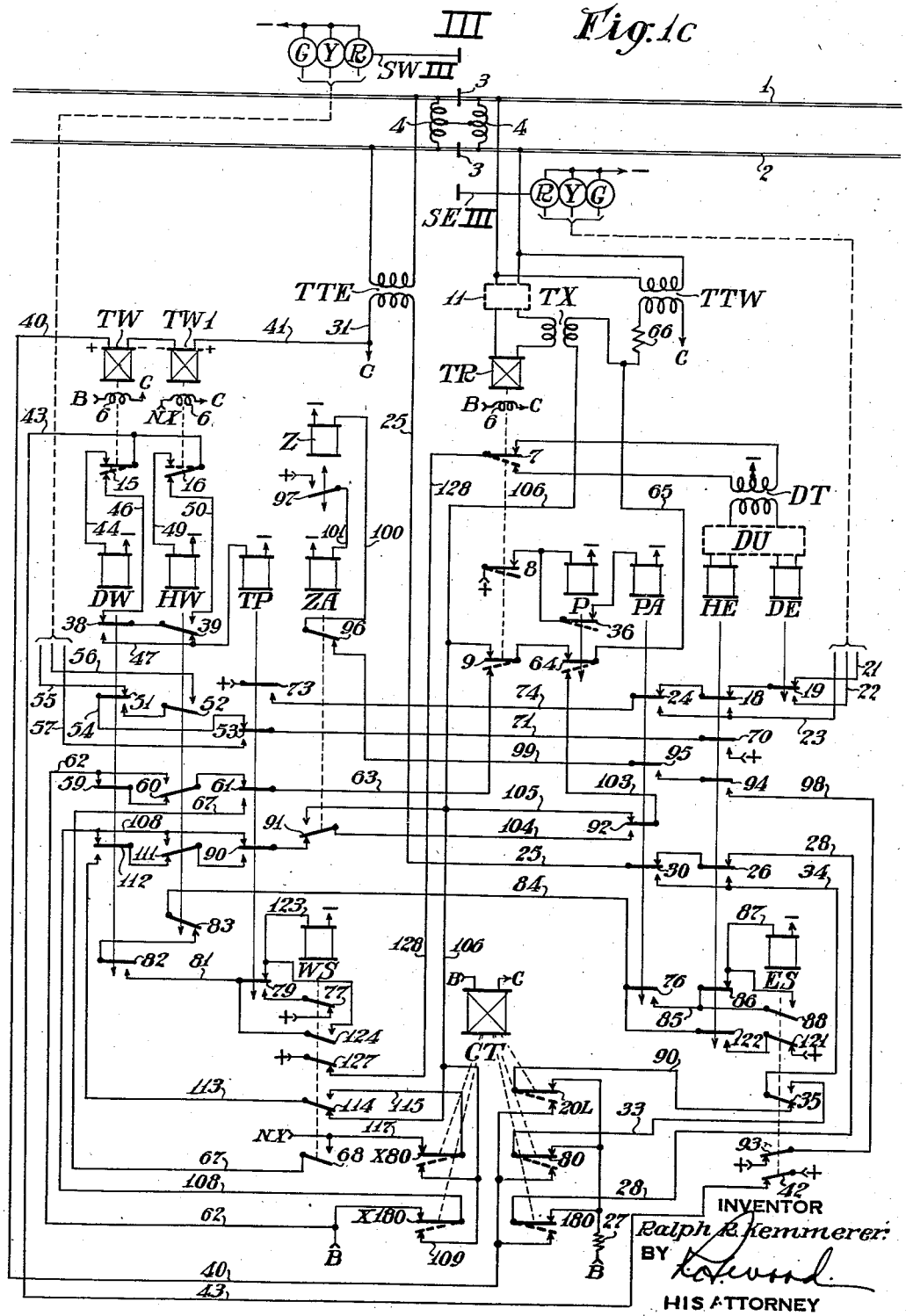
Figure 1D:
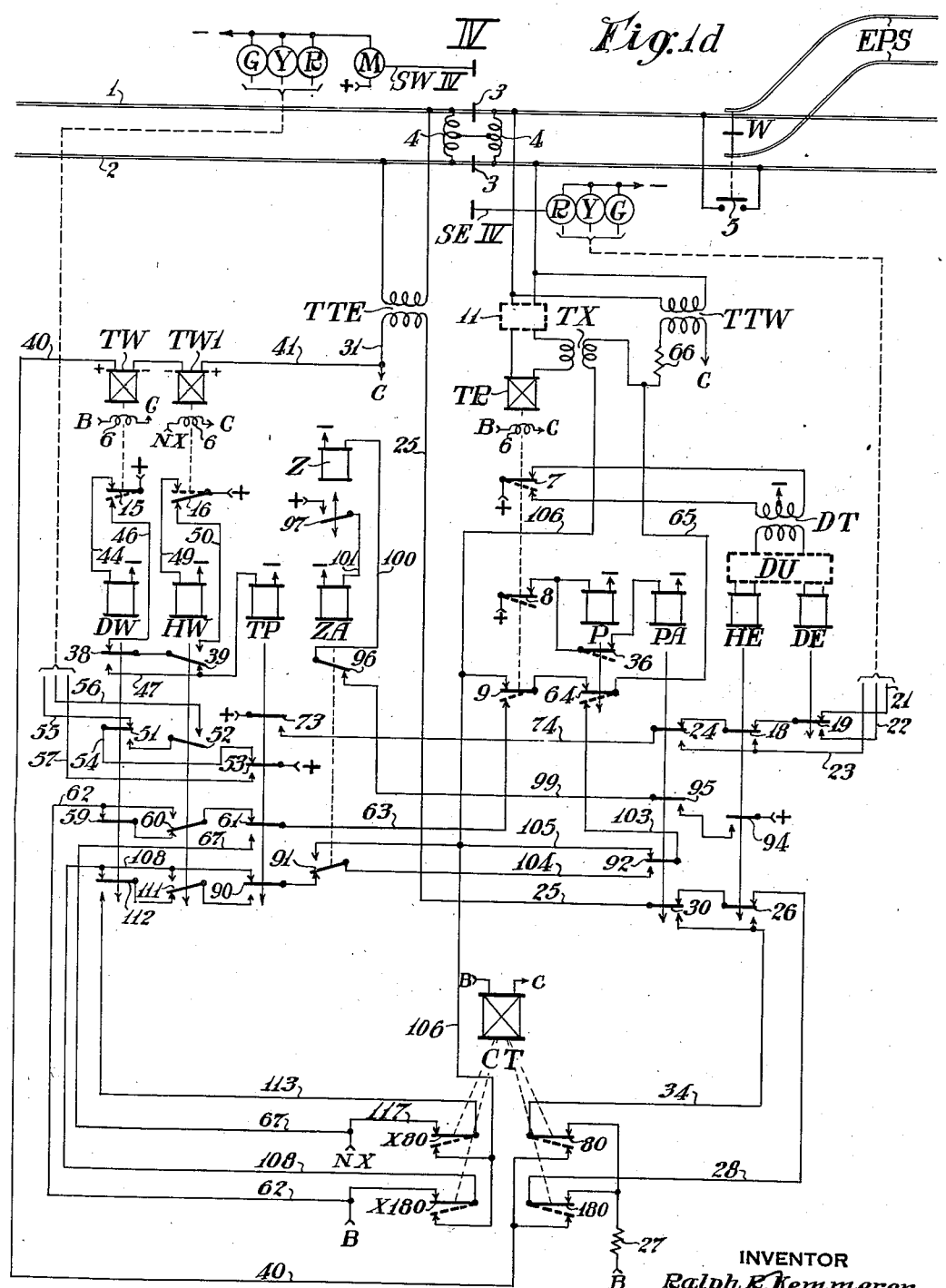

Aiding in this successive conditioning are the directional stick relays ES and WS that previously were referred to as forming a part of the equipment at each of the intermediate signal locations II and III. These stick relays are controlled in customary A. P. B. manner over local (non-line-wire) energizing circuits later to be described and both of them (at each location where installed) are deenergized and stay released (as shown in Figs. 1b–c) as long as the A. P. B. stretch of single track remains vacant.

Under such vacant conditions of the entire length of the stretch, moreover: (1) the rails of each of the several sections therein repeatedly transmit first a pulse of "eastbound clear" (180 pulse per minute) code energy in the direction of from east to west and then a pulse of "westbound clear A" (positive polar) code energy in the direction of from west to east; (2) at the west end of each section the eastbound decoding apparatus is by the energy there received conditioned to cause the eastbound signal SE which it controls to display the green or "clear" indication; and (3) the westbound decoding apparatus at the east end of each section is similarly conditioned to cause the westbound signal SW which it controls also to display the green or "clear" indication. In consequence, the eastbound and the westbound headblock signals SEI and SWIV (at the two ends of the stretch) both now show "clear" as represented in the upper portion of Fig. 8.

Under the named vacant conditions of the track stretch, in addition, the green lamp or "clear" indication circuits for all of the remaining devices (SEII, SEIII, SEIV, SWI, SWII and SWIII) of the system are also set up; they are not, however, completed for the reason that each of those remaining signals is provided with approach lighting facilities which cause them now to stay dark, as is also shown in Fig. 8.

For each approach governed westbound signal SW those approach lighting facilities take the form of a circuit that includes a back contact 70 of the eastbound decoding relay HE and a conductor 71; for each approach governed eastbound signal SE the named facilities comprise a corresponding circuit which includes a back contact 73 of the westbound code detecting relay TP and a conductor 74. These approach lighting circuits perform the usual functions of approach control; that is, each allows the governed signal to remain dark at all times except when the display of an indication is actually needed to advise an approaching train of the conditions of the track ahead.

In this way the power which the signals consume is reduced and the term of service of the signal lamps is prolonged. In situations, however, where these measures are not required, the lamp lighting circuits for all of the westbound signals SW may be simplified by connecting the heel of contact 53 of relay TP directly to the "plus" supply terminal in the manner shown at location IV; likewise, the supply circuits for all of the eastbound circuits SE may similarly be simplified by connecting the heel of contact 24 of relay PA directly to the "plus" terminal as shown at locations I and V.

To explain how the previously mentioned stick relays ES and WS function in conjunction with the rest of the system under occupied conditions of the single track, an eastbound train move will first be traced through the A. P. B. stretch and following this a similar tracing of a westbound train move will be made.

*Eastbound train moves*

An eastbound train approaching the vacant A. P. B. stretch from the west finds the signals set as represented in the upper portion of Fig. 8 and thus gets a "clear" indication from eastbound device SEI at the headblock location I. As the train enters the section that is to the immediate west of that location, it shunts the rails of that section and deenergizes both of the westbound track relays TW and TWI at location I; that action causes all three of the associated relays DW, HW and TP to occupy the released position; and that release (1) sets up (at contact 53 of relay TP) the red or "stop" indication circuit for westbound signal SWI and (2) transfers (at contact 61 of relay TP) from the "given polarity" terminal B to the "opposite polarity" terminal NX the connection over which polar code is supplied to the westbound track circuit of section I—II. Meanwhile, the eastbound headblock signal SEI continues to show "clear."

The above stated transfer of polar code supply connection (at location I) now causes the rails of section I—II to transmit negative polar code ("westbound approach A" of Fig. 3a) eastwardly to the westbound track relays TW and TWI at location II. In there following this code, relay TWI causes the associated relays HW, DW and TP to set up (over front contact 52, back contact 51 and front contact 53) the yellow or "approach" indication circuit for westbound signal SWII and to continue (at contact 73) the eastbound signal SEII deenergized. Concurrently: (1) at location II the rails of section II—III continue to be supplied with energy of the "westbound clear A" (positive polar) code (from terminal B over front contact 60 of relay HW; (2) at location III the reception of this positive polar code continues the "clear" indication set up for westbound signal SWIII; and (3) at location IV the "clear" indication showing by the westbound headblock signal SWIV is similarly continued.

As the leading vehicle of the eastbound train passes location I and shunts the rails of section I—II, the eastbound track relay TR at location I becomes deenergized and there releases all four of the relays P, PA, HE and DE; this release puts the eastbound headblock signal SEI at "stop" (by completing the red lamp circuit therefor over back contact 24 of relay PA) and also completes (over back contact 70 of relay HE) the previously set up "stop" circuit for the westbound circuit SWI. The same rail shunting (of section I—II) cuts off transmission of polar code to the westbound track relays TW and TWI at location II and causes the there associated relays DW, HW and TP all to release. Contact 73 of relay TP now completes the previously set up "clear" indication circuit for eastbound signal SEII; contact 53 of that relay sets up the "stop" indication circuit for westbound signal SWII; and contact 61 of the same device removes from the "given polarity" terminal B the connection over which polar code is supplied to the westbound track circuit for section II—III.

The thus removed polar code supply connection at location II is not, however, transferred to the "opposite polarity" terminal NX (as was the case at location I) for the reason that contact 68 of the still released directional stick relay WS is interposed between that terminal and the back point of contact 61. In consequence, the westbound track circuit for section II—III now becomes deenergized. This deenergization renders both of the westbound track relays TW and TWI at location III inactive and releases the associated relay TP. In dropping out, contact 73 of that relay completes the normally set up "clear" indication for eastbound signal SEIII; contact 53 sets up the "stop" indication circuit for westbound signal SWIII; and contact 61 removes from the "given polarity" terminal B the connection over which polar code is supplied to the westbound track circuit for section III—IV.

As was the case at location II, this removed connection (at location III) is not transferred to the "opposite polarity" terminal NX for the reason that released contact 68 of the directional stick relay WS here again is interposed between that terminal NX at the back point of contact 61. In consequence, the westbound track circuit for section III—IV also becomes deenergized. At headblock location IV this deenergization renders both of the westbound track relays TW and TWI inactive and thereby releases the associated relay TP. In dropping out, contact 73 of that relay completes the normally set up "clear" indication circuit for the eastbound signal SEIV and contact 53 completes the red lamp circuit for westbound headblock signal SWIV.

The resulting display of "stop" by the latter signal warns approaching westbound traffic that an eastbound train has entered the west end of the A. P. B. stretch and is proceeding therethrough; it constitutes the beforementioned directional protection for eastbound train moves; and, as, has been seen, it is provided without the aid of line wires for signal control purposes. Once thus set up, moreover, the "stop" indication by signal SWIV is uninterruptedly continued as long as any part of the eastbound train remains in the A. P. B. stretch. That continuance results, as will be seen, from the fact that each advance of the train into a succeeding track section to the east does not disturb the previously effected deenergized condition of the westbound track circuit of that succeeding section.

Concurrently with the just described putting of signal SWIV at "stop," contact 61 of relay TP at location IV transfers from the "given polarity" terminal B to the "opposite polarity" terminal NX the connection over which polar code (westbound track circuit) energy is supplied to the rails of section IV—V. This transfer causes energy of the "westbound approach A" (negative polar) code to be transmitted to location V where: (1) westbound track relay TWI responds, (2) relays HW and TP pick up; and (3) the yellow or "approach" indication circuit for westbound signal SWV is by them set up.

As the trailing vehicle of the eastbound train clears location I the rails of the section to the immediate west thereof transmit the now received (from transformer TTE over back contact 30 of relay PA and coding contact 80 at location I) 80 pulse per minute "eastbound approach" code energy to the eastbound track relay TR at the next location to the west (not shown). There the associated decoding and other relays (again not shown): (1) condition the controlled eastbound signal to display the "approach" indication and (2) cause track circuit energy of the "westbound clear B" (positive polar) code to be supplied to the rails of the just mentioned section at the west end thereof. At location I the westbound track relays TW and TWI now receive that "westbound clear B" code from the above referred to section rails, relay TWI responds to that energy, the associated relays DW and TP are again picked up and by them the "clear" indication circuit for the westbound signal SWI is completed.

As the leading vehicle of the eastbound train passes location II and shunts the rails of section II—III, eastbound track relay TR at location II becomes deenergized and causes the release of all four of the relays P, PA, HE and DE at the same location. That release: (1) puts the eastbound signal SEII at "stop"; (2) completes (at contact 70) the previously set up "stop" circuit for the westbound signal SWII; and (3) picks up (at contact 76 of relay PA) the eastbound directional stick relay ES over a circuit that extends from the positive supply terminal through a back contact 77 of westbound stick relay WS, back contact 79 of relay TP, conductor 81, back contact 82 of relay DW, back contact 83 of relay HW, conductor 84, back contact 76 of relay PA, conductor 85, front contact 86 of relay HE, conductor 87 and the winding of relay ES back to the negative supply terminal.

This completion of the stick relay energizing circuit occurs between the instant that relay PA first releases and the somewhat later time that the more sluggish relay HE drops out. In picking up in response to that completion, the eastbound directional relay ES locks itself in over a stick contact 88 which by-passes the previously mentioned (in tracing the relay pick-up circuit) front contact 86 of relay HE as long as relay ES remains energized.

One result at location II of this pick-up of relay ES is to complete (at contact 35) a circuit by way of which the track transformer TTE at the same location is supplied with energy of the 80 pulse per minute "eastbound approach" code. This transformer supply circuit may be traced from terminal B through impedance 27, coding contact 89 (when in its uppermost position) of device CT, conductor 33, front contact 35 of relay ES, conductor 34, back contact 30 of relay PA, conductor 25, the primary of transformer TTE and conductor 31 back to supply terminal C.

Another result at location II of the pick-up of relay ES is to disconnect (at contact 42) the energizing circuit for the westbound relays DW, HW and TP from the positive terminal (from which they derive current by way of conductor 43) of their supply source. As long as relay ES remains picked up, those westbound relays are, in this manner, rendered unresponsive to code following operation of either of the track relays TW and TWI.

As the trailing vehicle of the eastbound train clears location II, the rails of section I—II transmit the just mentioned "eastbound approach" code (80 pulse per minute) from location II westwardly to the eastbound track relay TR at location I. At that location, relay TR responds and picks up relays PA and HE; those relays, in turn, now complete the "approach" indication circuit for the eastbound headblock signal SEI and also disconnect (at contact 70) the westbound signal SWI from its source of lamp lighting current.

Still further at location I the same response of relay TR causes pulses of polar code energy (in the number of 80 per minute) to be supplied through the westbound track transformer TTW (during the "off" periods of the track relay energizing code) to the rails of track section I—II. This energy is transmitted to the track transformer over back contact 9 of relay TR and front contact 64 of repeater relay P; under the assumed vacant condition of the track to the rear (contact 61 of relay TP picked up) it is of the "westbound clear B" (positive polar) code.

At location II the westbound track relay TW receives this positive polar code from the rails of section I—II and responds thereto in the usual manner. This response, however, does not pick up relay DW for the reason that the supply circuit for that relay (and also that for relay HW) is now broken by contact 42 (still picked up) of the eastbound directional stick relay ES. In consequence, the westbound signal SWII continues to display "stop" (circuit for lamp R thereof completed over back contact 53 of relay TP and back contact 70 of relay HE) and the eastbound signal SEII likewise continues to show the same indication.

As the leading vehicle of the eastbound train passes location III and shunts the rails of section III—IV, the eastbound track relay TR at location III becomes deenergized and causes the release of all four of the associated relays P, PA, HE and DE. That release at location III: (1) puts the eastbound signal SEIII at "stop"; (2) completes the previously set up "stop" circuit for the westbound signal SWIII; and (3) picks up (over contact 76 of relay PA) the eastbound directional stick relay ES over a circuit that is a duplicate of the one already traced for relay ES at location II.

As also was the case at location II, this completion at location III of the stick relay energizing circuit occurs between the instant that relay PA first releases and the somewhat later time that the more sluggish relay HE drops out; likewise, in picking up in response to that completion the relay ES at location III also locks itself in over a stick contact 88 which by-passes the later releasing front contact 86 of relay HE.

The just described pick-up of relay ES at location III: (1) establishes (at front contact 35) a circuit by way of which the track transformer TTE at the same location is supplied (over coding contact 89) with energy of the "eastbound approach" code and (2) disconnects (at contact 42) the pick-up circuits of the westbound relays DW, HW and TP from the positive terminal of their supply source. As at location II, the latter action renders the three named relays unresponsive to code following operation of either of the westbound track relays TW and TWI.

As the trailing vehicle of the eastbound train clears location III, the rails of section II—III transmit the just mentioned "eastbound approach" code (80 pulses per minute) from location III westwardly to the eastbound track relay TR at location II. In there responding, relay TR (1) picks up relays PA and HE and (2) causes the westbound track circuit for section II—III again to receive energy.

The just described pick-up of relays PA and HE at location II: (1) sets up (at contacts 24 and 18) the yellow or "approach" indication circuit for the eastbound signal SEII; (2) disconnects (at contact 70) the westbound signal SWII from its source of lighting current; and (3) breaks (at contact 76) the stick circuit for eastbound directional relay ES thereby causing that relay to release.

This release of relay ES at location II reconnects the pick-up circuit for relays DW, HW and TP with their energizing source; this, in turn, causes relays DW and TP to pick up in response to the code following operation of westbound track relay TW (produced by the before-mentioned polar code energy which is transmitted eastwardly over the rails of track section I—II); and contacts 51 and 53 of these relays TW and TP now set up for the westbound signal SWII the "clear" indication circuit (which for the time being is kept open at contact 70 of relay HE).

Still further at location II the previously mentioned response of relay TR causes pulses of polar code energy (in the number of 80 per minute) to be transmitted to the rails of track section II—III. As was the case at location I, this energy is of the "westbound clear B" (positive polar) code and the pulses thereof are supplied (during the "off" periods of the eastbound track relay energizing code) from terminal B over back contact 9 of relay TR and front contact 64 of relay P and through transformer TTW.

At location III this polar code energy is received from the rails of section II—III where the westbound track relay TW responds thereto. As, however, was the case at location II, this response does not pick up relays TW and TP for the reason that the supply circuits therefor are now broken at contact 42 of directional stick relay ES. In consequence, the westbound signal SWIII continues to display "stop" and the eastbound signal SEIII likewise continues to show the same indication.

As the leading vehicle of the eastbound train passes location IV, the accompanying shunt of the rails of section IV—V deenergizes: (1) the eastbound track relay TR at location IV and (2) the westbound track relays TW and TW1 at location V. At location IV the first named action releases all four of the relays P, PA, HE and DE and this, in turn, puts the eastbound headblock signal SEIV at "stop" and establishes (at contact 30 of relay PA) a circuit by way of which the track transformer TTE at the same location receives (over contact 80 of device CT) energy of the 80 pulse per minute "eastbound approach" code. Meanwhile, the westbound headblock signal SWIV continues to display "stop" (as a result of contact 53 of relay TP remaining released) while at the advance location V the action that was second named above releases relays DW, HW and TP and thereby causes (at contact 53) the westbound signal SWV to shift its indication from "approach" to "stop."

As the trailing vehicle of the eastbound train clears location IV, the rails of section III—IV transmit the just mentioned "eastbound approach" code energy from location IV westwardly to the eastbound track relay TR at location III. In there responding to that energy that relay TR picks up relays P (intermittently), PA and HE at location III and now causes those relays to: (1) set up for the eastbound signal SEIII the yellow or "approach" indication circuit (which for the time being is kept open at contact 73 of relay TP); (2) disconnect (at contact 70 of relay HE) the westbound signal SWIII from its energizing source; and (3) release the eastbound directional stick relay ES by breaking (at contact 76 of relay PA) the energizing circuit for that relay.

This release of relay ES at location III reconnects (at contact 42) the pick-up circuits for relays DW, HW and TP with their energizing source; that, in turn, causes relays DW and TP to pick up in response to the code following operation of westbound track relay TW (produced by the beforementioned polar code energy which is transmitted eastwardly over the rails of track section II—III). In consequence, relays DW and TP now set up (at contacts 61 and 53) the "clear" indication circuit for the westbound signal SWIII.

Still further at location III the beforementioned response of relay ES causes polar code energy to be transmitted to the rails of track section III—IV. As was the case at location II, this energy is of the "westbound clear B" code and the 80 given polarity pulses per minute thereof are supplied over back contact 9 of relay TR and through transformer TTW. In responding to this westbound track circuit energy, relay TW at location IV acts through relays DW and TP now to cause (at contacts 61 and 53) the westbound headblock signal SWIV to go to "clear."

Meanwhile, at this location IV the eastbound signal SEIV continues to display "stop" (under the control of the still deenergized eastbound track relay TR). To the west at location III, however, the restored supply of trackway energy ("eastbound approach" code) operates through the corresponding relay TR to cause the controlled eastbound signal SEIII to shift its indication from "stop" to "approach" and also to cause the rails of section II—III to the west to receive energy of the "eastbound clear" (180 pulse per minute) code. At location II (and at the remote end of each succeeding section of vacant track to the west) that "eastbound clear" code similarly operates through relay TR to condition the controlled eastbound signal SE for the "clear" indication display.

Having thus proceeded completely through the first stretch of single track (that includes locations I to IV of the composite diagram of Fig. 1) and into the section to the immediate east of location IV, the above referred to eastbound train now occupies the same position with respect to the partially represented second stretch of single track (of which location V marks the west end) as it did with reference to the first stretch when it was within the section to the immediate west of location I. Were, therefore, this eastbound train to travel on into and through this second stretch (assuming it also to be vacant), the train would cause A. P. B. signaling facilities (that are a duplicate of those herein disclosed for the first stretch) to repeat the series of eastbound directional protection operations that have just been described.

As an introduction to a similar explanation of how westbound directional protection is obtained, it will next be assumed that this eastbound train is switched upon the passing siding EPS (of Figs. 1d–e) for the purpose of freeing the main track 1—2 to carry opposing or westbound trains into the east end (location IV) of the A. P. B. stretch of Figs. 1a–d. Such a switching movement is, of course, preceded by the usual shifting of the track switch W of the siding west end to the "take siding" position; this causes the switch contact 5 to shunt the rails of section IV—V and thereby deenergize the eastbound track relay TR at the section west end and the westbound track relays TW and TW1 at the section east end. The former action sets up the red or "stop" indication circuit for eastbound signal SEIV, while the latter similarly sets up the "stop" circuit for westbound signal SWV.

Once all of the vehicles of the eastbound train are upon the passing siding EPS, the switch W is returned to the illustrated "through traffic" position. Contact 5 now removes the shunt from the rails of section IV—V; the associated eastbound track relay TR and westbound track relays TW and TW1 again resume normal operation; and both of the signals SEIV and SWV are once more restored to the "clear" indication set-up of their lamp circuits.

Westbound train moves

Before explaining the signal control operations that result from the passage of a westbound train through the single track stretch of Figs. 1a–d, some preliminary description will first be given of those portions of my new system which thus far have been referred to only generally and which come into action only during westbound train moves. Such system portions include: (1) the previously mentioned "detection code" contact 20L of the code transmitter CT at each of the intermediate locations II and III; (2) companion auxiliary "signal code" contacts X180 and X80 on all of the transmitters CT in the system; (3) auxiliary relays Z and ZA also at all signal locations; and (4) certain special circuits over which the several impedance transformers TX are by-passed at proper times.

As was previously explained in an earlier portion of this specification, the contact 20L of each of the intermediate location code transmitters CT is arranged in any convenient manner (such as that shown in Fig. 4c) to produce the "eastbound detection" code of Fig. 3c. As there illustratively shown, this code is made up of regularly recurring cycles (in the number of 20 per minute) each of which consists of a relatively long "on" period (approximately 2 and $\frac{7}{10}$ seconds) followed by a much shorter "off" period (approximately $\frac{3}{10}$ second). Incident to the provision of westbound directional protection (later to be described), this code is utilized (together with one of the "westbound detection" codes of Fig. 3c) to hold the westbound signals SW ahead of the westbound train at "proceed" while keeping the opposing eastbound signals SE at "stop."

The above-mentioned "signal code" contacts X180 and X80 form a part of each and every one of the code transmitters CT in the A. P. B. system. Through facilities such as are shown in Figs. 4a and 4b, these auxiliary contacts are at all times operated in synchronism with the earlier described main coding contacts 180 and 80 that produce the "eastbound clear" and the "eastbound approach" codes of Figs. 3a and 3b.

When the track section to the east of the transmitter location becomes occupied by a westbound train, one or the other of these auxiliary contacts X180 and X80 acts as the coding member in a circuit over which the occupied section is supplied (at its west end) with special "polar frequency" energy that is suitable for controlling train carried cab signals of the conventional character represented in Fig. 6. This energy is derived either from the terminals B and C or from the terminals NX and C and in all cases is transmitted to the section rails by way of the westbound track transformer TTW.

As will be explained more fully presently, both the polarity and the frequency of the recurring pulses of this special cab signal energy are determined by the traffic conditions in the section to the west of the supply location. At times the cab signal code is made up of 180 pulses per minute of "given" polarity energy transmitted to transformer TTW over a circuit that extends from supply terminal B through coding contact X180 (when in its uppermost position), conductor 108, front contact 90 of relay TP, back contact 91 of relay ZA, conductor 104, back contact 92 of relay PA, conductor 103, back contact 64 of relay P, conductor 65, impedance 66 and the primary of transformer TTW back to supply terminal C; at other times the cab signal code is made up of 80 pulses of "opposite" polarity energy per minute supplied over a circuit similar to the one just traced but modified to extend from supply terminal NX through conductor 117, coding contact X80 (when in its uppermost position), conductor 113 (interconnected at each of the intermediate locations II and III with contact X80 by way of front contact 114 of relay WS and a conductor 115), back contact 112 of relay DW, back contact 111 of relay HW, back contact 90 of relay TP and thence to transformer TTW by way of back contact 91 of relay ZA as in the circuit before traced.

Regarding relays Z and ZA, these devices also form a part of the equipment at each and every one of the signal locations in the system. At each location the function of these relays is to assure (under the action of contact 91 in the just traced cab signal code supply circuit) that the cooperating eastbound and westbound track circuits for the track section to the east will properly reset and synchronize themselves: (1) after a westbound train has passed out of the section under normal conditions of operation of the system or (2) under out-of-the-ordinary conditions following either an interruption in the power from source B—C—NX or a temporary shunt (by means other than a train) of the section rails.

Relay ZA is an ordinary repeating device for relay Z. Relay Z, however, is designed to be slow acting in both the pick-up and drop-out directions. For purposes to be made evident in a later description (of the train carried cab signal circuits of Fig. 5 and of certain resetting characteristics of the eastbound and the westbound track circuits of the system), the period of pick-up delay for relay Z preferably is of the order of 2½ seconds and the period of release delay for the same relay is of the order of $1\frac{1}{10}$ seconds.

Current for energizing this slow responding relay Z is transmitted (from a local source designated by the terminals "plus" and "minus") over a pick-up circuit that is completed whenever relays ES, HE, PA and ZA are all released. At each of the intermediate locations II and III this circuit may be traced from the positive supply terminal through back contact 93 of relay ES, conductor 98, back contact 94 of relay HE, back contact 95 of relay PA, conductor 99, back contact 96 of relay ZA, conductor 100 and the winding of relay Z back to the negative supply terminal. At each of the headblock locations I, IV and V (where relay ES is not present), the above traced circuit is simplified by an elimination therefrom of contact 93 of relay ES. When included in the circuit that contact serves to render relays Z and ZA inactive when either of the track sections adjoining at the location of the relays is occupied by an eastbound train.

Relay Z, in turn, is provided with a contact 97 which controls the energization of the associated repeater relay ZA. Each time that this contact is in the uppermost position it picks up relay ZA over a circuit that extends from the positive supply terminal through front contact 97, conductor 101 and the winding of relay ZA back to the negative supply terminal.

At a particular location a simultaneous release of relays ES, HE and PA causes the associated relays Z and ZA to operate in the following manner. Approximately 2½ seconds following the initial completion of its energizing circuit, slow responding relay Z picks up and causes the repeater relay ZA also to be energized. That relay ZA responds at once and in picking up contact 96 thereof breaks the energizing circuit for relay Z. Approximately 1 1/10 seconds later relay Z releases and in so doing it breaks (at contact 97) the energizing circuit for relay ZA.

In releasing, contact 96 of relay ZA now recompletes the pick-up circuit for relay Z and thus the above described cycle of pick-up and release operations is caused successively to repeat itself as long as the three relays ES, HE and PA all remain released. It will thus be seen that during the course of each of these repeated cycles, contacts 91 and 96 of relay ZA first occupy the released position for about 2½ seconds and then the picked-up position for about 1 1/10 seconds. As has already been suggested (and as will be more completely described presently), this alternate pick-up and release of contact 91 assures proper track circuit resetting in connection with certain westbound occupied conditions of the associated track section.

A further function at each of the signal locations of the just described relays Z and ZA and the auxiliary contacts X180 and X80 of the code transmitter CT is to by-pass the control winding of the impedance transformer TX and thereby so reduce the impedance of the eastbound track relay circuit (of which the transformer forms a part) as to enable the track relay TR to respond in normal manner to coded energy that is received from the eastbound track circuits. As was explained in an earlier portion of the specification, each of these transformers TX operates to prevent the eastbound track relay with which it is associated from being falsely picked up by the pulses of westbound track circuit energy (that are supplied to the rails over transformer TTW ordinarily during the "off" periods of the eastbound track circuit code).

The special by-passing to which the preceding paragraph makes reference occurs under the following conditions. First, when the relay ZA picks up at a time when relays P and PA are both released; the by-pass circuit then established is continuously maintained and it extends from the upper terminal of the TX transformer secondary through conductor 65, back contact 64 of relay P, conductor 103, back contact 92 of relay PA, conductor 104, front contact 91 of relay ZA and conductors 105 and 106 back to the lower terminal of the TX secondary.

Second, when the auxiliary contact X180 of transmitter CT is coding the before-described cab signal energy for the westbound track circuit to the east; under this condition there is established a by-pass circuit which is periodically interrupted at contact X180. It may be traced from the upper terminal of the TX transformer secondary through conductor 65, back contact 64 of relay P, conductor 103, back contact 92 of relay PA, conductor 104, back contact 91 of relay ZA, front contact 90 of relay TP, conductor 108, the coding contact X180 (in its lowermost position) and conductors 109 and 106 back to the lower terminal of the transformer secondary.

And third, when the special energy for westbound cab signal control is being coded by the auxiliary contact X80 of device CT; under this condition there is established a by-pass circuit which again is completed only periodically. In this case, the completion is by contact X80 and the circuit established thereover may be traced from the upper terminal of the TX transformer secondary through conductor 65, back contact 64 of relay P, back contact 92 of relay PA, conductor 104, back contact 91 of relay ZA, back contacts 90, 111 and 112 of relays TP, HW and DW, conductor 113, the coding contact X80 in its lowermost position (interconnected at each of the intermediate locations II and III with conductor 113 by way of front contact 114 of relay WS and a conductor 115), and conductor 106 back to the lower terminal of the transformer secondary.

As before stated, the purpose of the special by-passing in each of the just described three cases is to condition the eastbound track relay TR for responding to the initial pulses of eastbound track circuit energy that are transmitted thereto when the train (or other) shunt is removed from the section rails. As will become more evident presently, such a response is essential to the desired resetting of the track circuits of each section following the passage of a westbound train therethrough.

With this preliminary explanation as an introduction, the signal control operations that result from the passage of a westbound train through the single track stretch of Figs. 1a–d will now be described. As in the case of the corresponding tracing of an eastbound move this description will start with the assumption that the entire length of the named stretch is vacant.

Under that condition both of the stick relays ES and WS at each of the intermediate locations (II and III) are released; both the eastbound and the westbound track circuits for each of the sections in that stretch are operating simultaneously (in the manner previously described); and the headblock signals SEI and SWIV are both displaying the green or "clear" indication.

A westbound train approaching this vacant stretch of single track from the east thus finds the signals set as represented in the upper portion of Fig. 8 and, accordingly, it gets a "clear" indication from westbound device SWIV at headblock location IV. As the train enters the section (V—IV) to the immediate east of that location, it shunts the rails of that section, deenergizes the eastbound track relay TR at location IV and causes all four of the associated relays P, PA, HE and DE to occupy the released position.

In so releasing at location IV, relay PA sets up (over contact 24) the red or "stop" indication circuit for eastbound signal SEIV; concurrently, contact 30 of the same relay transfers from coding contact 180 to coding contact 80 (of transmitter CT) the connection over which "frequency" code is supplied to the eastbound track circuit of section IV—III. Meanwhile the westbound headblock signal SWIV continues to show "clear."

As a result of the just described connection transfer, the rails of section IV—III transmit "eastbound approach" code (80 pulse per minute) westwardly to the eastbound track relay TR at location III. In there following this code, relay TR causes the associated relays PA, HE and DE to set up (at contacts 24, 18 and 19) the yellow or "approach" indication circuit for eastbound signal SEIII and to continue (at contact 70) the westbound signal SWIII (still set up for the "clear" indication) deenergized. Under this condition the eastbound track circuit of section III—II continues to be supplied with "eastbound clear" code (from contact 180 of device CT over front contacts 26 and 30 of relays HE and PA); at location II this causes the eastbound signal SEII to continue to have its "clear" circuit set up; and at location I it similarly results in the eastbound signal SEI continuing to show "clear."

Further results at location IV of the shunting of section V—IV by the westbound train are (1) to bring (by the closing of back contacts 95 and 94 of relays PA and HE) the auxiliary relays Z and ZA into action and (2) to establish for transformer TTW a circuit over which the rails of the occupied section (V—IV) to the east are supplied with specially coded energy that is suitable for controlling cab signals (such as are shown in Fig. 6) with which the train may be equipped.

Under the assumed vacant conditions of the track sections (IV—III, III—II, etc.) to the west of location IV (which result in relay TP at that location being picked up), the named cab signal energy is of the "cab signal clear" code of Fig. 3a; it is supplied from terminal B over the circuit before traced as including front contact 99 of relay TP; and it is coded by contact X180 which causes the pulses thereof to recur at the rate of 180 per minute. Due to the before explained action of contact 91 of relay ZA, the supply circuit for this cab signal control energy is interrupted for approximately $1\frac{6}{10}$ seconds out of every $3\frac{6}{10}$ seconds and the secondary of transformer TX is by-passed during each of those $1\frac{6}{10}$ seconds interruption intervals. In consequence, this "cab signal clear" code is periodically cut off in the manner represented by the $1\frac{6}{10}$ seconds interruption interval in the lower portion of Fig. 3a.

As the leading vehicle of the westbound train passes location IV and shunts the rails of section IV—III, both of the westbound track relays TW and TWI at location IV become deenergized and release all three of the relays DW, HW and TP at the same location; this puts the westbound headblock signal SWIV at "stop" (by completing the red lamp circuit therefor over back contact 53 of relay TP) and also completes (over back contact 73 of the same relay TP) the previously set up "stop" circuit for the eastbound signal SEIV. In addition, the same shunting (of section IV—III) cuts off the transmission of eastbound track circuit code to the track relay TR at location III and causes the there associated relays P, PA, HE and DE all to release.

At this location III, contact 24 of relay PA now sets up the "stop" indication circuit for the eastbound signal SEIII; contact 70 of relay HE sets up the energizing circuit for the westbound signal SWIII; contacts 95 and 94 of relays PA and HE bring the auxiliary relays Z and ZA into action; and contacts 64 and 92 of relays P and PA establish for transformer TTW a circuit over which the rails of the now occupied section (IV—III) to the east are supplied with specially coded energy for cab signal control. This special energy consists (as was the case at location IV) of 180 "given" polarity pulses per minute (derived from terminal B and coded by contact X180) and the supply thereof is interrupted (by contact 91 of relay ZA) for approximately $1\frac{6}{10}$ seconds out of every $3\frac{6}{10}$ seconds (as shown at the "cab signal clear" code representation in Fig. 3a).

A further effect at location III of the shunting of track section IV—III is to cause contact 30 of relay PA to transfer from coding contact 180 to 20L (of transmitter CT) the connection over which eastbound track circuit code is supplied to the rails of sections III—II. This connection transfer is not to contact 80 (as was the case at headblock location IV) for the reason that contact 35 of the eastbound directional stick relay ES shifts (in its now released position) the connection of conductor 34 from contact 80 to contact 20L.

In order to hold the westbound signal SWIII at "clear" while keeping the advance eastbound signals SE at "stop," the rails of track section III—II now are supplied (at location III) with energy of the 20 pulse per minute "eastbound detection" code of Fig. 3c. This supply is by way of track transformer TTE and an exciting circuit therefor which extends from terminal B through impedance 27, coding contact 20L, (when in its uppermost position), conductor 90, back contact 35 of relay ES, conductor 34, back contact 30 of relay PA, conductor 25 and the primary of transformer TTE back to supply terminal C.

At location II the eastbound track relay TR follows this 20 pulse per minute code and causes the associated relays P and PA to respond in the usual manner; due, however, to the slowness with which the pulses of track relay pick-up energy now recur, both of the relays HE and DE at the same location now release. In consequence, contact 18 of relay HE sets up the "stop" indication circuit for the eastbound signal SEII; contact 70 of the same relay completes the previously set up "clear" indication circuit for the westbound signal SWII; and contacts 9 and 64 of relays TR and P establish for transformer TTW a circuit over which the rails of section III—II (to the east) are supplied with a pulse of "given polarity" energy (from terminal B and by way of front contact 61 of relay TP) during each "off" period of the "eastbound detection" code. This energy thus has the code pattern that is shown at "westbound detection A" in Fig. 3c.

In feeding eastwardly to location III, this "westbound detection" code there operates the westbound track relay TW and causes it to pick up relays DW and TP; that pick-up, in turn, continues (over contacts 51 and 53) the "clear" indication showing by westbound signal SWIII and thereby authorizes the westbound train to proceed through section III—II.

A further effect at location II of the shunting of track section IV—III is to cause contact 26 of relay HE (now released) to transfer from coding contact 180 to coding contact 20L (of transmitter CT) the connection over which eastbound code is supplied to the rails of section II—I. Due to this transfer those rails are now supplied with energy of the 20 pulse per minute "eastbound detection" code of Fig. 3c. This supply is by way of transformer TTE and an exciting path therefor which extends from terminal B through impedance 27, coding contact 20L, (when in its uppermost position), conductor 90, back contact 35 of relay ES, conductor 34, back contact 26 of relay HE, front contact 30 of relay PA, conductor 25 and the primary of transformer TTE back to supply terminal C.

At location I, the eastbound track relay TR follows this 20 pulse per minute code and causes the associated relays P and PA to respond in the usual manner; due, however, to the slowness with which the track relay pick-ups recur, both of the relays HE and DE at this location are released (as was the case at location II). In consequence: (1) contact 70 of relay HE completes the previously set up energizing circuit for westbound signal SWI; and (2) contacts 9 and 64 of relays TR and P establish for transformer TTW a circuit over which the rails of section II—I (to the east) are supplied with energy of the "westbound detection A" code (of Fig. 3c).

In feeding eastwardly to location II, this "westbound detection" code there operates the westbound track relay TW and causes it to pick up relays DW and TP; that pick-up, in turn, continues the "clear" 'indication showing by westbound signal SWII and thereby authorizes the westbound train to proceed through section II—I.

Concurrently with the actions last described, contact 18 of relay HE at location I completes the red lamp circuit for the eastbound headblock signal SEI. The resulting display of "stop" by the latter signal warns approaching eastbound traffic that an opposing westbound train has entered the east end of the A. P. B. stretch and is proceeding therethrough; it constitutes the beforementioned directional protection for westbound train moves; and it is provided without the aid of line wires for signal control purposes. Once thus set up, moreover, the "stop" indication by signal SEI is interruptedly continued as long as any part of the westbound train remains in the A. P. B. stretch. That continuance results, as will be seen, from the fact that each advance of the train into a succeeding track section to the west does not disturb the previously effected "directional protection" condition of the eastbound track circuits still further ahead.

A further effect at location I of the shunting of the track section IV—III is to cause contacts 9 and 64 of relays TR and P to establish for transformer TTW a circuit over which the rails of the section II—I to the east are supplied with a pulse of "given" polarity energy (from terminal B and by way of front contact 61 of relay TP) during each "off" period of the "eastbound detection" code. This energy thus has the code pattern represented at "westbound detection A" in Fig. 3c.

A still further effect at location I of the westbound train shunting of section IV—III is to cause contact 26 of relay HE to transfer from coding contact 180 to contact 89 (of transmitter CT) the connection over which "frequency" code is supplied to the eastbound track circuit of the section to the west of location I. As a result of this transfer, the track relay TR at the next location to the west (not shown) receives and responds to 80 pulse per minute "eastbound approach" code. That response, in turn, causes the associated relays PA, HE and DE (again not shown) to set up the "approach" indication circuit for the eastbound signal at that west location.

As the trailing vehicle of the westbound train clears location IV the following actions at that location take place. The eastbound track relay TR once more receives 180 pulse per minute "eastbound clear" code from the rails of section V—IV; all three of the associated relays PA, HE and DE are again picked up; and those relays cause the eastbound signal SEIV to display "clear" (by completing the green lamp circuit therefor over contacts 24, 18 and 19). In addition, this code following response by relay TR cooperates with the now released contact 61 of relay TP to transmit negative polar code (from terminal NX over the back point of contact 9 of relay TR) to the rails of the just vacated section V—IV to the east.

At location V this polar code energy is received and responded to by the westbound track relay TW1. Associated relays HW and TP there respond in the usual manner and now cause the "approach" indication circuit for the westbound signal SWV to be set up.

As the leading vehicle of the westbound train passes location III and shunts the rails of sections III—II, the westbound track relays TW and TW1 at location III become deenergized and cause the release of all three of the relays DW, HW and TP at the same location. This release puts westbound signal SWIII at "stop"; completes (at contact 73 of relay TP) the previously set up "stop" circuit for the eastbound signal SEIII; and picks up (at contact 82 of relay DW) the westbound directional stick relay WS over a circuit that extends from the positive supply terminal through a back contact 121 of eastbound stick relay ES, back contact 122 of relay HE, conductor 84, back contacts 83 and 82 of relays HW and DW, conductor 81, front contact 79 of relay TP, conductor 123 and the winding of relay WS back to the negative supply terminal.

This completion of the stick relay energizing circuit occurs between the instant that the relay DW first releases and the somewhat later time that the more sluggish relay TP drops out. In picking up in response to that completion the westbound directional relay WS locks itself in over a stick contact 124 which by-passes the previously mentioned (in tracing the relay pick-up circuit) front contact 79 of relay TP as long as relay WS remains energized.

One result at location III of this pick-up of relay WS is to set up over contact 68 a supply circuit by way of which the track transformer TTW will transmit negative polar code to the rails of section IV—III as soon as that section becomes vacant. This supply circuit includes coding contact 9 of the eastbound track relay TR and (when completed) it may be traced from the "opposite" polarity terminal NX through front contact 68 of relay WS, conductor 67, back contact 61 of relay TP, conductor 63, back contact 9 of relay TR, front contact 64 of relay P, and the primary of transformer TTW back to supply terminal C.

Another result at location III of the pick-up of relay WS is to disconnect at contact 127 the exciting circuit of eastbound decoding transformer DT from the positive terminal of the source that supplies energizing current to that circuit over the pole changing contact 7 of relay TR and by way of a conductor 128. As long as relay WS remains picked up, the transformer relays HE and DE are, in this manner, rendered unresponsive to code following operation of eastbound track relay TR.

At location II, the just described shunting of track section III—II deenergizes track relay TR and causes all of the associated relays P, PA, HE and DE to release. This release: (1) cuts off (at contact 64 of relay P) the 20 pulse per minute polar code ("westbound detection A") that previously was supplied to the west end of section III—II; (2) brings (by the closing of back contacts 95 and 94 of relays PA and HE) the auxiliary relays Z and ZA into action; and (3) establishes (over back contacts 64 and 92 of relays P and PA) for transformer TTW a circuit over which the rails of the occupied section (III—II) to the east are supplied with specially coded energy for cab signal control purposes.

Under the assumed vacant conditions of the track stretch to the west, this cab signal control energy is of "given" polarity (from terminal B); it is supplied at the rate of 180 pulses per minute under the coding action of contact X180 of transmitter CT; the supply circuit therefor is repeatedly interrupted for 1 1/10 seconds and completed for 2 1/2 seconds by contact 91 of relay ZA; and in the form received by the section rails it is of the character represented at "cab signal clear" in Fig. 3a.

As the trailing vehicle of the westbound train clears location III, the rails of section IV—III once more become effective for transmitting energy from the east to the west end thereof and vice versa. The first action to take place then is for the 180 pulse per minute "eastbound clear" code to feed westwardly over the section rails from transformer TTE at location IV toward the eastbound track relay TR at location III. Immediate response of this relay TR in the normal manner is, however, prevented by the interfering 80 pulse per minute "cab signal approach" code which continues to be supplied (from terminal NX over coding contact X80 and back contact 91 of relay ZA) to the same rails through transformer TTW at the west end (location III) of the section.

Due to the before explained cyclic pick-up and release action of contact 91 of relay ZA at location III the just described interference is but temporary and persists only until contact 91 next picks up and removes the "cab signal approach" code energy from the section rails. When that happens, the 180 pulse per minute "eastbound clear" code reaches and is responded to by relay TR at location III. This response at once picks up the relays P, PA, HE and DE at the same location and renders both of the relays Z and ZA inactive by interrupting the driving circuit therefor (at contacts 95 and 94 of relays PA and HE).

At this moment the westbound track circuit energy for the just vacated section IV—III starts to be supplied at location III during the "off" periods of the eastbound track circuit energy (which is received by relay TR) at that location. Since relay TP is continued released (by the train shunt of section III—II), this westbound track circuit energy comes from the "opposite" polarity terminal NX and is transmitted to transformer TTW over the back point of contact 9 of the eastbound track relay TR during each release period of that track relay.

In this manner the eastbound and the westbound track circuits for section IV—III automatically reset and synchronize themselves following the clearing of the west end of that section by the westbound train. Once thus reset, the two track circuits for the section continue to operate in their normally synchronized manner until the rails of that section again become shunted.

Further effects of the clearing of location III by the westbound train are: (1) at location III to retain (under the action of contact 127 of picked-up relay WS which prevents relays HE and DE from being picked up by the code following operation of relay TR) the eastbound signal SEIII at "stop" and to deenergize the "stop" displaying westbound signal SWIII; (2) at location IV to cause the westbound track relay TWI to follow the "westbound approach A" code energy received over the rails from location III and thereby complete (over front contacts 52 and 53 of relays HW and TP) the "approach" indication circuit for westbound headblock signal SWIV and also shift (at contact 61 of relay TP) the connection over which polar code energy is supplied to the rails of section V—IV from "opposite" polarity terminal NX to the "given" polarity terminal B; and (3) at location V to cause the westbound track relay TW to follow positive polar code pulses from location IV and thereby set up (over front contacts 51 and 53 of relays DW and TP) the "clear" indication circuit for westbound signal SWV.

As the leading vehicle of the westbound train passes location II and shunts the rails of section II—I, the westbound track relay at location II becomes deenergized. This causes the release of all of the relays DW, HW and TP at the same location; puts the westbound signal SWII at "stop"; completes the previously set up "stop" circuit for the eastbound signal SEII; picks up westbound directional stick relay WS; renders the relays HE and DE unresponsive to code following operation of relay TR; brings relays Z and ZA into action; and sets up a circuit by way of which the rails of section III—II will receive (through transformer TTW) negative polar code as soon as that section becomes vacant—all in a manner which is identical with that previously described for the corresponding operations at location III.

At location I the just described shunting of track section II—I deenergizes the eastbound track relay TR and causes all of the associated relays P, PA, HE and DE to release. This release: (1) puts the eastbound signal SEI at "stop"; (2) cuts off (at contact 64 of relay P) the 20 pulse per minute "westbound detection" code that previously was supplied to the west end of section II—I; (3) brings the auxiliary relays Z and ZA into action; and (4) establishes (over contacts 64 and 92 of relays P and PA) a circuit over which the rails of section II—I are supplied with 180 pulse per minute "cab signal clear" code.

As the trailing vehicle of the westbound train clears location II, the rails of section III—II once more transmit energy of the "eastbound clear" code from location III toward the eastbound track relay TR at location II. Upon the next pick-up of contact 91 of relay ZA at that location, the interfering negative polar code is removed from the section rails; the track relay TR at location II then responds to the eastbound code from location III; relays P, PA, HE and DE (at location II) now pick up and deenergize relays Z and ZA; the westbound and eastbound track circuits for section III—II then reset and synchronize themselves; the eastbound signal SEII is retained at "stop"; and the westbound signal SWII is deenergized,—all in a manner identical with that previously described for the corresponding operations at the west end of track section IV—III.

At location III the following effects are produced by the clearing of location II by the westbound train: Response by westbound track relay TWI to the negative polar code from location II and pick-up of relays HW and TP; set up (by contacts 52 and 53 of relays HW and TP) of the "approach" indication circuit for westbound signal SWIII; deenergization (at contact 83 of relay HW) and release of the westbound directional stick relay WS; reconnection (at contact 127 of relay WS) of the exciting circuit for the eastbound decoding transformer DT with the positive terminal of its supply source; and supply of positive polar code to the rails of the section (IV—III) to the east. At location IV this polar code causes the "clear" indication circuit for the westbound headblock signal SWIV to be completed.

As the leading vehicle of the westbound train passes location I and shunts the rails of the section to the west of that location, the westbound track relays TW and TWI at location I become deenergized. This causes the release of all three of the associated relays DW, HW and TP; puts the westbound signal SWI at "stop"; brings relays Z and ZA into action; and sets up a circuit by way of which the rails of section II—I will receive (through transformer TTW) negative polar code as soon as that section becomes vacant.

As the trailing vehicle of the westbound train clears location I the rails of section II—I once more transmit energy of the "eastbound clear" code from location II toward the eastbound track relay TR at location I. There: Relay ZA removes the interfering polar code from the section rails upon the next pick-up of contact 91; the track relay TR then responds to the eastbound code from location II; relays P, PA, HE and DE (at location I) now pick up and deenergize relays Z and ZA; the westbound and eastbound track circuits for section II—I reset and synchronize themselves in the manner previously explained; the eastbound signal SEI goes to "clear"; and the westbound signal SWI becomes denergized.

At location II the following effects are produced by the clearing of location I by the westbound train: Response by westbound track relay TWI to the negative polar code from location I and pick-up of relays HW and TP; set up of the "approach" indication circuit for westbound signal SWII; deenergization and release of the westbound directional stick relay WS; reconnection of the exciting circuit for decoding transformer DT with its energizing source; and supply of positive polar code to the rails of the section (III—II) to the east. At location III this code causes the "clear" indication circuit for westbound signal SWIII to be set up.

Having thus proceeded completely through the first stretch of single track (that includes locations IV to I of the composite diagram of Fig. 1) and into the section to the immediate west of location I, the above referred to westbound train now occupies the same position with respect to the succeeding stretch of single track to the west (not completely shown but of which the west end of the partially represented passing siding WPS marks the east end) as it did with reference to the first stretch when it was within the section to the immediate east of location IV. Were, therefore, this westbound train to travel on into and through this succeeding stretch, it would cause A. P. B. signaling facilities associated therewith to repeat the series of westbound directional protection operations that have just been described.

Cab signal operation

The improved non-line-wire A. P. B. system of the composite diagram of Fig. 1 is adapted to control not only the wayside signals SE and SW in the manner just described, but also to produce corresponding indications on board each train (when within the protected territory) that is equipped with cab signaling apparatus of conventional "frequency selective" character. Such train carried cab signaling and/or brake control apparatus is well known in the art (see Paul N. Bossart Patent 1,773,472 dated August 19, 1930) and the circuits of one illustrative form thereof are represented in Fig. 6.

In those illustrative circuits use is made of: The usual pick-up windings 132 and 133 mounted on the locomotive front; an amplifier 134 that strengthens the energy which these windings inductively receive from the track rails 1 and 2; a code following master relay MR which is energized (through a transformer 135) by a measure of the output of this amplifier and which responds to each pulse of the received trackway energy regardless of its relative instantaneous polarity; a decoding transformer DT which is supplied with code step pulses of exciting current over a pole changing contact 7a of the master relay; frequency selective circuits DU into which the decoding transformer feeds its output energy; decoding relays DRH and DR180 which receive pick-up current from those frequency selective circuits; and a cab signal CS and/or train control device (not shown) having a plurality of indicating units which are selectively energized under the control of the decoding relays.

The elements just named cooperate in such a way that: (1) when the master relay MR follows trackway code of the 180 pulse per minute variety, both of the decoding relays DRH and DR180 pick up and light (over front contacts 18 and 19) the green or "clear" indication lamp G of the cab signal CS; (2) when the master relay follows trackway code of the 80 pulse per minute variety, only the first decoding relay DRH picks up and front contact 18 and back contact 19 then complete the lighting circuit for the yellow or "approach" indication lamp Y of the signal; and (3) when the master relay becomes stalled or follows trackway code of the 20 pulse per minute variety, both of the decoding relays release and light (over back contacts 18 and 19) the red or "stop" indication lamp R of the cab signal.

This train carried cab signaling apparatus is additionally adapted to respond as readily to negative or "opposite" polarity pulses of coded trackway energy as to positive or "given" polarity pulses thereof; moreover, the apparatus is incapable of picking up either of its relays DRH and DR180 when the rate at which the received pulses (whether of "given" or of "opposite" polarity) recur falls to the low order of 20 or less per minute. The first named effect comes from the non-polarized character of the amplifier 134 (into which the pick-up windings 132 and 133 feed) while that second named comes from the fact that the pole changing (by contact 7a of relay MR) of the exciting circuit for transformer DT must take place with a certain rapidity (considerably above 20 times per minute) before the transformer can pass sufficient energy to pick up either of the decoding relays.

Accordingly, when a train locomotive that is provided with the cab signaling equipment of Fig. 6 receives 180 pulse per minute energy from the track rails, the signal CS will show "clear" regardless of whether that energy is of the "eastbound clear" (positive polarity) or the "cab signal clear" (also positive polarity) code of Fig. 3a; when the locomotive picks up 80 pulse per minute energy from the rails, the cab signal will show "approach" regardless of whether that energy is of the "eastbound approach" (positive polarity) or the "cab signal approach" (negative polarity pulses) code of Fig. 3b; and when the locomotive picks up no energy at all or trackway energy of any one of the 20 pulse per minute "detection" codes of Fig. 3c, the cab signal will at all times show "stop."

In this way the cab signal device CS on the leading vehicle of each train that passes along the A. P. B. signalled track of Fig. 1 is caused to display an indication which bears a definite relation to that being given by the wayside signal (SE or SW) which is immediately in advance of the device-carrying train. If, for example, this train is an eastbound one, the rails of each section into which it advances are supplied at the east end of that section (through transformer TTE and in a manner previously described) with energy of one or another of the three "eastbound" codes of Figs. 3a–c and, when received by the train pick-up devices, this energy causes the cab signal CS to display one or another of the just described indications of "clear," "approach" and "stop."

It will thus be seen that all of these eastbound cab signal indications are produced by the same energy codes as are transmitted under vacant track conditions over the section rails (from east to west) to the operating winding of the eastbound track relay TR for the section. In consequence, it will further be seen: (1) that under certain conditions the indication aboard the eastbound train will be less restrictive than that displayed by the eastbound signal SE immediately ahead; and (2) that under other conditions the cab signal indication will be the same as that of the wayside signal ahead.

The latter situation occurs when the wayside signal SE to the immediate east of the train is showing "clear" (as a result of the associated track relay TR receiving "eastbound clear" code from the rails of the section to the east of its location); then the rails of the occupied section to the west also are supplied with 180 pulse per minute energy and the cab signal CS on the approaching train is by it also caused to show "clear."

The former situation occurs when the wayside signal SE to the immediate east of the train is showing "approach" or "stop" (in response to occupied conditions of the track section to the east of its location). If this wayside indication is "approach," then the rails of the occupied section to the west are supplied with "eastbound clear" (180 pulse per minute) code and the cab signal CS on the approaching train is by it still caused to show "clear"; similarly, if the wayside indication is "stop," then the rails of the occupied section to the west receive "eastbound approach" (80 pulse per minute) code and the cab signal CS on the approaching train is by it caused to show "approach."

Comparably, when the signal carrying train is a westbound one, the rails of each section into which the leading vehicle of that train comes are supplied at the section west end (through transformer TTW—again in a manner which has been fully described hereinbefore) with energy of one or the other of the "cab signal clear" and the "cab signal approach" codes of Figs. 3a and 3b and, when received by the train pick-up devices, this specially coded energy causes the cab signal CS to display one or another of the three indications beforementioned.

Unlike the eastbound scheme of cab signal control, none of these westbound cab signal indications is produced by the codes ("westbound: clear—approach—detection") which operate the westbound track relays TW and TWI for the section under vacant conditions thereof. In this first respect, therefore, the scheme of control for the cab signals on westbound trains differs from that for the same signals on eastbound trains.

Another point of difference is that the cab signal codes in the westbound control scheme are not impressed upon the rails of the occupied section continuously as in the eastbound scheme but instead thereof the supply thereof is cut off for about 1¼₀ seconds out of each 3⁶⁄₁₀ seconds period, as is shown at "cab signal clear" in Fig. 3a and at "cab signal approach" in Fig. 3b. As has previously been explained, these recurrent cut-offs (at each location of westbound cab signal code supply) are effected by contact 91 of relay ZA and their purpose is to permit the eastbound and the westbound track circuits for the section to the east to reset and synchronize themselves immediately when the westbound train moves out of that section.

Due, however, to certain characteristics that are inherent in the conventional cab signal apparatus of Fig. 6, these westbound code supply cut-offs do not interfere with the normal response of that apparatus to the codes ("cab signal clear" and "cab signal approach") in which they occur. The referred to characteristics are: (1) a slowness of release by each of coding relays DRH and DR180 which exceeds the 1¼₀ seconds period of code supply cut-offs; and (2) an ability of the decoding transformer DT to build the decoding relay energization up to its full degree of intensity within each 2½ seconds period of code supply which follows each 1¼₀ seconds interval of code cut-off.

In the westbound scheme of cab signal control, accordingly, the picked-up condition of the decoding relays (which the received cab signal code determines) is maintained as continuously by the recurrently cut-off series of pulses (represented in each of Figs. 3a and 3b) as it would be were the supply of those pulses to be continuous as in the eastbound scheme. Satisfactory operation of the cab signal in both schemes is, therefore, assured.

As in the case of the eastbound cab signal control scheme the indication displayed on board each westbound train that carries device CS of Fig. 6 will, under certain conditions, be less restrictive than that displayed by the westbound signal SW that is immediately in advance of that train; under other conditions, however, the westbound cab and wayside signal indications will be the same. The latter situation occurs when the wayside signal SW to the immediate west of the train is showing "clear"; then the rails of the occupied section to the east are supplied with 180 pulse per minute "cab signal clear" code and the signal CS on board the approaching westbound train is by it also caused to show "clear."

The former situation occurs when the wayside signal SW to the immediate west of the train is showing either "approach" or "stop" (in response to occupied conditions of the track section to the west of its location). If this wayside indication is "approach," then the rails of the occupied section to the east are supplied with "cab signal clear" (180 pulse per minute) code and the signal CS on board the train is by it still caused to show "clear"; similarly, if the wayside indication is "stop," then the rails of the occupied section to the east receive "cab signal approach" (80 pulse per minute) code and the signal CS on board the approaching train is by it caused to show "approach."

Following protection

In addition to providing the directional protection which has already been described, the improved non-line-wire A. P. B. system of the composite diagram of Fig. 1 further affords the usual following protection and does this, moreover, wholly by means of the coded trackway energy that is diagrammed in the views of Fig. 3.

This following protection is automatically set up behind every train that travels through the stretch in either direction; the signal indications incident thereto are displayed not only along the right-of-way (by the wayside devices SE and SW) but also on board each following train that is provided with cab signal apparatus of the conventional character shown in Fig. 6; for eastbound train moves, it (the following protection) results from a functioning of the earlier described "eastbound" system of automatic block signaling (that is operated by "frequency code" energy transmitted over the rails of each track section in the direction of from east to west); and for westbound train moves it similarly is produced by the earlier described "westbound" system of automatic block signaling (that is operated by "polar code" energy transmitted over the same section rails but in the direction of from west to east).

In explaining how this following protection is provided under various occupied conditions of the single track, representative train moves through the A. P. B. stretch in the eastbound direction will first be described and following this a similar description of representative train moves in the westbound direction will be given.

During eastbound moves the "frequency code" scheme of automatic block signaling functions in a manner which will now be explained by reference to the central portion of Fig. 8. In entering the stretch from the west and advancing past locations I, II, III and IV thereof, an eastbound train successively deenergizes (as previously pointed out) the track relays TR at those locations and thus successively conditions: (1) each of the wayside signals SEI, SEII, SEIII and SEIV to show "stop"; and (2) each associated track transformer TTE to supply the rails of the section to the west with energy of the 80 pulse per minute "eastbound approach" code.

Once established, the mentioned "stop" aspect conditioning of each eastbound signal persists until the trailing vehicle of the train clears the next location to the east. When that happens: (1) the rails of the just vacated section transmit this "eastbound approach" energy to the relays TR at the west end thereof; (2) the wayside signal SE at that west end is thereby conditioned to show "approach"; and (3) the track transformer TTE at the same location is connected to supply the rails of the succeeding section to the west with energy of the 180 pulse per minute "eastbound clear" code.

At the west end of that succeeding section the track relay TR responds in the usual manner and: (1) conditions the wayside signal SE which it controls to display "clear" and (2) causes the track transformer TTE to supply "eastbound clear" code energy to the rails of the succeeding section to the west. At the west end of that section (and also at the west end of each succeeding section of vacant track still further to the west) the same actions are repeated.

It will thus be seen that the "frequency code" scheme of automatic block signaling which is included in the complete A. P. B. system of Fig. 1 provides the conventional form of following protection for eastbound train moves. That is, as long as an eastbound train occupies (and shunts the rails of) a section of the system track, the wayside signal SE at the west (eastbound entrance) end of that section is conditioned to show "stop"; the next signal SE to the west is conditioned to show "approach"; and succeeding signals SE to the west are conditioned to show "clear." As, moreover, the train moves eastwardly along the rails the above stated combination of signal indications continues to be maintained behind it and in this way following protection for eastbound moves is at all times provided.

In the event, for example, that a leading eastbound train occupies the position shown at EVI in Fig. 8 (central portion thereof), a following eastbound train in position EV2 will get the "approach" indication from signal SEII. Should this following train advance into section II—III while the leading train is still in section II—IV, it will then get the "stop" indication from signal SEIII; if, however, the following train is only approaching location I while the leading train is in section III—IV, it will then get the "clear" indication from signal SEI; and so on.

In those cases when the following eastbound train is equipped with cab signaling apparatus of the type shown in Fig. 6, signal CS thereof will display: (1) "clear" as long as the leading vehicle of the train is in a section that is supplied (at its east end) with 180 pulse per minute trackway energy; (2) "approach" when the signal carrying vehicle is in a section that is supplied with 80 pulse per minute energy; and (3) "stop" when the leading train vehicle is in a section that is either shunted by an advance train or is receiving 20 pulse per minute energy.

With the leading eastbound train at position EVI in Fig. 8, the cab signal indication on the following train will accordingly be: (1) "clear" when the following train is approaching location I (over rails that are transmitting "eastbound clear" code thereto) and after it has advanced to position EV2 in section I—II (the rails of which also are transmitting "eastbound clear" code energy); (2) "approach" when the following train has further passed on into section II—III (the rails of which are transmitting energy of the "eastbound approach" code); and (3) "stop" when the following train has still further advanced into section III—IV (the rails of which already are shunted by the advance eastbound train EVI which prevents coded trackway energy from reaching the following train).

The manner in which the westbound "polar code" scheme of automatic block signaling functions to provide following protection for westbound train moves will now be considered. In entering the stretch from the east and advancing past locations IV, III, II and I thereof, a westbound train successively deenergizes (as previously pointed out) the track relays TW and TWI at those locations and thus successively conditions: (1) each of the westbound signals SWIV, SWIII, SWII and SWI to show "stop"; and (2) each associated track transformer TTW to supply the rails of the section to the east with energy of one of the negative polar "westbound approach" codes.

Once established, the just mentioned "stop"

aspect conditioning of each westbound signal persists until the trailing vehicle of the train clears the next location to the west. When that happens: (1) The rails of the just vacated section transmit the above referred to "westbound approach" energy to the relay TW1 at the east end thereof; (2) the wayside signal SW at that east end is thereby conditioned to show "approach"; and (3) the track transformer TTW at the same location is connected to supply the rails of the succeeding section to the east with energy of one of the positive polar "westbound clear" codes of Fig. 3.

At the east end of that succeeding section, the track relay TW responds in the usual manner and: (1) conditions the wayside signal SW which it controls to display "clear" and (2) enables the track transformer TTW to supply "westbound clear" code energy to the rails of the succeeding section to the east. At the east end of that section (and also at the east end of each succeeding vacant track section still further to the east) the same actions are repeated.

It will thus be seen that the "polar code" scheme of automatic block signaling which is included in the complete A. P. B. system of Fig. 1 provides the conventional form of following protection for westbound train moves. That is, as long as a westbound train occupies (and shunts the rails of) a section of the system track, the wayside signal SW at the east (westbound entrance) end of that section is conditioned to show "stop"; the next signal SW to the east is conditioned to show "approach"; and succeeding signals SW to the east are conditioned to show "clear." As, moreover, the train moves westwardly along the rails, the above stated combination of signal indications continues to be maintained behind it and in this way following protection for westbound moves is at all times provided.

In the event, for example, that the leading westbound train occupies the position shown at WV1 in Fig. 8 (lower portion of), a following westbound train in position WV2 will get the "approach" indication from signal SWIV. Should this following train advance into section IV—III while the leading train is in section III—II, it will get the "stop" indication from signal SWIII; if, however, under the same circumstances it is only approaching location V, it will get the "clear" indication from signal SWV; and so on.

When the following westbound train is equipped with cab signaling apparatus of the type shown in Fig. 6, signal CS thereof will display: (1) "clear" as long as the leading vehicle of the train is in a section that is supplied (at its west end) with 180 pulse per minute trackway energy; (2) "approach" when the signal carrying vehicle is in the section that is supplied with 80 pulse per minute energy; and (3) "stop" when the leading train vehicle is in the section that is either shunted by an advance train or is receiving 20 pulse per minute energy.

From the earlier given description of the conditions under which the two "cab signal" codes of Figs. 3a and 3b are supplied, it will accordingly be seen that with the leading westbound train at position WV1 in Fig. 8, the cab signal indication on the following train will be: (1) "clear" when the following train is approaching location V and after it has advanced to position WV2 in section V—IV, (the rails of which are transmitting the "cab signal clear" code of Fig. 3a); (2) "approach" when the following train has further passed on into section IV—III (the rails of which are transmitting energy of the "cab signal approach" code of Fig. 3b) and (3) "stop" when the following train has still further advanced into section III—II that already is occupied by the advance westbound train WV1.

Cut section facilities

All description so far given has assumed that the rails of each of the main signal block lengths (I—II, II—III, III—IV, etc.) of track in the A. P. B. system are electrically continuous and thus constitute, as is shown by the composite diagram of Figs. 1a–e, the conductors of but a single track circuit section. My improved non-line-wire scheme of A. P. B. signal control is, however, not restricted to applications of this type alone, but may also be applied to stretches of track wherein one or more of the main signal blocks is, because of excessive length or for other reasons, subdivided into two or more track circuit sections.

In such situations I propose to equip each point of signal block subdivision with cut section facilities of the character shown in Fig. 7. There, a block subdividing location is designated by the character IIa and to aid explanation it will be assumed that this particular location is produced by interposing insulated rail joints 3 between the west and east ends of the signal block II—III of Figs. 1b–c.

When so installed between the ends of any one of the main signal blocks, the cut section facilities of Fig. 7 perform three functions: (1) They repeat each "eastbound" trackway code that is received at the cut around the joints 3 thereof and into the rails to the west; (2) they also repeat each received "westbound" code around the cut and into the rails to the east thereof; and (3) they further repeat the westbound "cab signal" codes around the cut and into the eastwardly extending rails under conditions of westbound train moves through the signal block.

Aiding in the first named function (that of repeating each received "eastbound" trackway code around the track to the rails to the west thereof) are: (1) a code following track relay TR that is operated by energy received from the rails to the east of the cut location in the same manner as is the corresponding device at each of the main signal locations I, II, III, IV, etc.; (2) a track transformer TTE which transmits energy from power source B—C to the rails to the west of the cut location in a manner also comparable to that of each of the main signal locations; and (3) a coding contact 137 operated by relay TR and so arranged that it interrupts the track transformer energizing circuit when released and completes that circuit when picked up.

By the means named in the preceding paragraph each one of the "eastbound" codes of Fig. 3 (clear—approach—detection) that is received from the east is repeated into the rails to the west of location IIa in the usual "front contact coding" manner (wherein the "on" and the "off" periods of the repeated code respectively coincide with the "on" and the "off" periods of the received code). All three of these codes are (as has been seen) of the "positive polar" variety and upon the occasion of each received pulse thereof the track relay TR completes for the west rail "repeating" transformer TTE an exciting circuit that extends from power source terminal B through impedance 27, front contact 137 of relay TR, conductor 25, the primary of transformer TTE and conductor 31 back to power terminal C.

In this manner every one of the "eastbound" trackway codes that originates at signal locations to the immediate east of the cut IIa is, under vacant conditions of the main signal block of which that cut forms a part, transmitted around the cut and thence to the next signal location to the west.

Aiding in the second named function (that of repeating each received "westbound" trackway code around the cut and into the rails to the east thereof) are: (1) a pair of code following track relays TW and TW1 oppositely poled as at each of the main signal locations I, II, III, etc. and connected (through transformer TTE, the back point of contact 137 of relay TR and conductor 40) with the westwardly extending rails whenever the relay TR is released; (2) a track transformer TTW which transmits energy from power source terminals B—C—NX to the rails to the east of the cut location in a manner also comparable to that at each of the main signal locations; (3) contacts 9, 138 and 139 carried by relays TR, TW and TW1 and arranged to connect the primary of transformer TTW with one or the other of the supply terminals B and NX during each "on" period of each of the "westbound" codes which relays TW and TW1 receive; (4) an impedance transformer TX which prevents the track relay TR from being falsely picked up by the repeated westbound code energy in the same manner as at each of the main signal locations; and (5) relays P and PA which govern the by-passing of transformer TX and perform other functions also in a manner comparable to that of each of the main signal locations.

By the means named in the preceding paragraph, each one of the "westbound" codes of Fig. 3 (clear A—approach A—clear B—approach B—detection A—detection B) which is received at the cut location IIa from the west is repeated into the rails to the east of the cut in the usual "front contact coding" manner (wherein the "on" and the "off" periods of the repeated codes respectively coincide with the "on" and the "off" periods of the received code).

In the case of each "positive polar" westbound code (clear A—clear B—detection A), the positive polar track relay TW responds and upon the occasion of each of the "received" pulses thereof completes for the east rail "repeating" transformer TTW an exciting circuit that extends from the "given polarity" terminal B through front contact 138 of relay TW, conductor 63, back contact 9 of relay TR, front contact 64 of relay P, conductor 65, impedance 66 and the primary of transformer TTW back to the power source terminal C; in the case of each "negative polar" westbound code (approach A—approach B—detection B), the track relay TW1 responds to the "received" pulses thereof and upon the occasion of each completes for transformer TTW an energizing circuit that extends from the "opposite polarity" terminal NX through front contact 139 of relay TW1, conductor 63, back contact 9 of relay TR, front contact 64 of relay P, conductor 65, impedance 66 and the primary of transformer TTW back to terminal C.

In this manner, every one of the "westbound" trackway codes that originates at the signal location to the immediate west of the cut IIa is, under vacant conditions of the main signal block of which that cut forms a part, transmitted around the cut and thence over the rails to the next signal location to the east. Incident to this transmission, the secondary of the impedance transformer TX at the cut location is by-passed (for the purpose of rendering the track relay TR responsive to each received "eastbound" code "on" period) during the "off" periods of each repeated "westbound" code over circuits that include conductors 65 and 106 and that correspond to those already described in connection with the corresponding apparatus at each of the main signal locations I, II, III, etc.

Aiding in the third named function of the cut location apparatus (that of repeating, upon the approach of westbound traffic, the "cab signal" codes around the cut and into the eastwardly extending rails) are: (1) contacts 64 and 92 of relays P and PA which set up a special exciting circuit for transformer TTW upon the approach of each westbound train; and (2) contacts 140 and 141 carried by track relays TW and TW1 which, at proper times, recurrently connect the main exciting circuit with one or the other of supply terminals B and NX.

By the means named in the preceding paragraph, the rails to the east of cut IIa have repeated into them, upon their shunting by a westbound train, whichever one of the two "cab signal" codes of Fig. 3 (clear and approach) is being received (at the cut) from the rails to the west.

When this received code is of the 180 "positive" pulse per minute "cab signal clear" variety of Fig. 3a, the positive polar track relay TW responds thereto and periodically completes (at contact 140) for the east rail "repeating" transformer TTW, the before referred to special exciting circuit which may be traced from power source terminal B through front contact 140 of relay DW, conductor 107, back contact 141 of relay TW1, conductor 104, back contact 92 of relay PA, conductor 103, back contact 64 of relay P, conductor 65, impedance 66 and the primary of transformer TTW back to supply terminal C; when, however, the received code is of the 80 "negative" pulse per minute "cab signal approach" variety of Fig. 3b, the negative polar track relay TW1 then responds and periodically repeats (at contact 141) the TTW transformer exciting circuit over a path which extends from power source terminal NX through front contact 141 of relay TW1, conductor 104, back contact 92 of relay PA, conductor 103, back contact 64 of relay P, conductor 65, impedance 66 and the primary of transformer TTW back to supply terminal C.

In this manner, whichever one of the "cab signal" codes is being supplied to the rails at the signal location to the immediate west of the cut IIa under train shunted conditions of the rails to the east of that cut is repeated into those east rails and by them transmitted to the oncoming locomotive in the same manner as were the cut not present. This repeating, of course, is not only of the individual energy pulses of each cab signal code but also of the intervals of supply cutoff therein $1\frac{7}{10}$ seconds—see Figs. 3a and 3b) which serve to permit the eastbound and the westbound track circuits for each section to reset and synchronize themselves following the departure of each westbound train.

Moreover, during the "off" periods of each thus repeated cab signal code, the secondary of the impedance transformer TX at the cut location is by-passed over a circuit extending from the lower terminal of the TX secondary through conductors 106 and 105, back contact 140 of relay TW, conductor 107, back contact 141 of relay TWI, conductor 104, back contact 92 of relay PA, conductor 103, back contact 64 of relay P, and conductor 65 back to the upper terminal of the TX secondary.

From the foregoing, therefore, it will be apparent that the cut section facilities of Fig. 6 may be interposed within the limits of any one of the signal block track lengths which the non-line-wire A. P. B. system of Fig. 1 embraces without in any way interfering with the operation of that system.

*The battery fed A. P. B. system of Figs. 9a–d*

As described thus far (in connection with the composite diagram of Figs. 1a–e and the supplemental views of Figs. 2 to 8) my new non-line-wire system of A. P. B. signaling makes use of coded track circuits that employ alternating current energy for their operation. Other applications of my inventive improvements are, of course, possible and one of these is depicted by the diagrams of Figs. 9, 10 and 11 wherein I have shown a generally equivalent non-line-wire system of A. P. B. signaling that makes use of track circuits of the direct current type.

As disclosed by the composite diagram of Figs. 9a–d, this direct current track circuit system of A. P. B. signaling is applied to a stretch of two-direction running track 1—2 which extends between a west passing siding WPS and an east passing siding EPS; which embraces four track section dividing locations I, II, III and IV; and which is provided with an eastbound signal SE and with a westbound signal SW at each of the named locations.

Serving to control these traffic governing signals SE and SW are "eastbound" and "westbound" track circuits that operate simultaneously on each of the track sections into which the A. P. B. stretch is divided (by the insulated rail joints 3). Each of these eastbound-westbound track circuit sets operates on the "coded feed back" principle of the before referred to Nicholson Patent 2,021,944 and the arrangement and functioning thereof will be most readily apparent upon reference to the simplified diagram of Fig. 10.

As that drawing view indicates, both of the above referred to track circuits include the rails 1 and 2 of the particular track section with which they are identified; the "westbound" or "master" circuit further includes an energy source TBW and a coding device CTW installed as shown at the section west or master end and a code following track relay TRW installed at the section east end; and the "eastbound" or "feed back" circuit further includes an energy source TBE and a coder relay ECR installed as represented at the section east or feed back end and a code following track relay TRE installed at the section west end.

The mentioned energy sources TBW and TBE preferably are direct current track batteries and may be of any suitable type such as primary, storage, or the like. Alternatively, of course, these direct current sources also may take the form of rectifier units (not shown) which convert alternating current energy from a commercial supply source (again not shown) into the required direct current.

The coding device CTW for each westbound track circuit acts as the "master" coding device in the two-way track circuit set. It is provided with two sets of contacts 144—145 and 146—147 which are alternately operated between left and right positions under the action of cams 148 and 149. By a motor or other suitable mechanism (not shown) these cams are continuously rotated at any suitable constant speed such as 60 revolutions per minute (one each second). The coding device contacts (above named) are interposed between the track battery TBW and the section rails where they (1) periodically connect that battery in energy supplying relation with those rails and thereby produce the "westbound" trackway codes of Fig. 11; (2) connect the eastbound track relay TRE in energy receiving relation with those rails during each "off" period of the westbound code; and (3) apply a by-pass connection to those rails just after each of the eastbound track relay connections.

Each of the westbound or master circuit track relays TRW and each of the eastbound or feed back circuit track relays TRE is a code following device of a two-unit polarized design. Respectively comprised by the two units of each of these relays are windings D and H together with contacts (represented directly there beneath) which pick up only when the unit winding receives trackway potential having the proper polarity. In the particular arrangement shown, winding D picks up its contacts only when positive or "given" polarity energy is received while winding H similarly picks up its contacts only in response to negative or "opposite" polarity energy.

The coder relay ECR for each of the eastbound or feed back track circuits is a code following device and it differs from the just described track relays in being of the single unit design and in having delayed response characteristics. Its functions are: (1) to produce one or another of the "eastbound" or "feed back" codes of Fig. 11 by connecting the track battery TBE in energy supplying relation with the section rails during the "off" periods of the "westbound" or "master" code which device CTW produces; and (2) to maintain the westbound track relay TRW connected in energy receiving relation with those rails during the "on" periods only of that westbound code.

Both of these functions are performed by a pair of contacts 155 and 156 of the feed back coder relay ECR. These contacts are slow acting in both the pick-up and the drop-out directions so that they delayedly repeat the code following operations of the westbound track relay TRW. Contributing to this repeating action is a local energizing circuit for the winding of relay ECR, which circuit includes back contacts 153 and 154 of the just named track relay; when completed it may be traced from the positive supply terminal through back contacts 153 and 154 of relay TRW, conductors 169 and 171, and the winding of relay ECR back to the negative supply terminal.

The just traced circuit is completed (under vacant conditions of the track section) during each "off" period of the particular "westbound" code that is being received at the relay location; the same circuit is interrupted during each "on" period of that received "westbound" code. The time required by relay ECR to release (following an interruption of its energizing circuit) preferably is of the order indicated at $k$ in Fig. 11 while the time required for the relay to pick up (following each completion of its energizing circuit) preferably is of the order represented at $m$ in the same figure. As a result of these delayed responding characteristics, relay ECR picks up (during normal operation of the track circuits) at a time which corresponds to the end of each of the eastbound "on" code periods (that is shown in Fig. 11) and releases at a time which corresponds to the beginning of the succeeding one of those periods.

In operation of those basic portions of the westbound and the eastbound track circuits which are shown in Fig. 10, each pulse of "westbound" code energy which the west end track battery TBW supplies to the section rails (under vacant conditions of the section) picks up one of the units of the westbound (east end) track relay TRW over a circuit that extends from the positive terminal of battery TBW through conductor 158, left biased contact 145 of device CTW, right biased contact 147 of the same device, conductors 159 and 160, section rail 1, conductor 161, front contact 156 of relay ECR, conductor 162, the windings of relay TRW, conductor 163, front contact 155 of relay ECR, conductor 164, section rail 2, conductors 165 and 166, right biased contact 146 of device CTW, left biased contact 144 of the same device, and a current limiting impedance 167 back to the negative terminal of battery TBW.

In responding to each received pulse of the just named westbound code energy, the westbound track relay TRW interrupts (at one of the two contacts 153 or 154) the before traced energizing circuit for the eastbound coder relay ECR. After the interval that is indicated at $k$ in Fig. 11, this coder relay releases and shifts the track rail connection from relay TRW to the eastbound track battery TBE. This shift substantially coincides with (or closely follows) the end of the westbound "on" code period which produced it and marks the beginning of an "on" period of one of the "eastbound" codes of Fig. 11.

During this eastbound "on" code period track battery TBE (at the section east end) picks up the eastbound track relay TRE (at the section west end) over a circuit that extends from the positive terminal of the battery TBE through conductor 174, back contact 156 of relay ECR, conductor 161, section rail 1, conductors 160 and 159, left biased contact 147 of westbound coding device CTW, conductor 176, the windings of relay TRE, conductor 177, left biased contact 146 of device CTW, conductors 166 and 165, section rail 2, conductor 164, back contact 155 of relay ECR, a current limiting impedance 178 and conductor 179 back to the negative terminal of battery TBE.

Meanwhile, the beforementioned release of the westbound track relay TRW (which accompanied the end of the westbound "on" code period) completed the before traced energizing circuit for the eastbound coder relay ECR. As a result of that completion relay ECR picks up its contacts 155 and 156 at the end of the response delay period which is marked $m$ in Fig. 11. This pick-up, in turn, returns the track rail connection from the eastbound track battery TBE back to the westbound track relay TRW and thereby terminates the eastbound "on" code period that is referred to above and also conditions the apparatus for the reception of another pulse ("on" period) of westbound code energy.

Prior to such a pulse, however, the westbound coding device CTW places a shunt across the section rails by completing a circuit that extends from track rail 1, through conductors 160 and 159, right biased contacts 147 and 145 of device CTW, a conductor 181, right biased contacts 144 and 146 of device CTW, and conductors 166 and 165 back to track rail 2. The purpose of this shunt is to set up a path over which storage energy (building up in the ballast between the track rails during the "on" code periods) will discharge at regularly recurring intervals and thus not interfere with the desired operation of the code following track relays TRW and TRE. This discharge path is completed during the early portion of the now effective eastbound "off" code period (that began with the beforementioned pickup of the eastbound coder relay ECR) and is of relatively short duration due to the represented special displacement of the cams 148 and 149 of device CTW.

As these cams continue to rotate (in the arrow designated direction) the just described cycle of coded track circuit operation is repeated. In this manner, the "westbound" and the "eastbound" track circuits operate over the same section rails simultaneously and without interfering with each other. This lack of interference, of course, results from the fact that each "on" code period of the "eastbound" code is supplied during an "off" period of the "westbound" code and vice versa.

The just described "westbound" or "master" track circuits form a part of a first "polar code" system which controls the westbound signals SW to three indications in customary automatic block manner. This first polar code system is operated by the "westbound" or "master" trackway codes of Fig. 11 (that selectively are supplied to the section rails at the west end of each section) and at the east end of each section it makes use of decoding apparatus (see the composite diagram of Figs. 9a–d) which controls the signal SW at that location and which selects the polarity of the westbound track circuit energy that is supplied to the track section to the east.

At each signal location this westbound decoding apparatus includes three slow release relays DW, HW and PW. All three of these relays are controlled by the westbound track relay TRW at the same location; relay DW receives energizing current over a front contact 183 of the positive polarity unit D of relay TRW (and a back contact 184 of relay HW); relay HW receives energizing current over a front contact 185 of the negative polarity unit H of relay TRW (and a back contact 186 of relay DW); and relay PW is governed by all three of the devices TRW, DW and HW through the medium of contacts 183, 185, 187 and 188 thereof.

All of these contacts operate in circuits by way of which the windings of the three just named slow release relays (DW, HW and PW) are energized from a source that is designated by the terminals "plus" and "minus." Each of the relays DW and HW has a release retardation which is sufficient to span the "off" periods of the "westbound clear" and "westbound approach" codes of Fig. 11; the third relay PW, however, is given an even longer period of release delay for the purpose of performing a special A. P. B. function later to be described. In the particular arrangement shown, the two periods of release delay that have just been named respectively are obtained through the medium of snubbing resistors 182 and 189 that are bridged across the relay windings in well-known manner.

When the westbound track relay TRW receives (from the rails of the westwardly extending track section) positive or "given" polarity pulses of "westbound clear" code energy, the first unit D of that relay responds and causes contact 183 thereof recurrently to complete for the slow release relay DW an energizing circuit which extends from the positive supply terminal through front contact 183, conductor 190, back contact 184 of relay HW, conductor 191 and the winding of relay DW back to the negative supply terminal. Due to its slow releasing characteristics, relay DW maintains its contacts continuously picked up under the stated conditions.

In releasing, during each "off" period of the received "westbound clear" code, contact 183 of track relay TRW now completes for the slow release relay PW an energizing circuit which may be traced from the same positive supply terminal through back contact 183, conductor 192, front contact 187 of relay DW, conductor 193 and the winding of relay PW back (by way of a conductor 194 and a back contact 195 of a relay ES at each of the intermediate locations II and III) to the negative supply terminal. Due to its slow releasing characteristics, relay PW likewise maintains its contacts continuously picked up under the stated conditions.

Similarly, when the "westbound approach" code of "opposite polarity" energy pulses is received by the westbound track relay TRW, the second unit H of that relay responds and causes contact 185 recurrently to complete for the slow release relay HW an energizing circuit which extends from the positive supply terminal through front contact 185, conductor 197, back contact 186 of relay DW and the winding of relay HW back to the negative supply terminal. Under the influence of this recurrent energization, relay HW now maintains its contacts continuously picked up.

In releasing during each "off" period of the received "westbound approach" code, contact 185 of the track relay TRW now completes for the slow release relay PW an energizing circuit which may be traced from the positive supply terminal through back contact 185, conductor 199, front contact 188 of relay HW, conductor 193 and the winding of relay PW back (by way of conductor 194 and back contact 195 of relay ES at each of the intermediate locations II and III) to the negative supply terminal. As a result of this recurrent energization, relay PW again holds its contacts continuously picked up.

It will thus be evident that: (1) When neither of the units D or H of the westbound track relay TRW is following code all three of the associated relays DW, HW and PW are deenergized and hence released; (2) when the positive polar unit D is responding to coded energy, relays DW and PW are recurrently energized and thereby caused to hold their contacts continuously picked up; and (3) when the negative polar unit H of relay TRW is responding to coded energy, relays HW and DW are similarly caused to hold their contacts continuously picked up.

In determining the aspect which is displayed by the associated westbound signal SW, the three slow release relays DW, HW and PW make use of contacts 200, 201 and 202 that are included in circuits by way of which the three lamps G, Y and R of that signal selectively are supplied with lighting current (from a source again designated by the terminals "plus" and "minus"). When trackway energy of the "westbound clear" code is being received by track relay TRW (from the westbound track circuit) and relays DW and PW are picked up, lamp G is lighted over a circuit which includes front contact 202, a conductor 203, front contact 200 and a conductor 204; when the westbound track circuit transmits energy of the "westbound approach" code and thereby causes relays HW and PW to be picked up, lamp Y then receives lighting current over front contact 202, conductor 203, back contact 200, a conductor 205, front contact 201 and a conductor 206; and when no energy is responded to by the westbound track relay and all three of the relays DW, HW and PW are released, lamp R then is lighted over a circuit which includes back contact 202 and a conductor 207.

The slow release relay PW at the entrance or east end of each westbound track circuit also selects the polarity of the coded energy that is supplied to the west or exit end of the westbound track circuit that adjoins to the east. At all of the locations in the A. P. B. system this selection is accomplished by contacts 209 and 210; at each of the intermediate locations II and III contacts 211 and 212 of a relay WS (later to be described) also are included in the westbound trackway supply circuit for a purpose later to be made evident.

When energy of either the "westbound clear" or the "westbound approach" code is being received by the westbound track relay TRW at the east end of the westwardly extending track section, the abovementioned relay PW is picked up and contacts 209 and 210 thereof then set up connections over which the track battery TBW supplies the rails of the eastwardly extending track section with "given" polarity energy (rail 1 positive with respect to rail 2) each time that all four of the contacts of the westbound coder CTW are biased to the left. The rail supply circuit then completed may be traced from the positive terminal of battery TBW through conductor 158, contacts 145 and 147 of device CTW, conductor 159, front contact 209 of relay PW, conductor 160, track rail 1, track rail 2, conductor 165, front contact 210 of relay PW, conductor 166, contacts 146 and 144 of coding device CTW and impedance 147 back to the negative terminal of the battery TBW.

In the event, however, that no coded trackway energy is being received by the westbound track relay TRW (as when the section to the west thereof is occupied), relay PW is released and the contacts 209 and 210 thereof then set up other connections over which the westbound track battery TBW supplies the rails of the eastwardly extending track section with negative or "opposite" polarity energy (rail 2 positive with respect to rail 1) each time that contacts 144—145 of coding device CTW are biased to the left when contacts 146—147 are biased to the right. The then completed rail supply circuit may be traced from the positive terminal of battery TBW through conductor 158, contacts 145 and 147 of device CTW, conductors 159 and 213 (interconnected at each of the intermediate locations II and III by front contact 212 of relay WS), back contact 210 of relay PW, conductor 165, track rail 2, track rail 1, conductor 160, back contact 209 of relay PW, conductors 214 and 166 (interconnected at each of the intermediate locations II and III by front contact 211 of relay WS), contacts 146 and 144 of coder CTW and impedance 167 back to the negative terminal of battery TBW.

The two westbound decoder relays DW and HW also carry contacts 208 and 215 which form a part of the energizing circuit for the before described eastbound coder relay ECR and which perform therein at certain times a special function to which auxiliary coding device CTX contributes in a manner later to be made evident. Under all vacant track section conditions, however, these contacts 208 and 215 maintain conductor 169 connected (through a conductor 170) with the conductor 171 which leads directly to the winding of relay ECR; this connection enables contacts 153 and 154 of the westbound track relay TRW to control relay ECR in the manner already described.

From the foregoing it will be seen that with respect to governing westbound traffic through the A. P. B. stretch of Figs. 9a–d, the disclosed "polar code" arrangement of westbound track circuits controls the wayside signals SW in the usual automatic block system manner and thus is effective to provide the desired following protection for all westbound train moves.

The previously described "eastbound" or feed back track circuits similarly form a part of a second "polar code" system which controls the eastbound wayside signals SE to three indications in customary automatic block manner. This second polar code system is operated by the "eastbound" or "feed back" trackway codes (that selectively are supplied to the circuit rails at the east end of each section) and at the west end of each section it makes use of decoding apparatus which controls the signal SE at that location and which selects the polarity of the eastbound track circuit energy that is supplied to the track section to the west.

At each signal location this eastbound coding apparatus includes three slow release relays DE, HE and PE. All three of these slow release relays are controlled by the eastbound track relay TRE at the same location; relay DE receives energizing current over a front contact 216 of the positive polarity unit D of relay TRE (and a back contact 217 of relay HE); relay HE receives energizing current over a front contact 218 of negative polarity unit H of relay TRE (and a back contact 219 of relay DE); and relay PE is governed by all three of these devices TRE, DE and HE through the medium of contacts 216, 218, 220 and 221 thereof.

All of these contacts operate in circuits by way of which the windings of the just named slow release relays are energized from a source that again is designated by the terminals "plus" and "minus." As in the case of the corresponding westbound decoding devices, each of the eastbound slow release relays DE and HE has imparted thereto (by a snubbing resistor 182 or other suitable means) sufficient release retardation to span the "off" periods of any of the "eastbound" codes of Fig. 11; likewise, each of the relays PE is given a somewhat longer period of release delay (through the use of a snubbing resistor 189).

When the eastbound track relay TRE receives (from the rails of the eastwardly extending track section) positive or "given" polarity pulses of "eastbound clear" code energy, the first unit D of that relay responds and causes contact 216 thereof recurrently to complete for the slow release relay DE an energizing circuit which extends from the positive supply terminal through front contact 216, conductor 222, back contact 217 of relay HE, conductor 223 and the winding of relay DE back to the negative supply terminal. Due to its slow releasing characteristics, relay DE maintains its contacts continuously picked up under the stated conditions.

In releasing during each "off" period of the received "eastbound clear" code, contact 216 of the track relay TRE now completes for the slow release relay PE an energizing circuit which may be traced from the same positive supply terminal through back contact 216, conductor 224, front contact 220 of relay DE, conductor 225 and the winding of relay PE back (by way of a conductor 226 and a back contact 227 of relay WS at each of the intermediate locations II and III) to the negative supply terminal. Due to its slow releasing characteristics relay PE likewise maintains its contacts continuously picked up under the stated conditions.

Similarly, when the "eastbound approach" code of "opposite polarity" energy pulses is received by the eastbound track relay TRE, the second unit H of that relay responds and causes contact 218 recurrently to complete for the slow release relay HE an energizing circuit which extends from the positive supply terminal through front contact 218, conductor 229, back contact 219 of relay DE and the winding of relay HE back to the negative supply terminal. Under the influence of this recurrent energization, relay HE now holds its contacts continuously picked up.

In releasing during each "off" period of the received "eastbound approach" code, contact 218 of the track relay TRE now completes for the slow release relay PE an energizing circuit which may be traced from the positive supply terminal through back contact 218, conductor 230, front contact 221 of relay HE, conductor 225 and the winding of relay PE back (by way of conductor 226 and back contact 227 of relay WS at each of the intermediate locations II and III) to the negative supply terminal. As a result of this recurrent energization, relay PE again holds its contacts continuously picked up.

It will thus be evident that: (1) When neither of the units D or H of the eastbound track relay TRE is following code, all three of the relays DE, HE and PE are deenergized and hence released; (2) when the positive polar unit D is responding to coded energy, relays DE and PE are recurrently energized and thereby caused to hold their contacts continuously picked up; and (3) when the negative polar unit H of relay TRE is responding to coded energy, relays HE and PE are similarly caused to hold their contacts continuously picked up.

In determining the aspect which is displayed by the associated eastbound signal SE the three slow release relays DE, HE and PE make use of contacts 232, 233 and 234 that are included in circuits by way of which the three lamps G, Y and R of that signal selectively are supplied with lighting current. When trackway energy of the "eastbound clear" code is being received by the track relay TRE (from the eastbound track circuit) and relays DE and PE are picked up, lamp G is lighted over a circuit which includes front contact 234, a conductor 235, front contact 232 and a conductor 236; when the eastbound track circuit transmits energy of the "eastbound approach" code and thereby causes relays HE and PE to be picked up, lamp Y then receives lighting current over front contact 234, conductor 235, back contact 232, a conductor 237, front contact 233 and a conductor 238; and when no code energy is responded to by the eastbound track relay and all three of the relays DW, HW and PW are released, lamp R then is lighted over a circuit which includes back contact 234 and a conductor 239.

The slow release relay PE at the entrance of west end of each eastbound track circuit also selects the polarity of the coded energy that is supplied to the east or exit end of the eastbound track circuit that adjoins to the west. At each of the locations in the A. P. B. system this selection is accomplished by contacts 240 and 241 which are interposed between the rail supply circuit and the track battery TBE in the manner shown.

When energy of either the "eastbound clear" or "eastbound approach" code is being received by the eastbound track relay TRE at the west end of the eastwardly extending track section, the above-mentioned relay PE is picked up and contacts 240 and 241 thereof then set up connections over which the track battery TBE supplies the rails of the westwardly extending track section with "given" polarity energy (rail 1 positive with respect to rail 2) each time that contacts 155 and 156 of the eastbound coder relay ECR are released. The rail supply circuit then completed may be traced from the positive terminal of battery TBE through front contacts 241 of relay PE, conductor 174, back contact 156 of device ECR, conductor 161, track rail 1, track rail 2, conductor 164, back contact 155 of device ECR, conductor 242, impedance 178, conductor 179, front contact 240 of relay PE and conductor 173 back to the negative terminal of battery TBE.

In the event, however, that no coded trackway energy is being received by the eastbound track relay TRE (as when the section to the east thereof is occupied) relay PE is released and contacts 240 and 241 thereof then set up other connections over which the eastbound track battery TBE supplies the rails of the westwardly extending track section with negative or "opposite" polarity energy (rail 2 positive with respect to rail 1) each time that the contacts of the eastbound coder relay ECR are released. The then completed rail supply circuit may be traced from the positive terminal of battery TBE through back contact 240 of relay PE, conductor 173, impedance 178, conductor 242, back contact 155 of device ECR, conductor 164, track rail 2, track rail 1, conductor 161, back contact 156 of device ECR, conductor 174, back contact 241 of relay PE and conductor 173 back to the negative terminal of battery TBE.

From the foregoing it will be seen that with respect to governing eastbound traffic through the A. P. B. stretch of Figs. 9a–d, the disclosed "polar code" arrangement of eastbound track circuits controls the wayside signals SE in the usual automatic block system manner and thus is effective to provide following protection for all eastbound train moves.

For each stretch of single track between passing sidings the portions of the A. P. B. system of Figs. 9a–d that have been described so far thus include; (a) a westbound system of automatic block signaling that is operated by "polar code" energy transmitted over the track section rails in the direction of from west to east; (b) an eastbound system of automatic block signaling that is operated by other "polar code" energy transmitted over the same section rails but in the direction of from east to west; and (c) synchronizing means which cause the "on" periods of the eastbound code energy to coincide with the "off" periods of the westbound code energy and vice versa.

In order that a train which enters either end of the single track stretch will automatically establish its own directional protection therethrough, the complete A. P. B. system of Figs. 9a–d further includes facilities whereby advancement of the leading train vehicle past the entering headblock location (I or IV) will successively condition the opposing track circuits ahead in such manner as to set the signals for opposing traffic at "stop."

Aiding in this successive conditioning are the directional stick relays WS and ES that previously have been referred to as forming a part of the equipment at each of the intermediate signal locations II and III. As in the system of Figs. 1a–d these stick relays are controlled in customary A. P. B. manner and both of them (at each location where installed) are deenergized and stay released (as shown in Figs. 9b–c) as long as the A. P. B. stretch of single track remains vacant. Under such vacant conditions of the stretch, moreover, the green or "clear" indication is displayed by all of the wayside signals SW and SE (including headblock devices SWIV and SEI) by which the various sections of track in the stretch are guarded.

To explain how the above-mentioned directional stick relays WS and ES function in conjunction with the rest of the system under occupied conditions of the single track, a westbound train move will first be traced through the A. P. B. stretch and following this a similar tracing of an eastbound train move will be made.

A westbound train approaching the vacant A. P. B. stretch from the east gets a "clear" indication from westbound signal SWIV at the headblock location IV. As the train enters the section to the immediate east of that location it shunts the rails thereof and deenergizes the eastbound track relay TRE at location IV; that action releases all three of the associated relays DE, HE and PE; and that release: (1) puts (through back contact 234) the eastbound signal SEIV at "stop" and (2) transfers (at contacts 240 and 241) to the "opposite polarity" setup the connection over which battery TBE supplies polar code energy to the eastbound track circuits of section IV—III.

This connection transfer (at location IV) now causes the rails of section IV—III to transmit negative polar (eastbound approach) code westwardly to the eastbound track relay TRE at location III. In there following this code unit H of that relay causes the associated relays HE and PE to put the eastbound signal SEIII at yellow or "approach" and to continue the supply of positive polar (eastbound clear) code to the rails of section III—II. At location II, the reception of this positive polar code continues the eastbound signal SEII at "clear" while at location I, the "clear" indication showing by the eastbound headblock signal SEI is similarly continued.

As the leading vehicle of the westbound train passes location IV it shunts the rails of section IV—III and deenergizes the westbound track relay TRW at location IV and also the eastbound track relay TRE at location III. The former action releases all three of the relays DW, HW and PW at location IV and thereby puts the westbound headblock signal SWIV at "stop."

The latter action releases all three of the relays DE, HE and PE at location III and thereby: (1) puts the eastbound signal SEIII at "stop"; (2) transfer to the "opposite polarity" set-up the connection over which battery TBE may supply energy to the eastbound track circuit of section III—II; and (3) completes (at a contact 244 of relay PE) for the eastbound coder relay ECR (at location III) an auxiliary energizing circuit which causes that relay to hold its contacts continuously picked up.

This auxiliary energizing circuit may be traced from the positive supply terminal through a back contact 245 of relay ES, back contact 244 of relay PE, conductors 246 and 171 and the winding of relay ECR back to the negative supply terminal. As long as the just traced circuit remains completed, contacts 155 and 156 of the coder relay maintain the rails of track section III—II continuously disconnected from the eastbound track battery TBE at location III and continuously connected with the westbound track relay TRW at the same location.

The disconnection described in the preceding paragraph continuously deenergizes the eastbound track circuit for section III—II and thus releases the eastbound track relay TRE at location II; that action releases all three of the associated relays HE, DE and PE; and that release: (1) puts the eastbound signal SEII at "stop"; and (2) completes (at contact 244) for the eastbound coder relay ECR (at location II) an auxiliary energizing circuit which is a duplicate of that previously traced at location III (as including back contacts 245 and 244 and conductors 246 and 171) and which causes relay ECR to hold its contacts 155 and 156 continuously picked up whereby to disconnect the eastbound track battery TBE at location II from the rails of section II—I. That disconnection, in turn, continuously deenergizes the eastbound track circuit for section II—I and thus releases the eastbound track relay TRE at headblock location I; that action releases all three of the associated relays DE, HE and PE; and that release puts (through back contact 234) the eastbound headblock signal SEI at "stop."

This display of "stop" by the signal SEI warns approaching eastbound traffic that a westbound train has entered the east end of the A. P. B. stretch and is proceeding therethrough; it constitutes the beforementioned directional protection for westbound train moves and, as has been seen, it is provided without the aid of line wires of any kind. Once thus set up, moreover, the "stop" indication by signal SEI is uninterruptedly continued as long as any part of the westbound train remains in the A. P. B. stretch. That continuance results, as will be seen, from the fact that each advance of the train into a succeeding track section to the west does not disturb the previously effected deenergized condition of the eastbound track circuit of that succeeding stretch.

Concurrently with the just described putting of signal SEI at "stop" contacts 240 and 241 of relay PE at location I transfer to the "opposite polarity" set-up the connection over which battery TBE at that location supplies eastbound track circuit energy to the rails of the section to the immediate west. Because of this transfer, those rails now transmit "eastbound approach" code to the next signal to the west (not shown) of location I where: (1) eastbound track relay TRE (unit H) responds; (2) relays DE and PE pick up; and (3) the yellow or "approach" indication circuit for the associated eastbound signal SE is, by them, completed.

As the leading vehicle of the westbound train passes location III and shunts the rails of section III—II, westbound track relay TRW at location III becomes deenergized and causes the release of all three of the relays DW, HW and PW at the same location. That release: (1) puts the westbound signal SWIII at "stop"; and (2) picks up (over a contact 247 of relay DW) the westbound directional stick relay WS by way of a circuit that extends from the positive supply terminal through a back contact 248 of relay PE, conductor 249, back contacts 247 and 250 of relays DW and HW, conductor 251, front contact 252 of relay PW, conductor 253 and the winding of relay WS back to the negative supply terminal.

This completion of the stick relay energizing circuit occurs between the instant that relay DW first releases and the somewhat later time that the more sluggish relay PW drops out. In picking up in response to that completion the westbound directional relay WS locks itself in over a stick contact 124 which by-passes the previously mentioned (in tracing the relay pick-up circuit) front contact 252 of relay PW as long as relay WS remains energized.

One result at location III of the pick-up of relay WS is to disconnect (at contact 227) the energizing circuit for the eastbound code detecting relay PE from the negative terminal (with which it is joined by way of conductor 226) of its energizing source. As long as relay WS remains picked up, the just named relay PE is, in this manner, rendered unresponsive to code following operation of the eastbound track relay TRE.

Another result at location III of the pick-up of relay WS is to transfer (at contacts 211 and 212) to the "opposite polarity" set-up the connection over which battery TBW supplies the westbound track circuit of section IV—III with energy of the "westbound approach" (negative polar) code. This shifted rail supply connection is completed by device CTW in the usual periodic manner and the circuit of which it is constituted may be traced from the positive terminal of battery TBW through conductor 158, left biased contact 145 of device CTW, right biased contact 147 of the same device, conductor 159, front contact 212 of relay WS, conductor 213, back contact 210 of relay PW, conductor 165, track rail 2, track rail 1, conductor 160, back contact 209 of relay PW, conductor 214, front contact 211 of relay WS, conductor 166, right biased contact 146 of device CTW, left biased contact 144 of the same device and impedance 167 back to the negative terminal of battery TBW.

As the trailing vehicle of the westbound train clears location III, the rails of section IV—III transmit the just mentioned "westbound approach" (negative polar) code from location III eastwardly to the westbound track relay TRW at location IV. At that location, unit H of relay TRW responds and picks up relays HW and PW; those relays, in turn, now: (1) put the westbound headblock signal SWIV at "approach" and (2) cause the rails of the section to the east of location IV to receive energy of the "westbound clear" (positive polar) code.

As the leading vehicle of the westbound train passes location II and shunts the rails of section II—I, westbound track relay TRW at location II becomes deenergized and releases all three of the relays DW, HW and PW at the same location. That release: (1) puts the westbound signal SWII at "stop"; and (2) picks up (over contact 247 of relay DW) the westbound directional stick relay WS over a circuit that is a duplicate of the one already traced for the relay WS at location III.

As was also the case at location III, this completion at location II of the stick relay energizing circuit occurs between the instant that relay DW first releases and the somewhat later time that the more sluggish relay PW drops out; likewise, in picking up in response to that completion the relay WS at location II also locks itself in over a stick contact 124 which by-passes the later releasing front contact 252 of relay PW.

The just described pick-up of relay WS at location II: (1) establishes (at front contacts 211 and 212) a circuit by way of which the rails of section II—III are supplied (from battery TBW) with energy of the "westbound approach" (negative polar) code; and (2) disconnects (at contact 227) the eastbound code detecting relay PE from the negative terminal of its supply source. As at location III, the latter action renders the named relay PE unresponsive to code following operation of the eastbound track relay TRE.

As the trailing vehicle of the westbound train clears location II, the rails of section III—II transmit the above-mentioned "westbound approach" (negative polar) code from location II eastwardly to the westbound track relay TRW at location III. At that location unit H of relay TRW responds and picks up relays HW and PW; those relays, in turn, now: (1) put the westbound signal SWIII at "approach" and (2) cause the rails of section IV—III to receive energy of the "westbound clear" (positive polar) code. In feeding eastwardly to location IV that energy puts the westbound headblock signal SWIV at "clear."

A further result of the pick-up of relays HW and PW at location III is to break (at contact 250) the stick circuit for westbound directional relay WS and thereby cause that relay to release. This release reconnects (at contact 227) the energizing circuit of the eastbound code detecting relay PE with its energizing source and causes that relay to pick up in response to the code following operation of eastbound track relay TRE (produced by the "eastbound" code energy from location IV which continues to be transmitted westwardly over the rails of section IV—III).

That pick up of relay PE at location III: (1) breaks (at contact 244) the auxiliary energizing circuit for the eastbound coder relay ECR and thus restores that relay to the code following control of the westbound track relay TRW; and (2) returns (at contacts 240 and 241) to the "given polarity" set-up the connection over which battery TBE supplies energy to the eastbound track circuit of section III—II. In consequence the rails of that section once more receive energy of the "eastbound clear" (positive polar) code (impressed upon the rails during the "off" periods of the "westbound" code to which relay TRW is responding).

As the leading vehicle of the westbound train passes location I the accompanying shunt of the rails of the westwardly extending track section deenergizes the westbound track relay TRW at the named location and there releases all three of relays DW, HW and PW. That release: (1) puts the westbound signal SWI at "stop" and (2) establishes (over contacts 209 and 210) a connection by way of which battery TBW supplies the rails of section II—I with energy of the "westbound approach" (negative polar) code.

As the trailing vehicle of the westbound train clears location I, the rails of section II—I transmit the just mentioned "westbound approach" code energy eastwardly to the westbound track relay TRW at location II. In there responding to that energy unit H of relay TRW picks up relays HW and PW and thereby: (1) puts the westbound signal SWII at "approach"; and (2) causes the rails of section III—II to receive energy of the "westbound clear" (positive polar) code. In feeding eastwardly to location III that energy puts the westbound headblock signal SWIII at "clear."

A further result of the pick up of relays HW and PW at location II is to break (at contact 250) the stick circuit for the westbound directional relay WS and thereby cause that relay to release. This release reconnects (at contact 227) the energizing circuit of eastbound code detecting relay PE with its energizing source and thereby causes that relay to pick up in response to code following operation of the eastbound track relay TRE (produced by the "eastbound" code energy from location III which continues to be transmitted westwardly over the rails of section III—II).

That pick up of relay PE at location II: (1) breaks (at contact 244) the auxiliary energizing circuit for the eastbound coder relay ECR and thus restores that relay to the code following control of the westbound track relay TRW; and (2) returns (at contacts 240 and 241) to the "given polarity" set-up the connection over which battery TBE supplies energy to the eastbound track circuit of section II—I. In consequence the rails of that section once more receive energy of the "eastbound clear" (positive polar) code. That energy, of course, is impressed upon the rails during the "off" periods of the "westbound" code to which relay TRW is responding and in being received at location I it puts the eastbound signal SEI at "clear."

Having thus proceeded completely through the stretch of single track that is represented in Figs. 9a–d the above referred to westbound train now occupies the same position with respect to a succeeding stretch to the west (not completely shown but of which the west end of passing siding WPS may mark the east end) as it did with reference to the represented stretch when it was within the section to the east of location IV. Were, therefore, this westbound train to travel on into and through such a succeeding stretch, it would cause associated A. P. B. signaling facilities to repeat the westbound directional protection operations that have just been described.

As an introduction to a similar explanation of how eastbound directional protection is obtained, it will next be assumed that an eastbound train is about to enter (at the west location I) the A. P. B. track stretch that is represented in Figs. 9a–d. Before tracing this eastbound train through the stretch, however, certain portions of the system of Fig. 9 which function only during eastbound moves (and which thus far have been referred to only generally) will first be described.

Such system portions include the previously mentioned auxiliary coding devices CTX. One of these devices is installed at the east end of each of the track sections in the A. P. B. stretch; there it assists in causing the eastbound track circuit of that section to continue to transmit coded energy during those times that the associated westbound track circuit is rendered inactive (as will be explained presently) in providing eastbound directional protection. As will later become apparent, such continued operation of the eastbound track circuit causes each wayside signal SE that is immediately ahead of the eastbound train to display the particular "proceed" indication which conditions of the track in advance may determine.

In the particular form shown, each of these auxiliary devices CTX is provided with a single coding contact 255; that contact is periodically operated between a left position and a right position by a cam 256; and that cam is rotated continuously (by a motor or other suitable means) at any suitable constant speed which (for a purpose later to be described) is somewhat different (preferably slower though it may be higher) than that at which the cams of the westbound coding devices CTW are operated.

This coding contact 255 forms a part of a special energizing circuit that becomes effective to control the eastbound coder relay ECR when the westbound track relay TRW at the same location is continuously deenergized. Under such conditions each movement of the coding contact to its left position picks up relay ECR over a circuit which may be traced from the positive supply terminal through back contacts 153 and 154 of relay TRW, conductor 169, back contacts 208 and 215 of relays DW and HW, a conductor 257, the contact 255 of coder CTX, conductor 171 and the winding of relay ECR back to the negative supply terminal.

Preferably this circuit is supplemented by a special connection of a snubbing resistor 258 across the winding of relay ECR. That connection is represented as including a conductor 259 and it is so arranged that: (1) The snubbing resistor is continuously connected across the relay winding when the relay is being controlled in normal vacant track section manner by one or the other of the code following contacts 153 and 154 of the westbound track relay TRW; and (2) the snubbing resistor is disconnected from the relay winding during each period of relay deenergization when the device ECR is being controlled by the contact 255 of the auxiliary coder CTX.

In the former situation the resistor 258 imparts to the relay ECR a period of release delay of the before described order that is indicated at k in Fig. 11 and the then effective snubbing path may be traced from the left terminal of the winding of relay ECR through the resistor 258, conductor 259, front contact of 208 relay DW (or back contact 208 and front contact 215 of relay HW) and conductors 170 and 171 back to the right terminal of the relay winding; in the latter situation a corresponding path may be traced from the left winding terminal through the resistor 258, conductor 259, back contacts 208 and 215 of relays DW and HW, conductor 257, coding contact 255 (when biased to the left) and conductor 171 back to the right winding terminal.

Because of the just described special arrangement of the snubbing resistor connection the release delay period of the eastbound coder relay ECR is reduced during conditions of relay control by the auxiliary coding device CTX. Under such conditions, accordingly, each movement of the coding contact to its right position causes the relay ECR to release almost immediately and that release (of contacts 155 and 156), in turn, marks the beginning of an "on" period of one of the "eastbound special" codes of Fig. 11. Each of those periods continues until the coding contact 255 again returns to its left position and picks up the relay ECR by completing the before described energizing circuit for that relay.

Whenever, in consequence, the eastbound coder relay ECR is controlled by the auxiliary device CTX, that relay periodically connects the track battery TBE with the rails of the westwardly extending track section and thus produces one or the other of the just referred to "eastbound special" codes of Fig. 11. When received at the west end of the track section by the eastbound track relay TRE, the thus supplied code causes that relay to hold (for a purpose to be more completely explained presently) the controlled wayside signal SE at the particular "proceed" indication which advance traffic conditions may make proper.

With this preliminary explanation as an introduction, the signal control operations that result from the passage of an eastbound train through the single track stretch of Figs. 9a–d will now be described. As in the case of the corresponding tracing of a westbound move, this description will start with the assumption that the entire length of the named stretch is vacant. Under that condition (as has been seen) both the westbound and the eastbound track circuits for each of the sections in that stretch are operating simultaneously; both of the stick relays WS and ES at each intermediate location are released; and all of the wayside signals SW and SE are showing "clear."

An eastbound train approaching this vacant stretch from the west thus gets a "clear" indication from the eastbound signal SEI at headblock location I. As the train enters the section to the immediate west of that location, it shunts the rails thereof and deenergizes the westbound track relay TRW at location I; that action releases all three of the associated relays DE, HW and PW; and that release: (1) puts (through back contact 202) the westbound signal SWI at "stop" and (2) transfers (at contacts 209 and 210) to the "opposite polarity" set-up the connection over which battery TBW supplies energy to the westbound track circuit of section I—II.

This connection transfer (at location I) now causes the rails of section I—II to transmit negative polar (westbound approach) code eastwardly to the westbound track relay TRW at location II. In there following this code unit H of that relay causes the associated relays HW and PW to put the westbound signal SWII at "approach" and to continue the supply of positive polar (westbound clear) code to the rails of section II—III. At location III the reception of this positive polar code continues the westbound signal SWIII at "clear"; at location IV the "clear" indication showing by the westbound headblock signal SWIV is similarly continued.

As the leading vehicle of the eastbound train passes location I it shunts the rails of section I—II and thereby deenergizes the eastbound track relay TRE at location I and also the westbound track relay TRW at location II. The former action releases all three of the relays DE, HE and PE at location I and thereby puts the eastbound headblock signal SEI at "stop." The latter action releases all three of the relays DW, HW and PW at location II and thereby: (1) puts the westbound signal SWII at "stop"; and (2) interrupts (at contacts 209 and 210) the connection over which battery TBW previously supplied energy of the positive polar (westbound clear) code to the westbound track circuit of section II—III.

This connection interruption resulted (as above stated) from contacts 209 and 210 of relay PW going to the released position and thus joining the rail supply conductors 160 and 165 with the heels of contacts 211 and 212 of relay WS. In their now released positions the last named contacts maintain the rails of track section II—III continuously disconnected from the westbound track battery TBW at location II and continuously connected with the eastbound track relay TRE at the same location. This latter connection is by way of a circuit that extends from the track rail 1 through conductor 160, back contact 209 of relay PW, conductor 214, back contact 211 of relay WS, conductors 172 and 177, the windings of relay TRE, conductors 176 and 175, back contact 212 of relay WS, conductor 213, back contact 210 of relay PW and conductor 165 back to track rail 2.

The track battery disconnection that is described in the preceding paragraph continuously deenergizes the westbound track circuit for section II—III and thus releases the westbound track relay TRW at location III; that action releases all three of the associated relays DW, HW and PW; and that release: (1) puts the westbound signal SWIII at "stop"; (2) continuously connects (over contacts 209 and 210) the rails of section III—IV with the eastbound track relay TRE at location III; and (3) continuously disconnects (again at contacts 209 and 210) those rails from the westbound track battery TBW at the same location.

The just named disconnection continuously deenergizes the westbound track circuit of section III—IV and thus releases the westbound track relay TRW at headblock location IV; that action releases all three of the associated relays DW, HW and PW; and that release puts (through back contact 202) the westbound headblock signal SWIV at "stop."

This display of "stop" by the signal SWIV warns approaching westbound traffic that an eastbound train has entered the west end of the A. P. B. stretch and is proceeding therethrough; it constitutes the beforementioned directional protection for eastbound moves; and, as has been seen, it is provided without the aid of line wires of any kind. Once thus set up, moreover, the "stop" indication by signal SWIV is uninterruptedly continued as long as any part of the eastbound train remains in the A. P. B. stretch. That continuance results, as will be seen, from the fact that each advance of the train into a succeeding track section to the east does not disturb the previously effected "directional protection" condition of the westbound track circuits still further ahead.

Concurrently with the just described putting of signal SWIV at "stop," contacts 209 and 210 of relay PW at location IV transfer to the "opposite polarity" set-up the connection over which battery TBW at that location supplies westbound track circuit energy to the rails of the section to the east; because of this transfer those rails now transmit "westbound approach" code to the next signal location to the east (not shown) of location IV where: (1) westbound track relay TRW (unit H) responds; (2) relays HW and PW pick up; and (3) the associated westbound signal SW is by those relays put at "approach."

Attention will now be returned to the eastbound train which has just entered section I—II. Before that train reached location I, it has been seen that all of the eastbound signals SE for the A. P. B. stretch (assumed to be vacant) showed the "clear" indication; it has also been seen that after the leading vehicle of the train advanced past location I, signal SEI went to "stop" (as was proper) and that the westbound track circuit for each of the advance sections II—III and III—IV became continuously deenergized (incident to the just explained provision of eastbound directional protection).

As has further been pointed out, the resulting deenergization of the westbound track relay TRW at each of locations III and IV released both of the relays DW and HW at each of those locations; that release, in turn, continuously interrupted (at contacts 208 and 215) the circuit over which eastbound coder relay ECR at each named location receives operating current (under the code following control of contacts 153 and 154 of relay TRW) during vacant conditions of the westwardly extending section of track.

Without more, accordingly, the mentioned deenergization of each of the westbound track circuits would produce an uninterrupted energization (track battery TBE continuously connected with the rails over released contacts 155 and 156 of relay ECR) of the eastbound track circuit for the same section; that continuous energization would be ineffective for picking up the eastbound code detecting relay PE at the west end of the section; and the there located eastbound signal SE would be put at "stop." Under the assumed vacant conditions of the track in advance of the eastbound train, such an indication on the part of either of the signals SEII and SEIII is, of course, improper.

To cause these signals to show such "proceed" indications as advance traffic conditions may make proper, use is made of the beforementioned auxiliary coding devices CTX. As already pointed out, one of these devices is installed at the east end of each of the track sections in the A. P. B. system; under continuously deenergized conditions of the westbound track relay TRW at the same location that device there periodically completes (at contact 255) its special energizing circuit for the eastbound coder relay ECR; and when so specially controlled that coder relay causes the rails of the track section to the west to be supplied with energy of one of the "eastbound special" codes of Fig. 11.

When, now, the eastbound train has entered section I—II and caused the westbound track relay TRW at each of the advance locations II, III and IV to become continuously deenergized (as before described), the eastbound coder relay ECR at each of those locations is assigned to the special control of the auxiliary coder CTX. In consequence, the eastbound track circuit for each of the track sections to the west of the named locations receives energy of one of the "eastbound special" codes referred to above.

As long as the eastbound track relay TRE at the coder location is following code, relay PE is picked up and contacts 240 and 241 thereof set up the "given polarity" connection which causes the special code to be of the "eastbound A" (positive polar) variety; in the event, however, that relay TRE is inactive (as under occupied conditions of the track section to the east) relay PE is released and contacts 240 and 241 thereof then set up the "opposite polarity" connection which causes the special code to be of the "eastbound B" (negative polar) variety. Under the assumed vacant conditions of the A. P. B. stretch, accordingly, the special eastbound code that is supplied from each of the locations II, III and IV is of the former (positive polar) variety.

Section I—II now being occupied, the special code that originates at location II has no effect upon signal SEI (as it does not reach eastbound track relay TRE at location I). Since, however, section II—III now is vacant, the "eastbound special A" code that is supplied from location III is transmitted westwardly to track relay TRE at location II where unit D thereof responds in the usual manner and causes decoding relays DE and PE to hold the wayside signal SEII at the desired "clear" indication; the section III—IV also being vacant the "eastbound special A" code that is supplied from location IV likewise is transmitted westwardly to the track relay TRE at location III which there causes the associated decoding relays DE and PE to hold the wayside signal SEIII at "clear."

Were the specially supplied codes to be of the "eastbound B" (negative polar) variety it will be apparent that unit H (instead of unit D) of relay TRE then would respond and cause decoding relays HE and PE to hold the controlled eastbound signal SE at "approach" instead of "clear." In the manner just described, therefore, each of the eastbound signals SE in the A. P. B. system is at all times caused to display the particular indication which traffic conditions of the track to the east thereof may make proper.

As the leading vehicle of the before discussed eastbound train passes location II and shunts the rails of section II—III, eastbound track relay TRE at location II becomes deenergized and causes the release of all three of the relays DE, HE and PE at the same location. That release: (1) puts the eastbound signal SEII at "stop"; (2) transfers (at contacts 240 and 241) to the "opposite polarity" set-up the connection over which the battery TBE may supply energy to the eastbound track circuit of section I—II; and (3) picks up (over a contact 261 of relay DE) the eastbound directional stick relay ES by way of a circuit that extends from the positive supply terminal through a back contact 262 of relay PW, conductor 263, back contact 261 of relay DE, a back contact 264 of relay HE, conductor 265, a front contact 266 of relay PE, conductor 267 and the winding of relay ES back to the negative supply terminal.

This completion of the stick relay energizing circuit occurs between the instant that relay DE first releases and the somewhat later time that the more sluggish relay PE drops out. In picking up in response to that completion, the eastbound directional relay ES locks itself in over a stick contact 88 which by-passes the previously mentioned (in tracing the relay pick-up circuit) front contact 266 of relay PE as long as relay ES remains energized.

One result at location II of the pick up of relay ES is to disconnect (at contact 195) the energizing circuit for the westbound code detecting relay PW from the negative terminal (with which it is joined by way of conductor 194) of its energizing source. As long as relay ES remains picked up, the just named relay PW is, in this manner, rendered unresponsive to code following operation of the westbound track relay TRW.

Another result at location II of this pick up of relay ES is to prevent (at contact 245) steady pick-up current from being supplied (over back contact 244 of relay PE and conductor 246) to the eastbound coder relay ECR. That relay, in consequence, continues to be controlled by the auxiliary coder CTX as long as any part of the train remains in section I—II.

As the trailing vehicle of the eastbound train clears location II, the rails of section I—II once more transmit "westbound" code energy from track battery TBW at location I eastwardly to the heels of contacts 155 and 156 of the eastbound coder relay ECR at location II. At the instant that section I—II is vacated the just named relay ECR is repeatedly picking up in releasing the named contacts in a manner to produce one of the "eastbound special" codes of Fig. 11. That code has (as previously pointed out) a rate of pulse recurrence which is different (preferably less) than that of the now received "westbound" code so that very soon an "off" period of the "eastbound special" code coincides with an "on" period of the "westbound" code.

When that happens, the "on" period pulse of "westbound" code energy is transmitted over front contacts 155 and 156 of relay ECR to the westbound track relay TRW at location II. In responding to that pulse, relay TRW now picks up (over contact 183 or over contact 185) one or the other of the associated relays DW and HW; that pick up, in turn, removes (at contact 208 or at contact 215) the control of the eastbound coder relay ECR from the auxiliary device CTX and restores it to the westbound track relay TRW; and that restored control causes relay ECR once more to code for the eastbound track circuit of section I—II negative polar energy (from track battery TBE at location II) in accordance with the "eastbound approach" pattern of Fig. 11.

In being received by the eastbound track relay TRE at location I, this eastbound track circuit energy operates unit H of that relay and thereby picks up relays HE and DE; those relays, in turn, now: (1) put the eastbound headblock signal SEI at "approach" and (2) cause the rails of the section to the west of location I to receive energy of the "eastbound clear" (positive polar) code.

As the leading vehicle of the eastbound train passes location III and shunts the rails of section III—IV, eastbound track relay TRE at location III becomes deenergized and releases all three of the relays DE, HE and PE at the same location. That release: (1) puts the eastbound signal SEIII at "stop"; (2) transfers (at contacts 240 and 241) to the "opposite polarity" set-up the connection over which the battery TBE may supply energy to the eastbound track circuit of section II—III; and (3) picks up (over contact 261 of relay DE) the eastbound directional stick relay ES over a circuit that is a duplicate of the one already traced for relay ES at location II.

As was the case at location II, this completion at location III of the stick relay energizing circuit occurs between the instant that relay DE first releases and the somewhat later time that the more sluggish relay PE drops out; likewise, in picking up in response to that completion, the relay ES at location III also locks itself in over a stick contact 88 which by-passes the later releasing front contact 266 of relay PE.

The just described pick up of relay ES at location III: (1) prevents (at contact 245) steady pick-up current from being supplied (over back contact 244 of relay PE and conductor 246) to the eastbound coder relay ECR; and (2) disconnects (at contact 195) the energizing circuit for the westbound code detecting relay PW from the negative terminal of its supply source. As at location III, the former action continues the coder relay ECR under the control of the auxiliary device CTX while the latter action renders relay PW unresponsive to code following operation by the westbound track relay TRW.

As the trailing vehicle of the eastbound train clears location III the rails of section II—III once more transmit "westbound" code energy from track battery TBW at location II eastwardly to the contacts (155 and 156) of the eastbound coder relay ECR at location III. In the same way as previously took place at location II, an early pulse of that energy is transmitted to the westbound track relay TRW; one or the other of the associated relays DW and HW is by it picked up; the control of relay ECR then is removed from the auxiliary device CTX and restored to the track relay TRW; and energy of the "eastbound approach" code once more is supplied to the rails of the section II—III.

At location II that eastbound track circuit energy is received by the eastbound track relay TRE where unit H thereof responds and picks up relays HE and PE. That pick up puts the eastbound signal SEII at "approach" and causes the rails of section I—II to receive energy of the "eastbound clear" (positive polar) code. In feeding westwardly to location I that energy puts the eastbound headblock signal SEI at "clear."

A further result of the pick up of relays HE and PE at location II is to break (at contact 254) the stick circuit for directional relay ES and thereby release that relay. This release reconnects (at contact 195) the energizing circuit of the westbound code detecting relay PW with its supply source and once more allows that relay to pick up in response to the code following operation of westbound track relay TRW (produced by the "westbound" code energy from location I which continues to be transmitted eastwardly over the rails of section I—II). That pick up, in turn, returns (at contacts 209 and 210) to the "given polarity" set-up the connection over which battery TBW supplies energy to the westbound track circuit of section II—III.

As the leading vehicle of the eastbound train passes location IV the accompanying shunt of the rails of the eastwardly extending track section deenergizes the eastbound track relay TRE at the same location and there releases all three of the relays DE, HE and PE. That release: (1) puts the eastbound signal SEIV at "stop" and (2) establishes (over contacts 240 and 241) a connection by way of which battery TBE supplies the rails of section III—IV with energy of the "eastbound approach" (negative polar) code.

As the trailing vehicle of the eastbound train clears location IV the rails of section III—IV once more transmit "westbound" code energy from track battery TBW at location III eastwardly to the contacts (155 and 156) of the eastbound coder relay ECR at location IV. In the same way as previously took place at locations II and III an early pulse of that energy is transmitted to the westbound track relay TRW; one or the other of the associated relays DW and HW is by it picked up; control of the coder relay ECR then is removed from the auxiliary device CTX and restored to the track relay TRW; and energy of the "eastbound approach" code once more is supplied to the rails of section III—IV.

At location III that eastbound track circuit energy is received by the eastbound track relay TRE where unit H thereof responds and picks up relays HE and PE. That action puts the eastbound signal SEIII at "approach" and causes the rails of section II—III to be supplied with energy of the "eastbound clear" (positive polar) code. In feeding westwardly to location II that energy puts the eastbound signal SEII at "clear."

A further result of the pick up of relays HE and PE at location III is to break (at contact 254) the stick circuit for directional relay ES and thereby release that relay. This release reconnects (at contact 195) the energizing circuit of the westbound code detecting relay PW with its supply circuit and once more allows that relay to pick up in response to the code following operation of westbound track relay TRW. That pick up, in turn, returns (at contacts 209 and 210) to the "given polarity" set-up the connection over which battery TBW supplies energy to the westbound track circuit of section III—IV. Under the control of the "westbound clear" code that now is transmitted to location IV westbound signal SWIV now goes to "clear."

Having thus proceeded completely through the stretch of single track that is represented in Figs. 9a–d, the above referred to eastbound train now occupies the same position with respect to a succeeding stretch to the east (not completely shown but of which the east end of passing siding EPS may mark the west end) as it did with reference to the represented stretch when it was within the section to the west of location I. Were, therefore, this eastbound train to travel on into and through this succeeding stretch, it would cause associated A. P. B. signaling facilities to repeat the eastbound directional protection operations that have just been described.

In addition to providing this customary directional protection the improved non-line-wire A. P. B. system of Figs. 9a–d further affords the usual following protection and does this wholly by means of the already described coded energy (see Fig. 11) which is transmitted through the track rails.

This following protection is automatically set up behind every train that travels through the stretch in either direction; for westbound train moves the signal indications incident thereto are produced by the "westbound" system of automatic block control (that is operated by "polar code" energy transmitted over the rails of each track section in the direction of from west to east); and for eastbound train moves the signal indications incident thereto are similarly produced by the "eastbound" system of automatic block control (that is operated by other "polar code" energy transmitted over the same section rails in the direction of from east to west).

The manner in which the westbound (first "polar code") scheme of automatic block signaling functions to provide following protection for westbound train moves will first be considered. In entering the A. P. B. stretch (of Figs. 9a–d) from the east and advancing past locations IV, III, II and I thereof, the westbound train successively deenergizes (as previously pointed out) the track relays TRW at those locations and thus successively conditions: (1) each of the westbound signals SWIV, SWIII, SWII and SWI to show "stop"; and (2) each associated track battery TBW to supply the rails of the section to the east with energy of the "westbound approach" (negative polar) code.

Once established, the mentioned "stop" aspect conditioning of each westbound signal continues until the trailing vehicle of the train clears the next location to the west. When that happens: (1) the rails of the just vacated section transmit the above referred to "westbound approach" energy to relay TRW at the east end thereof;

(2) the signal SW at that east end is thereby conditioned to show "approach"; and (3) the track battery TBW at the same location is connected to supply the rails of the succeeding section to the east with energy of the "westbound clear" (positive polar) code.

At the east end of that succeeding section, track relay TRW responds in the usual manner and: (1) conditions the signal SW which it controls to display "clear"; and (2) conditions the track battery TBW at the same location to supply "westbound clear" code energy to the rails of the succeeding section to the east. At the east end of that section (and also at the east end of each succeeding vacant track section still further to the east) the same actions are repeated.

It will thus be seen that the westbound scheme of automatic block signaling which is included in the complete A. P. B. system of Figs. 9a–d provides the usual following protection for all westbound train moves.

The manner in which the eastbound (second "polar code") scheme of automatic block signaling junctions to provide following protection for eastbound train moves will next be considered. In entering the A. P. B. stretch (of Figs. 9a–d) from the west and advancing past locations I, II, III and IV thereof, an eastbound train successively deenergizes (as previously pointed out) the track relays TRE at those locations and thus successively conditions: (1) each of the eastbound signals SEI, SEII, SEIII and SEIV to show "stop"; and (2) each associated track battery TBE to supply the rails of the section to the west with energy of the "eastbound approach" (negative polar) code.

Once established, the mentioned "stop" aspect conditioning of each eastbound signal continues until the trailing vehicle of the train clears the next location to the east. When that happens: (1) the rails of the just vacated section transmit the above referred to "eastbound approach" code energy to relay TRE at the west end thereof; (2) the signal SE at that west end is thereby conditioned to show "approach"; and (3) the track battery TBE at the same location is connected to supply the rails of the succeeding section to the west with energy of the "eastbound clear" (positive polar) code.

At the west end of that succeeding section the track relay TRE responds in the usual manner and: (1) conditions the signal SE which it controls to display "clear"; and (2) conditions the track battery TBE at the same location to supply "eastbound clear" code energy to the rails of the succeeding section to the west. At the west end of that section (and also at the west end of each succeeding section of vacant track still further to the west) the same actions are repeated.

It will thus be seen that the eastbound scheme of automatic block signaling which is included in the complete A. P. B. system of Figs. 9a–d provides the usual following protection for all eastbound train moves.

*Summary*

While all of the just described improvements of my invention have been disclosed in connection with A. P. B. systems (Figs. 1a–e and Figs. 9a–d) which include only two intermediate locations (II and III) and which provide for only three indications ("clear," "approach" and "stop") on the part of the traffic governing signals, it will be apparent that these same improvements also may be applied to systems: (1) wherein the A. P. B. stretch includes either more or less than two intermediate locations and/or (2) wherein the signals identified with the stretch are controlled to either more or less than three indications.

To adapt, for example, the herein disclosed three indication systems for the provision of four indication signal control only the following supplements to the present apparatus thereof are necessary: In the system of Figs. 1a–e, add (1) facilities for another distinctive-rate code (such as of 120 energy pulses per minute) to the "frequency code" scheme of eastbound traffic control and (2) facilities for another distinctive-polarity code (such as of alternate pulses of positive and negative polarity energy) to the "polar code" scheme of westbound traffic control; in the system of Figs. 9a–d, add facilities for another distinctive-polarity code (such as of alternate pulses of positive and negative polarity energy) to each of the "polar code" westbound and eastbound schemes of traffic control.

Figure 9A:
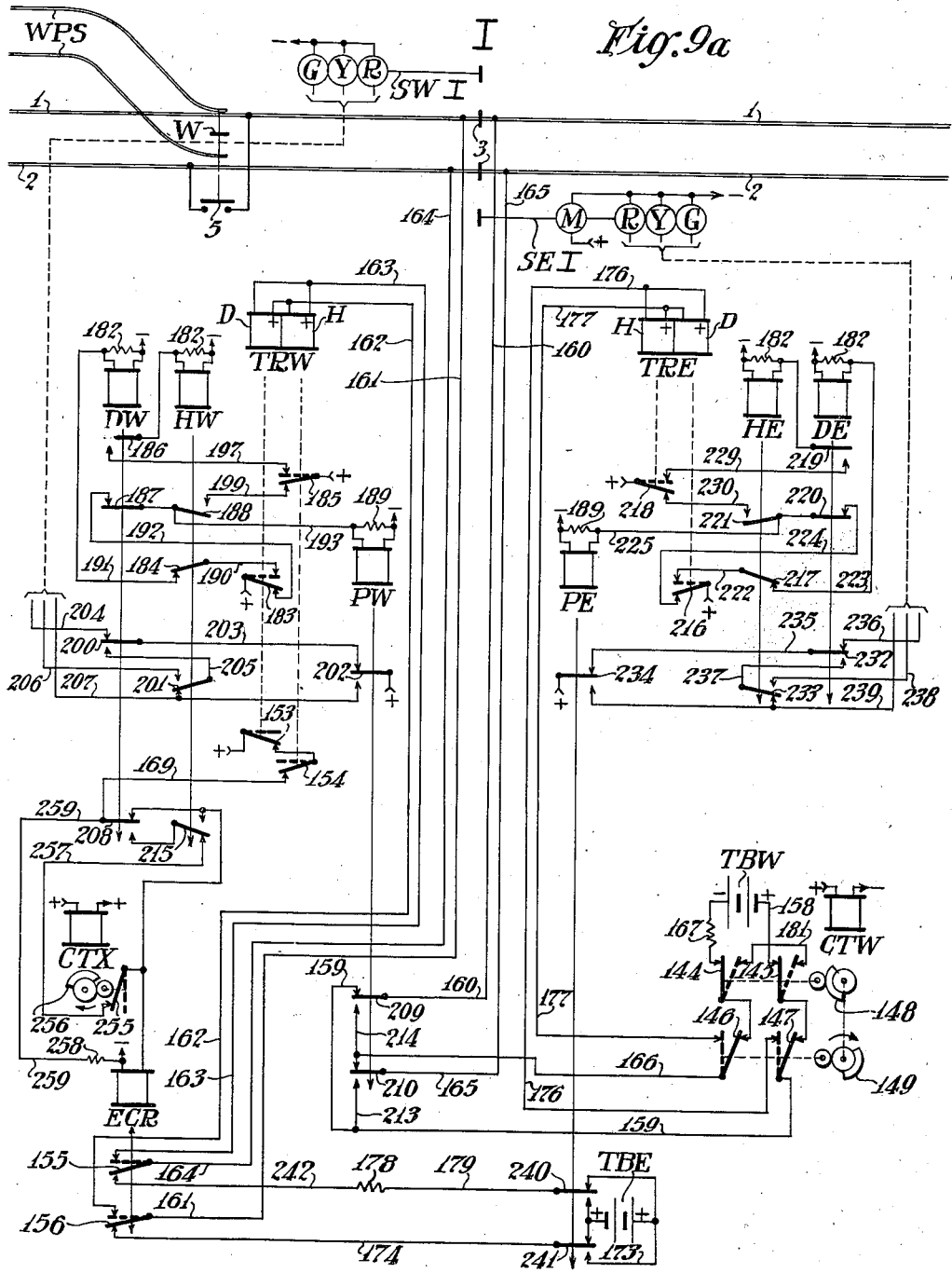
Figure 9B:
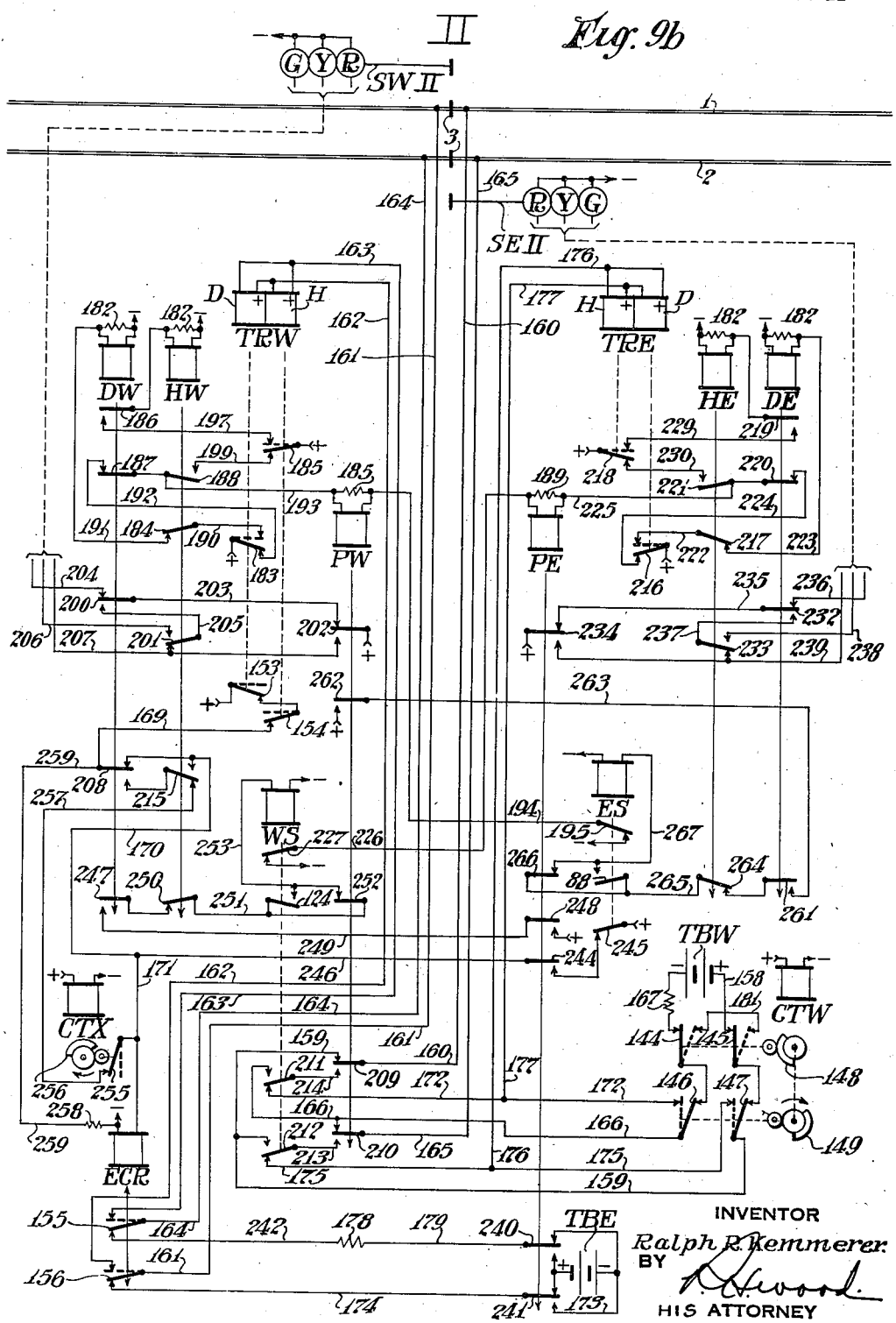
Figure 9C:
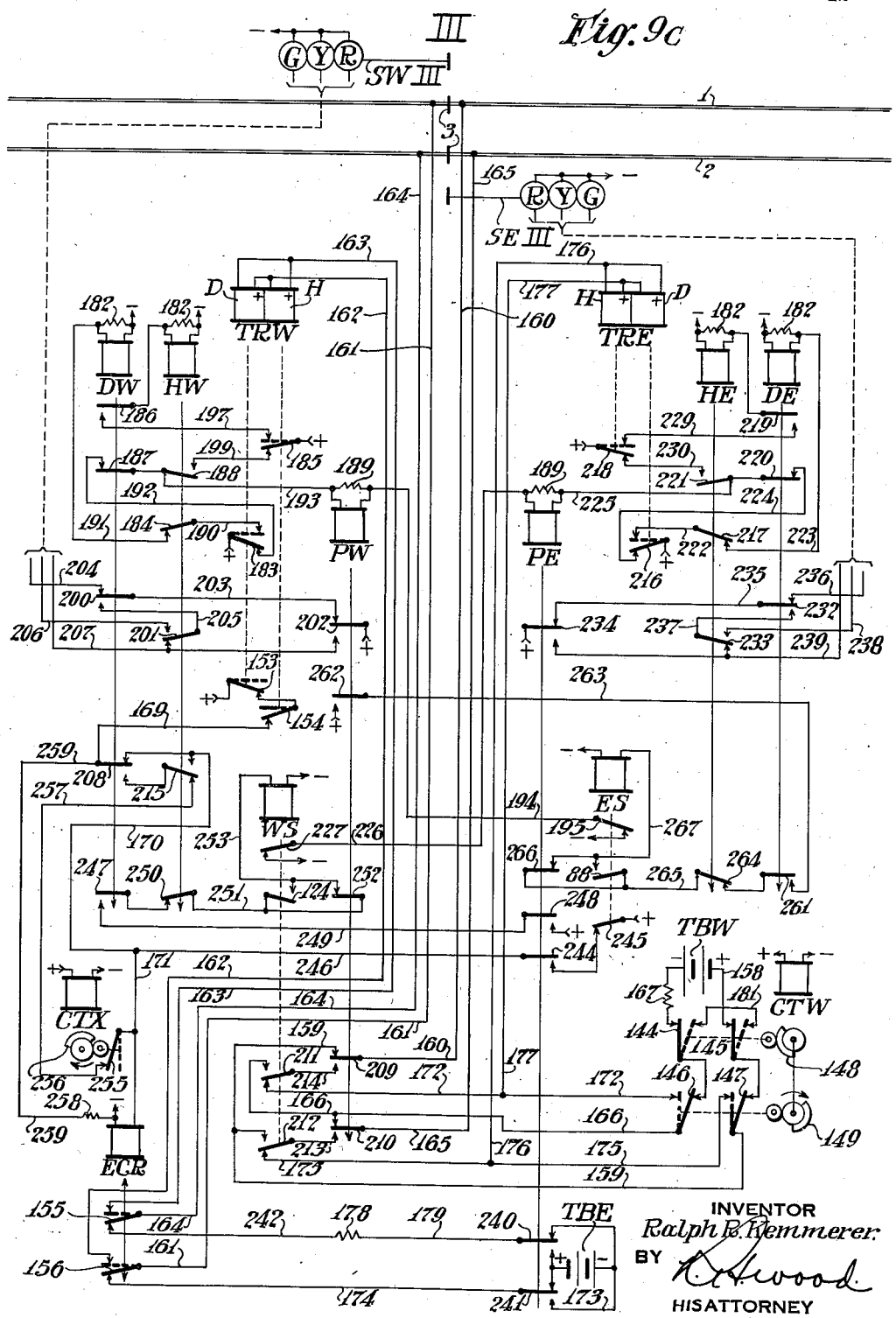

Likewise, while the two-way track circuits ("eastbound" and "westbound" for each section) of the system of Figs. 1a–e are shown as receiving operating energy from an alternating current source B—C—NX and while those of the system of Figs. 9a–d are shown as receiving operating energy from the direct current sources TBE and TBW, it will further be apparent that the track circuits of Fig. 1 (see the simplified showing of Fig. 5) may readily be modified to operate on direct current energy and that those of Fig. 9 (see the simplified showing of Fig. 10) may similarly be modified to operate on alternating current energy.

Moreover, while the two-way coded feed back track circuit scheme of Figs. 1 and 5 locates its "master" (code transmitter CT for the eastbound track circuit) and its "feed back" (coder relay TR for the westbound track circuit) ends at the east and the west ends of the track section and while that of Figs. 9 and 10 locates its "master" (code transmitter CTW for the westbound track circuit) and its "feed back" (coder relay ECR for the eastbound track circuit) ends at the section west and east ends, it will still further be apparent that the stated relation is optional and that without interfering with the desired simultaneous operation of the two track circuits the master and the feed back ends of either of the named schemes may be interchanged.

From the foregoing, therefore, it will be seen that I have made highly practical improvements in absolute permissive block (A. P. B.) systems of signaling for stretches of railway track over which traffic may move in either direction.

In particular I have provided fully automatic systems of A. P. B. signaling: (1) that require no line wires of any kind for signal control purposes; (2) that afford both directional and following protection wholly by means of coded energy which is transmitted through the track rails; (3) that retain all of the advantages of continuously coded track circuits; (4) that employ track circuits which are operable either by alternating current energy or by direct current energy; (5) that are adapted to control either or both wayside signals and train carried cab signals; and (6) that may include signal blocks which both do and do not contain cut sections.

All of the features above named result in advantages that are both desirable and practical. The stated elimination of signal control line wires lowers the cost of the A. P. B. installation; the stated use of coded track circuits affords immunity to foreign trackway energy and thus gives the system a high inherent factor of safety; and the features last named cause the system to be universally applicable.

Although I have herein shown and described only a few forms of A. P. B. signaling apparatus embodying my invention, it is understood that various changes and modifications may be made therein within the scope of the appended claims without departing from the spirit and scope of my invention.

Having thus described my invention, what I claim is:

1. In a system of railway signaling, the combination of a control circuit that includes a pair of conductors which normally are capable of transmitting energy between given and opposite ends of the circuit but which at times are rendered incapable of such transmission, means at the given end of said circuit for supplying the conductors thereof with master code energy in the form of recurring pulses that are separated by "off" period intervals, means located at the opposite end of said circuit and operated by the there received pulses of said master code energy for further supplying the circuit conductors with feed back energy in the form of pulses that recur in step with said master code "off" periods and that are of normal polarity at times and of reverse polarity at other times, and traffic governing apparatus controlled by the conductor transmitted pulses of said feed back energy and selectively responsive according as those pulses have said normal polarity or said reverse polarity.

2. In a system of railway signaling, the combination of a control circuit that includes a pair of conductors which normally are capable of transmitting energy between given and opposite ends of the circuit but which at times are rendered incapable of such transmission, a master coding device at the given end of said circuit, a source of master energy also at said given circuit end intermittently connected across the circuit conductors by said coding device, a source of feed back energy at the opposite end of said circuit, a first code following relay also at said opposite circuit end operated by the there received pulses of said master energy and connecting said feed back source with the circuit conductors during the intervals between received master pulses, means excluding pick-up current from said first relay during each feed back source-to-conductor connection which that relay makes, other relay equipment at said given circuit end operated by the there received pulses of feed back energy and disconnected from the circuit conductors during each master source-to-conductor connection which said coding device makes, means for causing said opposite end supplied pulses of feed back energy to have normal polarity at times and reverse polarity at other times, and signaling means controlled by said other relay equipment and distinctively responsive to the polarity of the received feed back energy by which that equipment is operated.

3. In combination, a section of railway track, means at a given end of said section for supplying the rails thereof with master code energy in the form of recurring pulses that are separated by "off" period intervals, means located at the opposite end of said section and operated by the there received pulses of said master code energy for further supplying the section rails with feed back energy in the form of pulses that recur in step with said master code "off" periods and that are of normal polarity at times and of reverse polarity at other times, and traffic governing apparatus controlled by the rail transmitted pulses of said feed back energy and selectively responsive according as those pulses have said normal polarity or said reverse polarity.

4. In combination, a stretch of railway track, a track section included in said stretch, means at a given end of said section for supplying the rails thereof with master code energy in the form of recurring pulses that are separated by "off" period intervals, means located at the opposite end of said section and operated by the there received pulses of said master code energy for further supplying the section rails with feed back energy in the form of pulses that recur in step with said master code "off" periods, means also at said section opposite end for causing said there supplied pulses of feed back energy to have normal polarity when the track approaching said opposite end is vacant and to have reverse polarity when that track is occupied, and traffic governing apparatus controlled by the rail transmitted pulses of said feed back energy and selectively responsive according as those pulses have said normal polarity or said reverse polarity.

5. In combination, a stretch of railway track that is arranged into adjoining first and second track sections, means at a given end of each of said sections for supplying the rails thereof with master code energy in the form of recurring pulses that are separated by "off" period intervals, means located at the opposite end of each section and operated by the there received pulses of said master code energy for further supplying the section rails with pulses of feed back energy which recur in step with said master code "off" periods, a slow release selector relay installed at the junction of said two sections and energized in step with the there received pulses of said first section feed back energy whereby to be maintained picked up as long as said first section remains vacant and to release only when a train comes into that section, means governed by said relay for causing said supplied pulses of second section feed back energy to have normal polarity when the relay is picked up and reverse polarity when the relay is released, and traffic governing apparatus controlled by the rail transmitted pulses of said second section feed back energy and selectively responsive according as those pulses have said normal polarity or said reverse polarity.

6. In combination, a section of railway track, means at a given end of said section for supplying the rails thereof with master code energy in the form of recurring pulses that are separated by "off" period intervals, means located at the opposite end of said section and operated by the there received pulses of said master code energy for further supplying the section rails with feed back energy in the form of pulses that recur in step with the said master code "off" periods and that are of normal polarity at times and of reverse polarity at other times, a pair of code following track relays installed at said section given end and respectively responsive only to the there received pulses of said normal polarity feed back energy and only to the there received pulses of said reverse polarity feed back energy, a first repeater relay which picks up in response to code following operation on the part of said normal polarity track relay and which releases only when that relay ceases to follow code, a second repeater relay which picks up in response to code following operation on the part of said reverse polarity track relay and which releases only when that relay ceases to follow code, and traffic governing apparatus controlled by said two repeater relays and distinctively responsive to different picked up and released conditions thereof.

7. In combination, a section of railway track, means at a given end of said section for supplying the rails thereof with master code energy in the form of recurring pulses that are separated by "off" period intervals, means located at the opposite end of said section and operated by the there received pulses of said master code energy for further supplying the section rails with feed back energy in the form of pulses that recur in step with the said master code "off" periods and that are of normal polarity at times and of reverse polarity at other times, a pair of code following track relays installed at said section given end and respectively responsive only to the there received pulses of said normal polarity feed back energy and only to the there received pulses of said reverse polarity feed back energy, a first repeater relay which picks up only in response to code following operation on the part of said normal polarity track relay, a second repeater relay which picks up only in response to code following operation on the part of said reverse polarity track relay, a third repeater relay which picks up in response to code following operation on the part of each of said two track relays and which releases only when both of those track relays cease to follow code, and traffic governing apparatus controlled by said three repeater relays and distinctively responsive to different picked up and released conditions thereof.

8. In combination, a section of railway track, a source of trackway energy at a given end of said section, a similarly located master coding device having contacts which repeatedly move between first and second positions, means including said contacts for recurrently connecting said source to the rails of said section whereby to produce one or another of a plurality of master trackway codes each of which consists of alternate "on" and "off" periods, means located at the opposite end of said section and governed by the there received pulses of said master code energy for further supplying the section rails with feed back energy in the form of recurring pulses that coincide with the said master code "off" periods and that are of normal polarity at times and of reverse polarity at other times, a code following track relay equipment at said given section end, means including said contacts of the there located master coding device for connecting said equipment with said section rails during said master code "off" periods only whereby to render that equipment unresponsive to master energy from said given end source and responsive only to the said feed back energy which is received at said given section end, and traffic governing apparatus controlled by said given end track relay equipment and distinctively responsive according as the pulses of the said feed back energy by which that equipment is operated have said normal polarity or said reverse polarity.

9. In combination, a section of railway track, means at a given end of said section for supplying the rails thereof with master code alternating current energy in the form of recurring "on" period pulses that are separated by "off" period intervals, a code following track relay at the opposite end of said section connected with said rails and operated by the said master code energy that is received therefrom, a source of other alternating current energy at said opposite section end, means controlled by said track relay for connecting said opposite end source with the section rails during each "off" period of the received master code whereby to supply those rails with other energy in the form of recurring pulses that coincide with said master code "off" periods, an impedance transformer serially included in the aforesaid rail-to-track relay connection and being provided with a control winding, means for open circuiting said control winding during each supplied pulse of said other energy whereby then to introduce into said rail-to-track relay connection added impedance which prevents that other energy from picking up said track relay, means for by-passing said control winding at all other times whereby then to lower the aforesaid connection impedance in order that said track relay will respond to master code energy which is received thereby, means for terminating each of the aforesaid pulses of other energy before the beginning of the succeeding master code "on" period whereby to condition said track relay for immediate response to the energy of each of those succeeding "on" periods, and traffic governing apparatus controlled by the recurring pulses of said other energy with which the section rails are supplied.

10. In combination, a section of railway track, means at a given end of said section for supplying the rails thereof with master code energy in the form of recurring "on" period pulses that are separated by "off" period intervals, a code following track relay at the opposite end of said section connected with said rails and operated by the said master code energy that is received therefrom, a source of other energy at said opposite section end, a circuit completed over a back contact of said track relay for connecting said source with the section rails during each "off" period of the received master code whereby to supply those rails with other energy in the form of recurring pulses that coincide with said master code "off" periods, means for increasing the impedance of said rail-to-track relay connection during each thus supplied pulse of said other trackway energy whereby to render said track relay unresponsive to that other energy, a delayed releasing relay which repeats the code following operation of said track relay and which has a front contact that is included in the said source-to-rail connecting circuit for the purpose of terminating before the beginning of the next received master code "on" period each pulse of the said other energy with which the section rails are supplied, and traffic governing apparatus controlled by those recurring pulses of said other energy.

11. In combination, a section of railway track, means at a given end of said section for supplying the rails thereof with master code energy in the form of "on" period pulses that recur at one or another of a plurality of distinctive rates and that are separated by "off" period intervals, a code following track relay at the opposite end of said section connected with said rails and operated by the said master code energy that is received therefrom, a source of other energy at said opposite section end, a circuit controlled by said track relay for connecting said source with said section rails during each "off" period of the received master code whereby to supply those rails with other energy in the form of recurring pulses that coincide with said master code "off" periods, means for rendering said track relay unresponsive to said pulses of other energy, a slow release relay which repeats the code following operations of said track relay and which releases at a time following each track relay drop-out which is less than the shortest "off" period of any of the said master codes to which the track relay responds, a front contact of said repeating relay included in said source-to-rail connecting circuit for the purpose of terminating before the beginning of the succeeding master code "on" period each pulse of the said other energy with which the section rails are supplied, and traffic governing apparatus controlled by those recurring pulses of said other energy.

12. In combination with a section of two direction running railway track, a master coding device at a given end of said section, means also at said given end and including said device for there supplying the section rails with master energy in the form of recurring pulses that are separated by "off" period intervals and that are coded in one or another of a plurality of distinctive manners, a first code following track relay at the opposite end of said section operated only by the there received pulses of said master energy and unresponsive to other trackway energy, means also at said opposite end and including said first track relay for there supplying the section rails wtih feed back energy in the form of recurring pulses that coincide with said "off" period intervals of the master energy supply and that are of normal polarity at times and of reverse polarity at other times, other track relay equipment at said given section end operated only by the there received pulses of said feed back energy and unresponsive to the there supplied pulses of said master energy, opposite end signaling means controlled by said first track relay and distinctively responsive to the coding of the energy by which that relay is operated, and given end signaling means controlled by said other track relay equipment and distinctively responsive to the polarity of the energy by which that equipment is operated.

13. In combination with a section of two direction running railway track, a master coding device at a given end of said section, means also at said given end and including said device for there supplying the section rails wtih master energy in the form of recurring pulses that are separated by "off" period intervals and that are coded in one or another of a plurality of distinctive manners, a first code following track relay at the opposite end of said section operated only by the there received pulses of said master energy and unresponsive to other trackway energy, means also at said opposite end and including said first track relay for there supplying the section rails with feed back energy in the form of recurring pulses that coincide with said "off" period intervals of the master energy supply and that are of normal polarity at times and of reverse polarity at other times, other track relay equipment at said given section end operated only by the there received pulses of said feed back energy and unresponsive to the there supplied pulses of said master energy, a first signal which governs the entry of traffic into said section by way of its said opposite end controlled by the there located said first track relay and displaying a distinctive indication for each different coding of the energy by which that relay is operated, and a second signal which governs the entry of traffic into said section by way of its said given end controlled by the there located said other track relay equipment and displaying a distinctive indication for each different polarity of the energy by which that equipment is operated.

14. In combination with a section of two direction running railway track, a master coding device at the first direction exit or given end of said section, means also at said given end and including said device for there supplying the section rails with master code energy in the form of pulses that are separated by "off" period intervals and that recur at one or another of a plurality of distinctive rates, a first code following track relay at the second direction exit or opposite end of said section operated only by the there received pulses of said master code energy and unresponsive to other trackway energy, feed back means for said section also positioned at said opposite end thereof and governed by said first track relay for there supplying the section rails with feed back code energy in the form of recurring pulses that are timed to coincide with the aforesaid "off" periods of the there received master code and that are of normal polarity at times and of reverse polarity at other times, other track relay equipment at the said given section end operated only by the there received pulses of said feed back code energy and unresponsive to the there supplied pulses of said master energy, first direction traffic governing apparatus controlled by said first track relay and distinctively responsive to the rate at which the pulses of operating energy for that relay recur, and second direction traffic governing apparatus controlled by said other track relay equipment and distinctively responsive to the polarity of the energy by which that equipment is operated.

15. In combination with a section of railway track, a master coding device at a given end of said section provided with a plurality of contacts that operate at different speeds, a similarly located source of energy, means whereby one or another of said coding contacts periodically connects said source to the rails of said section and thereby supplies those rails with master code energy in the form of "on" period pulses that are separated by "off" period intervals and that recur at one or another of a plurality of distinctive rates, a code following track relay at the opposite end of said section connected with said rails and operated by the pulses of said master code energy which are received at that opposite end, means in the said track relay-to-rail connection for excluding pick-up current from the track relay during each of said "off" period intervals whereby to prevent the relay from responding to trackway energy during those intervals, a source of positive polarity energy and a source of negative polarity energy at said opposite section end, means including a back contact of said track relay for connecting one or the other of said opposite end sources to said rails during each "off" period of the received master code whereby further to supply those rails with recurring pulses of positive feed back energy or with recurring pulses of negative feed back energy that coincide with said "off" periods of the received master code, a positive polar responsive and a negative polar responsive code following track relay at said given section end, means controlled by said master coding device for connecting both of said given end track relays with the section rails only during the "off" periods of the said rail-supplied master code whereby those relays are selectively operated according as said positive feed back pulses or as said negative feed back pulses are received from said rails, traffic governing apparatus controlled by said opposite end track relay and distinctively responsive to the rate at which the pulses of said master code operating energy for that relay recur, and other traffic governing apparatus controlled by said given end track relays and distinctively responsive according as one or the other of those relays follows code.

16. In combination, a stretch of railway track that is arranged into adjoining first and second sections, traffic governing apparatus positioned at the junction of said sections to control the passage of trains from said first section into said second section, means responsive to traffic conditions in and beyond said second section for determining the indication which said apparatus displays when energizing current is supplied thereto, means also at said junction for supplying the rails of said first section with master code energy in the form of recurring pulses that are separated by "off" period intervals, means located at the remote end of said first section and controlled by the there received pulses of said master code energy for further supplying the first section rails with feed back energy in the form of recurring pulses that coincide with said master code "off" periods and that are of either normal or reverse polarity depending on traffic conditions beyond said remote end, code following track relay means located at said junction and responsive both to the normal and to the reverse polarity pulses of said feed back energy that are there received from said first section rails, a code detecting relay which responds to code following operation on the part of said track relay means and which releases only when that operation is discontinued, and means controlled by said code detecting relay for supplying energizing current to said traffic governing apparatus only when a train comes into said first section and releases that relay.

17. In combination, a stretch of railway track that is arranged into adjoining first and second sections, a wayside signal positioned at the junction of said sections to govern the passage of trains from said first section into said second section, means responsive to traffic conditions in and beyond said second section for determining the indication which said signal displays when energizing current is supplied thereto, means also at said junction for supplying the rails of said first section with master code energy in the form of recurring pulses that are separated by "off" period intervals, means located at the remote end of said first section and controlled by the there received pulses of said master code energy for further supplying the first section rails with feed back energy in the form of recurring pulses that coincide with said master code "off" periods and that are of either normal or reverse polarity depending on traffic conditions beyond said remote end, a pair of code following track relays at said junction which respectively are operated by the there received normal and reverse polarity pulses of said feed back energy and both of which are unresponsive to said master code energy, an approach relay which responds to code following operation on the part of either of said track relays and which releases only when both of those relays become continuously deenergized, and means controlled by said approach relay for supplying energizing current to said wayside signal only when a train comes into said first section and releases that relay.

18. In combination, a stretch of railway track that is arranged into adjoining first and second sections, a wayside signal positioned at the junction of said sections to govern the passage of trains from said first section into said second section, means responsive to traffic conditions in and beyond said second section for determining the indication which said signal displays when energizing current is supplied thereto, means also at said junction for supplying the rails of said first section with master code energy in the form of recurring pulses that are separated by "off" period intervals, means located at the remote end of said first section and controlled by the there received pulses of said master code energy for further supplying the first section rails with feed back energy in the form of recurring pulses that coincide with said master code "off" periods and that are of either normal or reverse polarity depending on traffic conditions beyond said remote end, a pair of code following track relays at said junction which respectively are operated by the there received normal and reverse polarity pulses of said feed back energy and both of which are unresponsive to said master code energy, a first repeater relay which responds to code following operation on the part of said normal polarity track relay and which releases only when that relay ceases to follow code, a second repeater relay which responds to code following operation on the part of said reverse polarity track relay and which releases only when that relay ceases to follow code, and means jointly controlled by said two repeater relays for supplying energizing current to said wayside signal only when a train comes into said first section and deenergizes both of said track relays.

19. In combination, a stretch of railway track that is arranged into adjoining first and second track sections, means at the exit end of each of said two sections for supplying the rails thereof with master code energy in the form of recurring pulses that are separated by "off" period intervals, means located at the entrance end of each section and operated by the there received pulses of said master code energy for further supplying the section rails with pulses of feed back energy which recur in step with said master code "off" periods, means located at the junction of said two sections and controlled by the there received pulses of said first section feed back energy for causing the there supplied pulses of said second section feed back energy to have normal polarity when and only when said first section is vacant, and signaling apparatus controlled by said normal polarity pulses of second section feed back energy that are received at said second section exit and rendered active when said reception of those normal polarity pulses is discontinued whereby to indicate entrance of a train into said first section and the presence of that train in any portion of said first or second sections.

20. In combination, a stretch of railway track that is arranged into adjoining first, second and third track sections, means at the exit end of each of said three sections for supplying the rails thereof with master code energy in the form of recurring pulses that are separated by "off" period intervals, means located at the entrance end of each of said three sections and operated by the there received pulses of said master code energy for further supplying the section rails with pulses of feed back energy which recur in step with said master code "off" periods, means located at the junction of said first and second sections and controlled by the there received pulses of said first section feed back energy for causing the there supplied pulses of said second section feed back energy to have normal polarity only when said first section is vacant, means located at the junction of said second and third sections and controlled by said normal polarity pulses of second section feed back energy that are there received for discontinuing said there supplied pulses of third section feed back energy whenever the transmission of said second section normal polarity pulses to that junction is discontinued, and signaling apparatus rendered active when the transmission of said third section feed back energy pulses to the exit end of said third section is discontinued whereby there to detect entrance of a train into said first section and the presence of that train in any portion of said first, second or third sections.

21. In combination, a stretch of railway track that is arranged into adjoining first and second track sections, means at the exit end of each of said sections for supplying the rails thereof with master code energy in the form of recurring pulses that are separated by "off" period intervals, means located at the entrance end of each section and operated by the there received pulses of said master code energy for further supplying the section rails with pulses of feed back energy which recur in step with said master code "off" periods, a code following track relay installed at the junction of said two sections and operable only by the said pulses of first section feed back energy that are there received, a repeater relay which responds to code following operation on the part of said track relay and which releases only when that relay ceases to follow code, means governed by said repeater relay for causing said supplied pulses of second section feed back energy to have normal polarity when said first section is vacant and reverse polarity when the first section is occupied, and traffic governing apparatus controlled by the rail transmitted pulses of said second section feed back energy and selectively responsive according as those pulses have said normal polarity or said reverse polarity.

22. In combination, a stretch of railway track that is arranged into adjoining first and second sections, first signaling apparatus at the point of junction of said sections for governing the passage of traffic from said first section into said second section, second signaling apparatus at said junction point for governing the passage of traffic from said second section into said first section, means responsive to traffic conditions in and beyond said second section for determining the indication which said first signaling apparatus displays when energizing current is supplied thereto, means also at said junction point for supplying the rails of said first section wtih master code energy in the form of recurring pulses that are separated by "off" period intervals, means located at the remote end of said first section and operated by the there received pulses of said master code energy for further supplying the section rails with feed back energy in the form of recurring pulses that coincide with said master code "off" periods and that have normal polarity at times and reverse polarity at other times, code following track relay equipment at said junction point operated by the pulses of said feed back energy that are there received from said first section rails and unresponsive to the there supplied pulses of said master code energy, means controlled by said track relay equipment and selectively responsive to the polarity of the said feed back energy by which that equipment is operated for determining the indication which said second signaling apparatus displays, a code detecting relay which responds to code following operation on the part of said track relay equipment and which releases only when that equipment becomes continuously deenergized, and means controlled by said code detecting relay for supplying said first signaling apparatus wtih energizing current only when that relay releases in response to the entry of a train into said first section.

23. In a coded track circuit system of railway signaling, the combination of a stretch of two direction running single track that is arranged into sections, means at a given end of each of said sections for there supplying the section rails with recurring pulses of master energy that are separated by "off" period intervals, a first code following track relay at the opposite end of each section operated only by the there received pulses of said master energy and unresponsive to other trackway energy, means also at the said opposite end of each section governed by the there located said first track relay for further supplying the section rails with feed back energy in the form of recurring pulses that coincide with said "off" period intervals of the received master code, other track relay equipment at the said given end of each section operated only by the there received pulses of said feed back energy and unresponsive to the there supplied pulses of said master energy, means at the said given end of each section controlled by the said first track relay for the section there adjoining for selecting in accordance with traffic conditions beyond that given section end the coding of the said master energy pulses which are there supplied, means at the said opposite end of each section controlled by the said other track relay equipment for the section there adjoining for selecting in accordance with traffic conditions beyond that opposite section end the polarity of the said feed back energy pulses which are there supplied, apparatus controlled by said first track relays and distinctively responsive to the coding of the energy by which those relays are operated for governing traffic through said stretch in the direction of from said opposite to said given section ends, and other apparatus controlled by said other track relay equipments and distinctively responsive to the polarity of the energy by which those equipments are operated for governing traffic through said stretch in the direction of from said given to said opposite section ends.

24. In a non-line-wire system of railway signaling, the combination of a stretch of single track that is arranged into sections and over which traffic may move in either direction, means at a given end of each of said sections for supplying the rails thereof with master energy in the form of recurring pulses that are separated by "off" period intervals, a first code following track relay at the opposite end of each section operated only by the there received pulses of said master energy and unresponsive to other trackway energy, means also at the said opposite end of each section governed by the there located said first track relay for further supplying the section rails with feed back energy in the form of recurring pulses that coincide with said "off" period intervals of the received master code, other track relay equipment at the said given end of each section operated only by the there received pulses of said feed back energy and unresponsive to the there supplied pulses of said master energy, means at the said given end of each section controlled by the said first track relay for the section there adjoining for selecting in accordance wtih traffic conditions beyond that given section end the coding of the said master energy pulses which are there supplied, means at the said opposite end of each section controlled by the said other track relay equipment for the section there adjoining for selecting in accordance wtih traffic conditions beyond that opposite section end the polarity of the said feed back energy pulses which are there supplied, code distinguishing means individually controlled by each of said first track relays, polarity distinguishing means individually controlled by each of said other track relay equipments, apparatus controlled by said code distinguishing means for governing traffic through said stretch in the direction of from said opposite to said given section ends, and apparatus controlled by said polarity distinguishing means for governing traffic through said stretch in the direction of from said given to said opposite section end.

25. In combination, a stretch of two direction running single track, first signals located at intervals for governing traffic in a first direction through the stretch, other signals located at intervals for governing traffic in the other direction through the stretch, code following track relay means controlling each of said first signals and producing a distinctive indication for each coding of pulsed operating energy that the means receive, code following track relay means controlling each of said other signals and producing a distinctive indication for each polarity of pulsed operating energy that the means receive, first coded track circuits identified with said first direction traffic for transmitting to the track relay means that control said first signals recurring pulses of master operating energy which are separated by "off" periods intervals, other coded track circuits identified with said other direction traffic and controlled by the master energy of said first coded track circuits for transmitting to the track relay means that control said other signals recurring pulses of feed back operating energy which are timed to coincide with the said "off" period intervals of said master energy transmission, means responsive to advance traffic conditions in said first direction for distinctively selecting the coding of the pulses of said master energy whereby to provide following protection for first direction train moves through the stretch, and means responsive to advance traffic conditions in said other direction for distinctively selecting the polarity of the pulses of said other energy whereby to provide following protection for feed back direction train moves through the stretch.

26. In combination, a stretch of railway track over which traffic may move in either direction, a plurality of insulated sections of said track, a given end source and an opposite end source of trackway energy for each section, master means for each section positioned at the given end thereof and intermittently connecting the said given end source that is there located with the section rails in a manner to form codes that consist of recurring "on" period pulses of master energy which are separated by "off" period intervals, first track relay apparatus at the opposite end of each section operated only by the there received pulses of said master energy and unresponsive to other trackway energy, means also at the said opposite end of each section governed by the there located said first track relay apparatus and functioning to connect the there located said opposite end source with said section rails during the "off" period intervals of the received master code whereby further to supply those rails with "off" period pulses of feed back energy, means at the said given end of each section controlled by the said first track relay apparatus for the section there adjoining for causing said there formed codes of master energy pulses to be distinctive of traffic conditions in and beyond that adjoining section, second track relay apparatus at the said given end of each section operated only by the there received pulses of said feed back energy and unresponsive to the there supplied pulses of said master energy, means at the said opposite end of each section controlled by the said second track relay apparatus for the section there adjoining for selecting in accordance with traffic conditions in and beyond that adjoining section the polarity of the pulses of feed back energy which are there supplied, a first direction signal at the said opposite end of each section controlled by the there located said first track relay apparatus and distinctively responding to each different code formation of the master energy pulses by which that apparatus is operated, and a second direction signal at the said given end of each section controlled by the there located said second track relay apparatus and distinctively responding to each different polarity character of the feed back energy pulses by which that apparatus is operated.

27. In the trackway portion of an absolute-permissive-block wayside or cab signaling system for railroads, the combination of a single track stretch divided into track sections by insulating joints, a master coding device at the first direction exit or given end of each section, a source of master energy at the same end of each section intermittently connected across the section rails by the there located said coding device, a source of feed back energy at the second direction exit or opposite end of each section, a first track relay for each section at the said opposite end thereof operated by the there received pulses of master energy and connecting the there located said feed back source with the section rails during the intervals between received master pulses, means excluding pick-up current from each first track relay during each feed back source-to-rail connection which that relay makes, other track relay equipment for each section at the said given end thereof operated by the there received pulses of feed back energy and disconnected from the section rails during each master source-to-rail connection which the there located said coding device makes, first following protection means controlled by said first track relays and effective to select the coding of said given end supplied pulses of master energy in accordance with advance traffic conditions in said first direction, second following protection means controlled by said other track relay equipments and effective to select the polarity of said opposite end supplied pulses of feed back energy in accordance with advance traffic conditions in said second direction, first directional protection means including said other track relay equipments and effective upon the shunting of any section in said stretch by a first direction train to cause removal of the feed back energy from all sections between the train and the extreme second direction entrance end of the stretch, and second directional protection means including said first track relays and effective upon the shunting of any section in said stretch by a second direction train to cause removal of the master energy from all sections between the train and the extreme first direction entrance end of the stretch.

28. In the trackway portion of an absolute-permissive-block wayside or cab signaling system for railroads, the combination of a single track stretch divided into track sections by insulating joints, a master coding device at the first direction exit or given end of each section, a source of master energy at the same end of each section intermittently connected across the section rails by the there located said coding device, a source of feed back energy at the second direction exit or opposite end of each section, a first track relay for each section at the said opposite end thereof operated by the there received pulses of master energy and connecting the there located said feed back source with the section rails during the intervals between received master pulses, means excluding pick-up current from each first track relay during each feed back source-to-rail connection which that relay makes, other track relay equipment for each section at the said given end thereof operated by the there received pulses of feed back energy and disconnected from the section rails during each master source-to-rail connection which the there located said coding device makes, first following protection means controlled by said first track relays and effective to select the coding of said given end supplied pulses of master energy in accordance with advance traffic conditions in said first direction, second following protection means controlled by said other track relay equipments and effective to select the polarity of said opposite end supplied pulses of feed back energy in accordance with advance traffic conditions in said second direction, a first headblock signal at the extreme first direction entrance end of said stretch controlled by the there located said first track relay and displaying "proceed" as long as that relay receives master energy pulses and "stop" when those pulses cease to be received, means including said first track relays and effective upon the shunting of any section in said stretch by a second direction train to cause removal of the master energy from all sections between the train and said first headblock signal, a second headblock signal at the extreme second direction entrance end of said stretch controlled by the there located said other track relay equipment and displaying "proceed" as long as that equipment receives feed back pulses and "stop" when those pulses cease to be received, and means including said other track relay equipments and effective upon the shunting of any section in said stretch by a first direction train to cause removal of the feed back energy from all sections between the train and said second headblock signal.

29. In combination, a section of railway track, means at a given end of said section for supplying the rails thereof with master code energy in the form of pulses that are separated by "off" period intervals and that recur at one or another of a plurality of distinctive rates the lowest of which only is below a critical value, means located at the opposite end of said section and controlled by the there received pulses of said master code energy for further supplying said section rails with feed back energy in the form of recurring pulses which coincide with the said master code "off" periods, a wayside signal at said opposite section end which governs the entry of first direction traffic into the section, a wayside signal at said given section end which governs the entry of second direction traffic into the section, control means for said opposite end signal which are governed by the rail transmitted pulses of said master code energy only and which hold the signal at "proceed" as long as those pulses recur at a rate above said critical value and put the signal at "stop" when those pulses either recur at the aforesaid lowest rate or are discontinued, and control means for said given end signal which are governed by the rail transmitted pulses of said feed back energy only and which hold the signal at "proceed" as long as those pulses recur at any of the rates heretofore named and put the signal at "stop" only when those pulses are discontinued.

30. In combination, a stretch of railway track that is arranged into first and second adjoining sections, means at the junction end of said first section for supplying the rails thereof with master code energy in the form of pulses that are separated by "off" period intervals and that recur at one or another of a plurality of distinctive rates the lowest of which is only below a critical value, a track relay at the remote end of said first section operated only by the there received pulses of said master code energy and unresponsive to other trackway energy, means also at the remote end of said first section governed by the said track relay that is there located and effective under vacant conditions of said first section further to supply the rails thereof with feed back energy in the form of recurring pulses that coincide with the "off" period intervals of said received master code, a first wayside signal also at said first section remote end which governs the entry of first direction traffic into said first section, means including said remote end track relay for controlling said first signal in such manner that the signal shows "proceed" when said relay follows code at a rate which is above said critical value and shows "stop" when said relay either follows code at a rate below said critical value or becomes continuously deenergized, a track relay at the said junction end of said first section which responds only to the pulses of said feed back energy that are there received, a second wayside signal at said first section junction end which governs the entry of second direction traffic into said first section, means including said junction end track relay for controlling said second signal in such manner that the signal shows "proceed" when said relay follows code at any of the rates heretofore named and shows "stop" only when said relay ceases to follow code, means effective under vacant conditions of said second section for causing said first section master code energy pulses to recur at one or another of the said rates which are above said critical value whereby to hold both of said wayside signals at "proceed," and means effective upon the entry of a second direction train into said second section for causing those first section pulses of master code energy then to recur at said lowest rate whereby to put said first signal at "stop" while holding said second signal at "proceed."

31. In combination, a stretch of railway track that is arranged into a plurality of consecutive track sections, means at a given end of each of said sections for supplying the rails thereof with master code energy in the form of recurring pulses that are separated by "off" period intervals, a first track relay for each of said sections at the said opposite end thereof operated only by the there received pulses of said master code energy and unresponsive to other trackway energy, means also at the said opposite end of each section governed by the there located said first track relay for further supplying the section rails with feed back energy in the form of recurring pulses that coincide with said "off" periods of the said master code which is there received, further means at the said opposite end of each section which include the there located first track relay and which when that relay ceases to follow code at or above a critical rate of pulse recurrence become effective to reduce to below that critical value the rate at which said master code energy pulses are supplied to the rails of the section which next adjoins the relay location, a headblock signal positioned at the extreme opposite end of said track stretch to govern the entry of traffic thereinto by way of that opposite end, means controlled by the said opposite end track relay at the location of said headblock signal for putting that signal at "stop" when in response to the entry of a train into the stretch by way of the extreme given end thereof said controlling track relay either follows code at below said critical rate or becomes continuously deenergized, a second track relay for each of said stretch sections located at the said given end thereof and responsive only to the there received pulses of said feed back energy and unresponsive to the there supplied pulses of said master energy, and a wayside signal also at the said given end of each section controlled by the said second track relay that is there located and held at "proceed" as long as said controlling track relay continues to follow code at any of the rates hereinbefore named.

32. In combination, a stretch of railway track that is arranged into a plurality of consecutive track sections, means at a given end of each of said sections for supplying the rails thereof with master code energy in the form of pulses that are separated by "off" period intervals and that recur at one or another of a plurality of distinctive rates the lowest of which is below a critical speed, a first track relay for each of said sections at the opposite end thereof operated only by the there received pulses of said master code energy and unresponsive to other trackway energy, means also at the said opposite end of each section governed by the there located said first track relay for further supplying the section rails with feed back energy in the form of recurring pulses that coincide with the said "off" periods of said there received master code and that are of normal polarity at times and of reverse polarity at other times, other track relay apparatus for each section at the said given end thereof operated only by the there received pulses of said feed back energy and unresponsive to the there supplied pulses of said master energy, a signal at the given end of each section for governing the entry of given-to-opposite end traffic thereinto, means for each of said given end signals controlled by the said other track relay equipment at the signal location for causing the signal to give a distinctive "proceed" indication when its controlling equipment receives feed back energy of each of said polarities at any of the hereinbefore named rates of pulse recurrence and to show "stop" only when the controlling equipment fails to receive any feed back pulses, means for each section also at the said opposite end thereof which include the there located said first track relay and which when that relay either ceases to follow code or responds at the aforesaid lowest master pulse recurrence rate reduces to that lowest rate the speed of recurrence of the said master energy pulses which are supplied to the rails of the next adjoining section, a headblock signal positioned at the extreme opposite end of said track stretch to govern the entry of opposite-to-given end traffic thereinto by way of that opposite end, and means controlled by the said first track relay which is at the location of said headblock signal for causing that signal to show "proceed" when said relay is following code at above said critical speed and to show "stop" when the same relay either is continuously deenergized or is following code at the aforesaid lowest rate whereby the latter indication is produced upon the entry of a given-to-opposite end train into the extreme given end of said stretch and as long as any part of that train remains within the stretch is continued without putting at "stop" the said given-to-opposite end signals which are in advance of the train.

33. In combination with a stretch of two-direction running railway track, a track section included in said stretch, master code equipment installed at a given end of said section and operable to supply the section rails with master code energy in the form of pulses that are separated by "off" period intervals and that recur at a rate which is distinctive of traffic conditions beyond that given end, feed back equipment installed at the opposite end of said section and operable when master code energy is received over the section rails from said given section end further to supply those rails with feed back energy in the form of pulses that recur in step with the "off" periods of the received master code, supplemental apparatus also at said opposite section end which comes into operation only under occupied conditions of said section and which then supplies the section rails with special energy in the form of pulses that are separated by "off" period intervals and that recur at a rate which is distinctive of traffic conditions beyond that opposite end, traffic governing apparatus controlled by the rail transmitted pulses of said master code energy, other traffic governing apparatus controlled by the rail transmitted pulses of said feed back energy, and further traffic governing apparatus controlled by the rail transmitted pulses of said special energy.

34. In combination, a stretch of two-direction running railway track, a track section included in said stretch, a first direction track circuit for said section comprising means at the section's given end which supply the section rails with recurring pulses of master code energy that are separated by "off" period intervals and that are distinctive of traffic conditions beyond that given end and means at the section's opposite end which respond to the said master energy pulses that are there received from said rails, a second direction track circuit for said section comprising means at the section's said opposite end which during and only during reception thereat of said master code pulses further supply the section rails with pulses of feed back energy that recur in step with the said "off" periods of the received master code and means at the section's said given end which respond to said feed back pulses that are there received from said rails, supplemental means at the section's said opposite end which come into operation only when the section's said master pulses fail to be transmitted to that opposite end and which then supply the section rails with special code energy in the form of pulses that are independent of said master code "off" periods and that recur at a rate which is distinctive of traffic conditions beyond that opposite end, and traffic governing apparatus controlled by said traffic distinctive pulses of said special code energy.

35. In combination, a section of railway track, means located at a given end of said section and effective under both vacant and occupied conditions thereof for supplying the section rails with master code energy in the form of pulses that are separated by "off" period intervals and that recur at one or another of a plurality of distinctive rates, means at the opposite end of said section controlled by the said pulses of master code energy that there are received and effective under vacant section conditions only for further supplying the section rails with recurring pulses of other energy which coincide with said master code "off" periods, other means also located at the opposite end of said section and effective under occupied section conditions only for still further supplying the section rails with special code energy in the form of separated pulses that recur at one or another of a plurality of distinctive rates, wayside governing means controlled by the recurring pulses of said master code energy and by the recurring pulses of said other energy, first direction train carried signaling apparatus also controlled by said master code pulses, and second direction train carried signaling apparatus controlled by the recurring pulses of said special code energy.

36. In combination, a section of railway track, means located at a given end of said section and effective under both vacant and occupied conditions thereof for supplying the section rails with master code energy in the form of recurring pulses that are separated by "off" period intervals, means located at the opposite end of said section and controlled by the said pulses of master code energy that are there received for further supplying the section rails with recurring pulses of other energy that coincide with said "off" period intervals of the master code energy supply, means also at said opposite section end and effective only when a train comes into said section for there supplying said section rails with special code energy in the form of recurring pulses that have no regular time coincidence with the aforesaid master code "off" periods, means for periodically interrupting the supply of said special code energy pulses whereby when said train leaves the section said first named opposite end means will on the occasion of the first one of said interruptions respond to the said master code energy pulses that are there received over the rails from the given section end and restore to said rails the before stated supply of said pulses of other energy during the master code "off" periods, and traffic governing apparatus controlled by each variety of said rail-supplied energy that is named above.

37. In combination, a section of railway track, means located at a given end of said section and effective under both vacant and occupied conditions thereof for supplying the section rails with master code energy in the form of recurring pulses that are separated by "off" period intervals, means at the opposite end of said section controlled by the said pulses of master code energy that are there received and effective under vacant section conditions only for further supplying the section rails with recurring pulses of other energy that coincide with said master code "off" periods, an auxiliary coding device at said opposite section end, similarly located means which include said device and which are effective under occupied section conditions only for supplying said section rails with special code energy in the form of recurring pulses that have no regular time coincidence with the aforesaid master code "off" periods, means also effective under occupied section conditions only for periodically interrupting the supply of said special code energy pulses whereby when said section is vacated said first named opposite end means will on the occasion of the first one of said interruptions respond to the said master code energy pulses that are there received over the rails from the given section end and restore to said rails the before stated supply of said pulses of other energy during the master code "off" periods, and traffic governing apparatus controlled by each variety of said rail supplied energy that is named above.

38. In combination, a stretch of railway track arranged into first and second sections that adjoin at a common point, means at the remote end of said second section for supplying the rails thereof with master code energy in the form of recurring pulses that are separated by "off" period intervals, means at the said point of section junction for repeating into the rails of said first section each pulse of said master code energy that is received at that junction point and for coinciding those repeated pulses with the said received pulses by which they are produced, means located at the remote end of said first section and controlled by the said repeated pulses of master code energy that are there received for further supplying said first section rails with recurring pulses of other energy that coincide with the "off" period intervals of said repeated master code, further means at the said point of section junction for repeating into said second section rails each pulse of said other energy that is there received from said first section rails and for coinciding those repeated pulses with the "off" period intervals of said second section master code, traffic governing apparatus controlled by the repeated pulses of said master code energy, and other traffic governing apparatus controlled by the repeated pulses of said other energy.

39. In combination, a stretch of railway track arranged into first and second sections that adjoin at a common point, means at the remote end of said second section for supplying the rails thereof with master code energy in the form of recurring pulses that are separated by "off" period intervals and that recur at one or another of a plurality of distinctive rates, means at the said point of section junction for repeating into the rails of said first section each pulse of said master code energy that is received at that junction point and for coinciding those repeated pulses with the said received pulses by which they are produced, means located at the remote end of said first section and controlled by the said repeated pulses of master code energy that are there received for further supplying said first section rails with recurring pulses of other energy that coincide with the "off" period intervals of said repeated master code and that have one or another of a plurality of distinctive polar characters, further means at the said point of section junction for repeating into said second section rails during the "off" period intervals of said second section master code the pulses of said other energy that are there received from said first section rails and for coinciding the polar character of each repeated pulse with that of the said received pulse which produced it, traffic governing apparatus controlled by the repeated pulses of said master code energy and distinctively responsive to the rate at which those pulses recur, and other traffic governing apparatus controlled by the repeated pulses of said other energy and distinctively responsive to the polar character of the energy of those pulses.

40. In combination, a section of railway track, a master coding device located at a given end of said section and provided with first and second contacts which in displaced relation with respect to each other repeatedly move between front and back positions, a source of trackway energy and a code following track relay also at said given section end, means including the said displacedly operated contacts of said coding device for repeatedly connecting the rails of said section first to said energy source and then to the winding of said track relay whereby to produce a master trackway code consisting of alternate "on" and "off" periods the latter of which coincide with said track relay winding connections, means also including said displacedly operated coding contacts for placing across said rails after each of the said rail-to-track relay connections and before the succeeding said rail-to-energy source connection a low resistance shunt through which track storage energy may discharge, means located at the opposite end of said section and controlled by the said master code energy that is there received for further supplying the section rails with other energy in the form of recurring pulses which coincide with said master code "off" periods and which are effective to operate said given end track relay, and traffic governing apparatus controlled by said track relay.

41. In combination, a section of railway track, a master coding device at a given end of said section provided with first and second contacts and including means for cyclically moving said first contact between front and back positions in regularly recurring manner and for causing said second contact to repeat in fixedly delayed manner the said cyclic movements of the first contact, a source of trackway energy and a code following track relay also at said given section end, a circuit which is completed only when said first coding contact is in its front position at a time that said second coding contact is in its back position and over which the rails of said section are supplied with master code energy that is derived from said source and that is in the form of recurring "on" period pulses which are separated by "off" period intervals, another circuit which is completed only when said second contact is in its front position by way of which said track relay is connected in energy receiving relation with said rails during each of said master code "off" periods, a further circuit which is completed only when said first and second contacts are both in their back positions and through which said rails dissipate track storage energy during a short portion of each of said master code "off" periods, means located at the opposite end of said section and controlled by the said master code energy that is there received for further supplying the section rails with other energy in the form of recurring pulses which coincide with said master code "off" periods and which are effective to operate said given end track relay, and traffic governing apparatus controlled by said track relay.

42. In combination, a section of railway track that is included in a two direction running stretch, a master coding device located at a given end of said section and provided with contacts that are continuously operated at a constant speed, a source of trackway energy also at said given section end, means including said coding device contacts for recurrently connecting said source with the rails of said section whereby to supply those rails with master code energy in the form of recurring pulses that are separated by "off" period intervals, means governed by traffic conditions beyond said given section end for setting up said source-to-rail connection in such selective manner that the said supplied pulses of master code energy are of positive polarity at times and of negative polarity at other times, traffic governing apparatus at the opposite end of said section controlled by the said master code pulses which are there received and distinctively responsive to the polarity of those pulses, means also at said opposite section end for further supplying said rails with other trackway energy in the form of recurring pulses that coincide with said master code "off" periods and that have positive polarity at times and negative polarity at other times, and traffic governing apparatus at said given section end controlled only by the said pulses of other energy which are there received.

43. In combination, a section of railway track, means at a given end of said section for supplying the rails thereof with master code energy in the form of recurring "on" period pulses that are separated by "off" period intervals, a code following track relay at the opposite end of said section which is responsive to the said pulses of master code energy that are there received, a similarly located source of trackway energy, a coder relay also at said opposite section end controlled by said track relay and delayedly repeating the code following operations thereof, means including said coder relay for connecting said section rails with said track relay during each "on" period only of the said received master code and with said energy source during each "off" period only of that received code whereby further to supply those rails with other energy in the form of recurring pulses that coincide with said master code "off" periods, and traffic governing apparatus at said given section end controlled only by the pulses of said other energy which are there received.

44. In combination, a section of railway track that is included in a two direction running stretch, means at a given end of said section for supplying the rails thereof with master code energy in the form of recurring "on" period pulses that are separated by "off" period intervals, a code following track relay at the opposite end of said section which is responsive to the said pulses of master code energy that are there received, a similarly located source of trackway energy, a coder relay also at said opposite section end controlled by said track relay and delayedly repeating the code following operations thereof, means including said coder relay for connecting said section rails with said track relay during each "on" period only of the said received master code and with said energy source during each "off" period only of that received code whereby further to supply those rails with other energy in the form of recurring pulses that coincide with said master code "off" periods, means governed by traffic conditions beyond said opposite section end for setting up said source-to-rail connection in such selective manner that the said supplied pulses of other energy are of positive polarity at times and of negative polarity at other times, and traffic governing apparatus at the said given section end controlled only by the said pulses of other energy which are there received and distinctively responsive to the polarity of those pulses.

45. In combination, a section of railway track, means at a given end of said section for supplying the rails thereof with master code energy in the form of recurring "on" period pulses that are separated by "off" period intervals, a code following track relay at the opposite end of said section which is responsive to the said pulses of master code energy that are there received, a similarly located source of trackway energy, a coder relay also at said opposite section end which when picked up connects said section rails with said track relay and which when released connects those rails with said energy source, an energizing circuit for said coder relay which includes a back contact of said track relay and over which the coder relay receives pick-up current during each "off" period only of said received master code, means for imparting to said coder relay such delayed responding characteristics that when energized as aforesaid said relay is picked up during each "on" period of said received master code then to connect said track relay with the section rails and released during each "off" period of the same code whereby to cause said source further to supply the section rails with other energy in the form of recurring pulses that coincide with said master code "off" periods, and traffic governing apparatus at said given section end controlled only by the pulses of said other energy which are there received.

46. In combination, a section of railway track, means at a given end of said section for supplying the rails thereof with master code energy in the form of recurring "on" period pulses that are separated by "off" period intervals and that are of positive polarity at times and of negative polarity at other times, a code following track relay at the opposite end of said section having a first unit which responds to there received pulses of said positive polarity energy and a second unit which responds to there received pulses of said negative polarity energy, a similarly located source of trackway energy, a coder relay also at said opposite section end, an energizing circuit for said coder relay that serially includes a back contact of each of the said two units of said track relay and over which the coder relay receives pick-up current whenever both of said track relay units are released, means for imparting to said coder relay such delayed responding characteristics that when said track relay is following master code energy pulses of either polarity the coder relay will be picked up during each "on" period of the followed master code and released during each "off" period thereof, circuits controlled by said coder relay for connecting said section rails with both of the said units of said track relay during each of said "on" periods only of said followed master code and with said trackway energy source during each of said "off" periods of that code whereby to supply said rails with recurring pulses of other energy that coincide with said "off" code periods, and traffic governing apparatus controlled by the thus supplied pulses of said other energy.

47. In combination, a stretch of railway track that is arranged into a plurality of consecutive track sections, means at a given end of each of said sections for supplying the rails thereof with master code energy in the form of recurring pulses that are separated by "off" period intervals, a coder relay located at the opposite end of each of said sections and controlled by the pulses of said master code energy that are there received, means also located at the opposite end of each section and including said section coder relay for further supplying the section rails with recurring pulses of other energy which coincide with the said "off" period intervals of the received master code, a track relay located at the said given end of each section and operated only by the pulses of said other energy that are there received from the section rails, control means for each of said coder relays which include the adjacently located said track relay of the adjoining section and which when that track relay ceases to follow code cause the coder relay to cut off the supply of said other energy pulses from the rails of the section with which the coder relay is identified, a headblock signal positioned at the extreme given end of said track stretch to govern the entry of traffic thereinto by way of that given end, and means controlled by the said track relay at the location of said signal for putting that signal at "stop" when said track relay becomes continuously deenergized in response to the entry of a train into the extreme opposite end of said stretch.

48. In combination, a stretch of railway track that is arranged into first and second adjoining sections, means at the junction end of said first section for supplying the rails thereof with master code energy in the form or recurring pulses that are separated by "off" period intervals, means located at the remote end of said first section and controlled by the said pulses of master code energy that are there received for further supplying said first section rails with recurring pulses of other energy which coincide with the "off" period intervals of said received master code, a track relay for said first section located at the said junction end thereof and operated only by the pulses of said other energy that are there received, means at the remote end of said second section for supplying the rails thereof with master code energy in the form of recurring pulses that are separated by "off" period intervals, a coder relay at the junction end of said second section, means also at said second section junction end controlled by the pulses of said second section master code energy that are there received including said coder relay for further supplying said second section rails with recurring pulses of other energy which coincide with the "off" period intervals of said received master code, a wayside signal positioned at said remote end of second section to govern the entry of second direction traffic into that section and so controlled by the said pulses of second section other energy that are there received as to show "stop" only when reception of those pulses is discontinued, and supplemental control means for said second section coder relay which include said first section track relay and by which the coder relay is caused to cut off the supply of said other energy pulses from the rails of said second section when said track relay becomes continuously deenergized whereby entry of a first direction train into said first section puts said second section signal at "stop."

49. In combination, a stretch of railway track that is arranged into a plurality of consecutive track sections, means at a given end of each of said sections for supplying the rails thereof with master code energy in the form of recurring pulses that are separated by "off" period intervals, a track relay for each of said sections located at the opposite end thereof and operated only by the pulses of said master code energy that are there received, a coder relay for each section also located at the said opposite end thereof and controlled by the said section track relay at the same location, similarly located means for each section that include the said section coder relay and that function under code following conditions of the said section track relay further to supply the section rails with recurring pulses of other energy which coincide with the said "off" period intervals of the track-relay-received master code, means also located at the said opposite end of each of said sections and controlled by the said there located track relay for causing the said master code energy pulses which are supplied to the rails of the next adjoining section to be discontinued whenever said controlling track relay ceases to follow code, a headblock signal positioned at the extreme opposite end of said track stretch to govern the entry of traffic thereinto by way of that opposite end, and means controlled by the said track relay at the location of said signal for putting that signal at "stop" when said track relay becomes continuously deenergized in response to the entry of a train into the extreme given end of said stretch.

50. In combination, a stretch of railway track that is arranged into first and second adjoining sections, means at the junction end of said first section for supplying the rails thereof with master code energy in the form of pulses that are separated by "off" period intervals, a first track relay for said first section located at the remote end thereof and operated only by the pulses of said master code energy that are there received, a coder relay also located at said first section remote end and there at times controlled by said track relay, means including said coder relay and effective under code following conditions of said first track relay for further supplying the first section rails with recurring pulses of other energy which coincide with said "off" period intervals of the received master code, an auxiliary coding device at said first section remote end, means effective whenever said first track relay ceases to follow code for causing said coding device to operate said coder relay and thereby cause said first section rails then to receive recurring pulses of special code energy, a first wayside signal at said remote end of the first section which governs the entry of first direction traffic into that section and which is so controlled by said first track relay as to show "proceed" as long as that relay follows code and "stop" when that relay becomes inactive, a second track relay for said first section located at the said junction end thereof and responsive either to the pulses of said other energy or to the pulses of said special code energy which are there received, a second wayside signal at the said first section junction end which governs the entry of second direction traffic into that section and which is so controlled by said second track relay as to show "proceed" as long as that relay follows code and "stop" when that relay becomes inactive, means effective under vacant conditions of said second section for causing said first section master code energy pulses to be supplied as aforesaid whereby to hold both of said wayside signals at "proceed," and means effective upon the entry of a second direction train into said second section for discontinuing the supply of said master code pulses whereby to put said first signal at "stop" while holding said second signal at "proceed."

RALPH. R. KEMMERER

CERTIFICATE OF CORRECTION.

Patent No. 2,280,491. April 21, 1942.

RALPH R. KEMMERER.

It is hereby certified that error appears in the printed specification of the above numbered patent requiring correction as follows: Page 36, first column, line 57, claim 8, after "times," strike out "a"; page 40, first column, line 58, claim 25, for "periods" read --period--; and line 75, same claim, for "other" read --feed back--; and second column, line 1, same claim 25, for "feed back" read --other--; page 41, second column, line 45, claim 30, for "which is only" read --which only is--; and that the said Letters Patent should be read with this correction therein that the same may conform to the record of the case in the Patent Office.

Signed and sealed this 9th day of June, A. D. 1942.

(Seal)

Henry Van Arsdale,
Acting Commissioner of Patents.